(12) United States Patent
Kanno

(10) Patent No.: US 6,169,999 B1
(45) Date of Patent: Jan. 2, 2001

(54) DICTIONARY AND INDEX CREATING SYSTEM AND DOCUMENT RETRIEVAL SYSTEM

(75) Inventor: Yuji Kanno, Yokohama (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/059,567

(22) Filed: Apr. 14, 1998

(30) Foreign Application Priority Data

May 30, 1997 (JP) .................................................. 9-156056

(51) Int. Cl.[7] .............................. G06F 3/14; G06F 17/27
(52) U.S. Cl. ................................. 707/532; 704/7; 704/10
(58) Field of Search .............................. 707/532; 704/10, 704/7

(56) References Cited

U.S. PATENT DOCUMENTS

| | | | |
|---|---|---|---|
| 4,358,824 | * 11/1982 | Glickman et al. | 707/5 |
| 4,991,135 | * 2/1991 | Yoshimura et al. | 707/3 |
| 5,123,103 | * 6/1992 | Ohtaki et al. | 707/5 |
| 5,375,235 | * 12/1994 | Berry et al. | 707/5 |
| 5,479,383 | * 12/1995 | Tsuneyoshi | 369/14 |
| 5,649,221 | * 7/1997 | Crawford et al. | 707/532 |
| 5,655,129 | * 8/1997 | Ito | 704/10 |
| 5,708,829 | * 1/1998 | Kadashevich et al. | 704/10 |
| 5,761,688 | * 6/1998 | Morishita | 707/532 |
| 5,774,834 | * 6/1998 | Visser | 704/10 |
| 5,959,629 | * 9/1999 | Masui | 345/347 |
| 5,983,171 | * 1/1997 | Yokoyama et al. | 704/10 |
| 5,995,922 | * 5/1996 | Penteroudakis et al. | 704/9 |

OTHER PUBLICATIONS

Michael L. Mauldin, A Conceptual Information Retrieval Syaytem, Oct. 1991, Center for machine translation carnegie Mellon University, Pittsburgh, PA 15213.*

* cited by examiner

Primary Examiner—Stephen S. Hong
Assistant Examiner—Wasseem H. Hamdan
(74) Attorney, Agent, or Firm—Lowe Hauptman Gopstein Gilman & Berner

(57) ABSTRACT

A high-speed document retrieval system creates a regular expression dictionary and a word index on the basis of a retrieval document and a word dictionary to conduct retrieval to a document through the regular expression dictionary and the word index at a high speed. A regular expression dictionary expressing a set of character strings having the same length is created from a word dictionary. In terms of a character string included in a retrieval document and matching with a regular expression in the regular expression dictionary, an index element is recorded in a word index when there is no different index element which allows an observing index element to be deducible, which eventually produces a word index capable of achieving a high-speed full-text retrieval without the noticeable increase in the index capacity. The document retrieval system performs the retrieval of the retrieval document through the use of the word dictionary, the regular expression dictionary and the word index, so that a high-speed full-text retrieval is possible without the impairment of retrieval efficiency even if the retrieval character string is covered with words having a small number of characters and making less overlap.

14 Claims, 66 Drawing Sheets

FIG.2

| |
|---|
| FIG. 2A |
| FIG. 2B |
| FIG. 2C |
| FIG. 2D |
| FIG. 2E |
| FIG. 2F |

FIG.2A

```
[a-go a-go A-KON] i [a-go a-go A-KON]
[a-go a-go A-KON] i [sa-do sa-do SA-DON]
[a-go a-go A-KON] i [na-po na-po NA-BON]
[a-go a-go A-KON] i [ma-n ma-n MA-WAN]
[sa-do sa-do SA-DON] i [a-go a-go A-KON]
[sa-do sa-do SA-DON] i [sa-do sa-do SA-DON]
[sa-do sa-do SA-DON] i [na-po na-po NA-BON]
[sa-do sa-do SA-DON] i [ma-n ma-n MA-WAN]
[na-po na-po NA-BON] i [a-go a-go A-KON]
[na-po na-po NA-BON] i [sa-do sa-do SA-DON]
[na-po na-po NA-BON] i [na-po na-po NA-BON]
[na-po na-po NA-BON] i [ma-n ma-n MA-WAN]
[ma-n ma-n MA-WAN] i [a-go a-go A-KON]
[ma-n ma-n MA-WAN] i [sa-do sa-do SA-DON]
[ma-n ma-n MA-WAN] i [na-po na-po NA-BON]
[ma-n ma-n MA-WAN] i [ma-n ma-n MA-WAN]
[a-go a-go A-KON] ga [a-go a-go A-KON]

[ma-n ma-n MA-WAN] ga [ma-n ma-n MA-WAN]
[a-go a-go A-KON] no [a-go a-go A-KON]

[ma-n ma-n MA-WAN] no [ma-n ma-n MA-WAN]
[a-go a-go A-KON] no de [a-go a-go A-KON]
[a-go a-go A-KON] no de [sa-do sa-do SA-DON]
[a-go a-go A-KON] no de [na-po na-po NA-BON]
[a-go a-go A-KON] no de [ma-n ma-n MA-WAN]
[sa-do sa-do SA-DON] no de [a-go a-go A-KON]

[ma-n ma-n MA-WAN] no de [ma-n ma-n MA-WAN]
[a-go a-go A-KON] de [a-go a-go A-KON]
```

FIG.2B

```
[ma-n ma-n MA-WAN] de [ma-n ma-n MA-WAN]
[a-go a-go A-KON] ha [a-go a-go A-KON]

[ma-n ma-n MA-WAN] ha [ma-n ma-n MA-WAN]
[a-go a-go A-KON] yo ri [a-go a-go A-KON]

[ma-n ma-n MA-WAN] yo ri [ma-n ma-n MA-WAN]
[a-do a-do A-DON] yo ri mo [a-do a-do A-DON]
[a-do a-do A-DON] yo ri mo [na-n na-n NA-WAN]
[na-n na-n NA-WAN] yo ri mo [a-do a-do A-DON]
[na-n na-n NA-WAN] yo ri mo [na-n na-n NA-WAN]
[a-go a-go A-KON] TO [a-go a-go A-KON]
```

FIG.2C

```
[a-go a-go A-KON] KYOKU TO [a-go a-go A-KON]

[ma-n ma-n MA-WAN] KYOKU TO [ma-n ma-n MA-WAN]
[a-go a-go A-KON] HOKU TO [a-go a-go A-KON]

[ma-n ma-n MA-WAN] HOKU TO [ma-n ma-n MA-WAN]
[a-do a-do A-DON] HOKU HOKU TO [a-do a-do A-DON]
[a-do a-do A-DON] HOKU HOKU TO [na-n na-n NA-WAN]
[na-n na-n NA-WAN] HOKU HOKU TO [a-do a-do A-DON]
[na-n na-n NA-WAN] HOKU HOKU TO [na-n na-n NA-WAN]
[a-go a-go A-KON] NAN TO [a-go a-go A-KON]

[ma-n ma-n MA-WAN] NAN TO [ma-n ma-n MA-WAN]
[a-do a-do A-DON] NAN NAN TO [a-do a-do A-DON]
[a-do a-do A-DON] NAN NAN TO [na-n na-n NA-WAN]
[na-n na-n NA-WAN] NAN NAN TO [a-do a-do A-DON]
[na-n na-n NA-WAN] NAN NAN TO [na-n na-n NA-WAN]
[a-go a-go A-KON] KAN TO [a-go a-go A-KON]

[ma-n ma-n MA-WAN] KAN TO [ma-n ma-n MA-WAN]
[a-go a-go A-KON] KAN SAI [a-go a-go A-KON]

[ma-n ma-n MA-WAN] KAN SAI [ma-n ma-n MA-WAN]
[a-go a-go A-KON] TO HOKU [a-go a-go A-KON]

[ma-n ma-n MA-WAN] TO HOKU [ma-n ma-n MA-WAN]
[a-go a-go A-KON] A [a-go a-go A-KON]
```

FIG.2D

[ma-n ma-n MA-WAN] A [ma-n ma-n MA-WAN]
[a-go a-go A-KON] A EN [a-go a-go A-KON]

[ma-n ma-n MA-WAN] A EN [ma-n ma-n MA-WAN]
[a-do a-do A-DON] A EN BAN [a-do a-do A-DON]
[a-do a-do A-DON] A EN BAN [na-n na-n NA-WAN]
[na-n na-n NA-WAN] A EN BAN [a-do a-do A-DON]
[na-n na-n NA-WAN] A EN BAN [na-n na-n NA-WAN]
Σ  A NICHI DEN SHI Σ
A NICHI DEN SHI KO GYO
[a-go a-go A-KON] DEN [a-go a-go A-KON]

[ma-n ma-n MA-WAN] DEN [ma-n ma-n MA-WAN]

FIG.2E

```
[a-go a-go A-KON] DEN SHI [a-go a-go A-KON]

[ma-n ma-n MA-WAN] DEN SHI [ma-n ma-n MA-WAN]
Σ   DEN SHI su pi n
DEN SHI su pi n Σ
[a-do a-do A-DON] DEN SHI UN [a-do a-do A-DON]
[a-do a-do A-DON] DEN SHI UN [na-n na-n NA-WAN]
[na-n na-n NA-WAN] DEN SHI UN [a-do a-do A-DON]
[na-n na-n NA-WAN] DEN SHI UN [na-n na-n NA-WAN]
Σ   DEN SHI MITU DO Σ
Σ   DEN SHI KI KI Σ
[a-go a-go A-KON] KAKU [a-go a-go A-KON]

[ma-n ma-n MA-WAN] KAKU [ma-n ma-n MA-WAN]
KAKU su pi n KYO MEI
[a-do a-do A-DON] su pi n [a-do a-do A-DON]
[a-do a-do A-DON] su pi n [na-n na-n NA-WAN]
[na-n na-n NA-WAN] su pi n [a-do a-do A-DON]
[na-n na-n NA-WAN] su pi n [na-n na-n NA-WAN]
Σ   su pi n KYO MEI
su pi n KYO MEI Σ
su pi n KYO MEI KYU SHU
[a-go a-go A-KON] CHII sa [a-go a-go A-KON]

[ma-n ma-n MA-WAN] CHII sa [ma-n ma-n MA-WAN]
[a-go a-go A-KON] OH ki [a-go a-go A-KON]

[ma-n ma-n MA-WAN] OH ki [ma-n ma-n MA-WAN]
[a-go a-go A-KON] SO CHI [a-go a-go A-KON]
```

FIG.2F

```
[ma-n ma-n MA-WAN] SO CHI [ma-n ma-n MA-WAN]
Σ   KYO MEI SO CHI   Σ
[a-go a-go A-KON] NICHI DEN [a-go a-go A-KON]

[ma-n ma-n MA-WAN] NICHI DEN [ma-n ma-n MA-WAN]
```

FIG.3

| |
|---|
| FIG. 3A |
| FIG. 3B |
| FIG. 3C |

FIG.3A

```
[a-go a-go A-KON] no de [a-go a-go A-KON]  → ([a-go a-go A-KON] no
  [sa-do sa-do SA-DON] .1). ([na-po na-po NA-BON] de [a-go a-go A-KON].2)
[a-go a-go A-KON] no de [sa-do sa-do SA-DON]  → ([a-go a-go A-KON] no
  [sa-do sa-do SA-DON] .1). ([na-po na-po NA-BON] de [sa-do sa-do
  SA-DON].2)
[a-go a-go A-KON] no de [na-po na-po NA-BON]  → ([a-go a-go A-KON] no
  [sa-do sa-do SA-DON] .1). ([na-po na-po NA-BON] de [na-po na-po
  NA-BON].2)
[a-go a-go A-KON] no de [ma-n ma-n MA-WAN]  → ([a-go a-go A-KON] no
  [sa-do sa-do SA-DON] .1). ([na-po na-po NA-BON] de [ma-n ma-n
  MAWAN].2)
[sa-do sa-do SA-DON] no de [a-go a-go A-KON]  → ([sa-do sa-do SA-DON]no
  [sa-do sa-do SA-DON] .1). ([na-po na-po NA-BON] de [a-go a-go
  A-KON].2)
[sa-do sa-do SA-DON] no de [sa-do sa-do SA-DON]  → ([sa-do sa-do SA-DON]
  no [sa-do sa-do SA-DON] .1). ([na-po na-po NA-BON] de [sa-do sa-do
  SA-DON].2)
[sa-do sa-do SA-DON] no de [na-po na-po NA-BON]  →([sa-do sa-do SA-DON]
  no [sa-do sa-do SA-DON] .1). ([na-po na-po NA-BON] de [na-po na-po
  NA-BON].2)
[sa-do sa-do SA-DON] no de [ma-n ma-n MA-WAN]  →([sa-do sa-do SA-DON]no
  [sa-do sa-do SA-DON].1). ([na-po na-po NA-BON] de [ma-n ma-n MA-WAN].2)
[na-po na-po NA-BON] no de [a-go a-go A-KON]  →([ na-po na-po NA-BON]no
  [sa-do sa-do SA-DON] .1). ([na-po na-po NA-BON] de [a-go a-go A-KON].2)
[na-po na-po NA-BON] no de [sa-do sa-do SA-DON]  →([ na-po na-po NA-BON]
  no[sa-do sa-do SA-DON] .1). ([na-po na-po NA-BON] de [sa-do sa-do
  SA-DON].2)
[na-po na-po NA-BON] no de [na-po na-po NA-BON]  →([ na-po na-po NA-BON]
  no[sa-do sa-do SA-DON] .1). ([na-po na-po NA-BON] de [na-po na-po
  NA-BON].2)
[na-po na-po NA-BON] no de [ma-n ma-n MA-WAN]  →([ na-po na-po NA-BON]
  no[sa-do sa-do SA-DON] .1). ([na-po na-po NA-BON] de [ma-n ma-n
  MA-WAN].2)
```

FIG.3B

[ma-n ma-n MA-WAN] no de [a-go a-go A-KON] →([ ma-n ma-n MA-WAN] no
  [sa-do sa-do SA-DON].1). ([na-po na-po NA-BON] de [a-go a-go A-KON].2)
[ma-n ma-n MA-WAN] no de [sa-do sa-do SA-DON] →([ ma-n ma-n MA-WAN]
  no[sa-do sa-do SA-DON] .1). ([na-po na-po NA-BON] de [sa-do sa-do
  SA-DON].2)
[ma-n ma-n MA-WAN] no de [na-po na-po NA-BON] →([ ma-n ma-n MA-WAN]
  no[sa-do sa-do SA-DON] .1). ([na-po na-po NA-BON] de [na-po na-po
  NA-BON].2)
[ma-n ma-n MA-WAN] no de [ma-n ma-n MA-WAN] →([ ma-n ma-n MA-WAN]
  no[sa-do sa-do SA-DON] .1). ([na-po na-po NA-BON] de [ma-n ma-n
  MA-WAN].2)

[a-go a-go A-KON] KYOKU TO [a-go a-go A-KON] → ([a-go a-go A-KON] TO
  [a-go a-go A-KON] .2)
[a-go a-go A-KON] KYOKU TO [sa-do sa-do SA-DON] → ([a-go a-go A-KON]
  TO [sa-do sa-do SA-DON] .2)
[a-go a-go A-KON] KYOKU TO [na-po na-po NA-BON] → ([a-go a-go A-KON]
  TO [na-po na-po NA-BON] .2)
[a-go a-go A-KON] KYOKU TO [ma-n ma-n MA-WAN] → ([a-go a-go A-KON]
  TO [ma-n ma-n MA-WAN] .2)
[sa-do sa-do SA-DON] KYOKU TO [a-go a-go A-KON] → ([a-go a-go A-KON]
  TO [a-go a-go A-KON] .2)
[sa-do sa-do SA-DON] KYOKU TO [sa-do sa-do SA-DON] → ([a-go a-go A-KON]
  TO [sa-do sa-do SA-DON] .2)
[sa-do sa-do SA-DON] KYOKU TO [na-po na-po NA-BON] → ([a-go a-go A-KON]
  TO [na-po na-po NA-BON] .2)
[sa-do sa-do SA-DON] KYOKU TO [ma-n ma-n MA-WAN] → ([a-go a-go A-KON]
  TO [ma-n ma-n MA-WAN] .2)
[na-po na-po NA-BON] KYOKU TO [a-go a-go A-KON] → ([a-go a-go A-KON]
  TO [a-go a-go A-KON] .2)
[na-po na-po NA-BON] KYOKU TO [sa-do sa-do SA-DON] → ([a-go a-go A-KON]
  TO [sa-do sa-do SA-DON] .2)
[na-po na-po NA-BON] KYOKU TO [na-po na-po NA-BON] → ([a-go a-go A-KON]
  TO [na-po na-po NA-BON] .2)
[na-po na-po NA-BON] KYOKU TO [ma-n ma-n MA-WAN] → ([a-go a-go A-KON]
  TO [ma-n ma-n MA-WAN] .2)

FIG.3C

[ma-n ma-n MA-WAN] KYOKU TO [a-go a-go A-KON] → ([a-go a-go A-KON]
    TO [a-go a-go A-KON] .2)
[ma-n ma-n MA-WAN] KYOKU TO [sa-do sa-do SA-DON] → ([a-go a-go A-KON]
    TO [sa-do sa-do SA-DON] .2)
[ma-n ma-n MA-WAN] KYOKU TO [na-po na-po NA-BON] → ([a-go a-go KON]
    TO [na-po na-po NA-BON] .2)
[ma-n ma-n MA-WAN] KYOKU TO [ma-n ma-n MA-WAN] → ([a-go a-go KON]
    TO [ma-n ma-n MA-WAN] .2)

```
[a-go a-go A-KON] HOKU TO [a-go a-go A-KON] → ([na-po na-po NA-BON] TO
    [a- go a-go A-KON] .2)
[a-go a-go A-KON] HOKU TO [sa-do sa-do SA-DON] → ([na-po na-po NA-BON]
    TO [sa-do sa-do SA-DON] .2)
[a-go a-go A-KON] HOKU TO [na-po na-po NA-BON] → ([na-po na-po NA-BON]
    TO [na-po na-po NA-BON] .2)
[a-go a-go A-KON] HOKU TO [ma-n ma-n MA-WAN] → ([na-po na-po NA-BON] TO
    [ma-n ma-n MA-WAN] .2)
[sa-do sa-do SA-DON]  HOKU TO [a-go a-go A-KON] → ([na-po na-po NA-BON]
    TO [a-go a-go A-KON] .2)
[sa-do sa-do SA-DON]  HOKU TO [sa-do sa-do SA-DON] → ([na-po na-po
    NA-BON]  TO [sa-do sa-do SA-DON] .2)
[sa-do sa-do SA-DON]  HOKU TO [na-po na-po NA-BON] → ([na-po na-po
    NA-BON]  TO [na-po na-po NA-BON] .2)
[sa-do sa-do SA-DON]  HOKU TO [ma-n ma-n MA-WAN] → ([na-po na-po
    NA-BON]  TO [ma-n ma-n MA-WAN] .2)
```

FIG.4B

```
[na-po na-po NA-BON] HOKU TO [a-go a-go A-KON] → ([na-po na-po NA-BON]
    TO [a-go a-go A-KON] .2)
[na-po na-po NA-BON]  HOKU TO [sa-do sa-do SA-DON] → ([na-po na-po
    NA-BON] TO [sa-do sa-do SA-DON] .2)
[na-po na-po NA-BON]  HOKU TO [na-po na-po NA-BON] → ([na-po na-po
    NA-BON] TO [na-po na-po NA-BON] .2)
[na-po na-po NA-BON]  HOKU TO [ma-n ma-n MA-WAN] → ([na-po na-po
    NA-BON] TO [ma-n ma-n MA-WAN] .2)
[ma-n ma-n MA-WAN]  HOKU TO [a-go a-go A-KON] → ([na-po na-po NA-BON]
    TO [a-go a-go A-KON] .2)
[ma-n ma-n MA-WAN]  HOKU TO [sa-do sa-do SA-DON] → ([na-po na-po
    NA-BON] TO [sa-do sa-do SA-DON] .2)
[ma-n ma-n MA-WAN]  HOKU TO [na-po na-po NA-BON] → ([na-po na-po
    NA-BON] TO [na-po na-po NA-BON] .2)
[ma-n ma-n MA-WAN]  HOKU TO [ma-n ma-n MA-WAN] → ([na-po na-po NA-BON]
    TO [ma-n ma-n MA-WAN] .2)
[a-go a-go A-KON]  NAN TO [a-go a-go A-KON] → ([na-po na-po NA-BON] TO
    [a- go a-go A-KON] .2)
[a-go a-go A-KON]  NAN TO [sa-do sa-do SA-DON] → ([na-po na-po NA-BON]
    TO [sa-do sa-do SA-DON] .2)
[a-go a-go A-KON]  NAN TO [na-po na-po NA-BON] → ([na-po na-po NA-BON]
    TO [na-po na-po NA-BON] .2)
[a-go a-go A-KON]  NAN TO [ma-n ma-n MA-WAN] → ([na-po na-po NA-BON]
    TO [ma-n ma-n MA-WAN] .2)
[sa-do sa-do SA-DON]  NAN TO [a-go a-go A-KON] → ([na-po na-po NA-BON]
    TO [a-go a-go A-KON] .2)
[sa-do sa-do SA-DON]  NAN TO [sa-do sa-do SA-DON] → ([na-po na-po
    NA-BON] TO [sa-do sa-do SA-DON] .2)
[sa-do sa-do SA-DON]  NAN TO [na-po na-po NA-BON] → ([na-po na-po
    NA-BON] TO [na-po na-po NA-BON] .2)
[sa-do sa-do SA-DON]  NAN TO [ma-n ma-n MA-WAN] → ([na-po na-po
    NA-BON] TO [man-n ma-n MA-WAN] .2)
```

FIG.4C

```
[na-po na-po NA-BON] NAN TO [a-go a-go A-KON] → ([na-po na-po NA-BON]
   TO [a-go a-go A-KON] .2)
[na-po na-po NA-BON]  NAN TO [sa-do sa-do SA-DON] → ([na-po na-po
   NA-BON] TO [sa-do sa-do SA-DON] .2)
[na-po na-po NA-BON] NAN TO [na-po na-po NA-BON] → ([na-po na-po
   NA-BON] TO [na-po na-po NA-BON] .2)
[na-po na-po NA-BON]  NAN TO [ma-n ma-n MA-WAN] → ([na-po na-po NA-BON]
   TO [ma-n ma-n MA-WAN] .2)
[ma-n ma-n MA-WAN]  NAN TO [a-go a-go A-KON] → ([na-po na-po NA-BON]
   TO [a-go a-go A-KON] .2)
[ma-n ma-n MA-WAN]  NAN TO [sa-do sa-do SA-DON] → ([na-po na-po
   NA-BON] TO [sa-do sa-do SA-DON] .2)
[ma-n ma-n MA-WAN]  NAN TO [na-po na-po NA-BON] → ([na-po na-po NA-BON]
TO [na-po na-po NA-BON] .2)
[ma-n ma-n MA-WAN] NAN TO [ma-n ma-n MA-WAN] → ([na-po na-po NA-BON] TO
   [ma-n ma-n MA-WAN] .2)
```

FIG.5

| |
|---|
| FIG. 5A |
| FIG. 5B |

FIG. 5A

```
[a-go a-go A-KON] KAN TO [a-go a-go A-KON] → ([a-go a-go A-KON]  TO
    [a- go a-go A-KON] .2)
[a-go a-go A-KON] KAN TO [sa-do sa-do SA-DON] → ([a-go a-go A-KON] TO
    [sa-do sa-do SA-DON] .2)
[a-go a-go A-KON] KAN TO [na-po na-po NA-BON] → ([a-go a-go A-KON]
    TO [na-po na-po NA-BON] .2)
[a-go a-go A-KON] KAN TO [ma-n ma-n MA-WAN] → ([a-go a-go A-KON]
    TO [ma-n ma-n MA-WAN] .2)
[sa-do sa-do SA-DON] KAN TO [a-go a-go A-KON] → ([a-go a-go A-KON]
    TO [a-go a-go A-KON] .2)
[sa-do sa-do SA-DON] KAN TO [sa-do sa-do SA-DON] → ([a-go a-go A-KON]
    TO [sa-do sa-do SA-DON] .2)
[sa-do sa-do SA-DON] KAN TO [na-po na-po NA-BON] → ([a-go a-go A-KON]
    TO [na-po na-po NA-BON] .2)
[sa-do sa-do SA-DON] KAN TO [ma-n ma-n MA-WAN] → ([a-go a-go A-KON]
    TO [ma-n ma-n MA-WAN] .2)
[na-po na-po NA-BON] KAN TO [a-go a-go A-KON] → ([a-go a-go A-KON]
    TO [a-go a-go A-KON] .2)
[na-po na-po NA-BON] KAN TO [sa-do sa-do SA-DON] → ([a-go a-go A-KON]
    TO [sa-do sa-do SA-DON] .2)
[na-po na-po NA-BON] KAN TO [na-po na-po NA-BON] → ([a-go a-go A-
    KON]  TO [na-po na-po NA-BON] .2)
[na-po na-po NA-BON] KAN TO [ma-n ma-n MA-WAN] → ([a-go a-go A-
    KON]  TO [ma-n ma-n MA-WAN] .2)
[ma-n ma-n MA-WAN] KAN TO [a-go a-go A-KON] → ([a-go a-go A-KON]
    TO [a-go a-go A-KON] .2)
[ma-n ma-n MA-WAN] KAN TO [sa-do sa-do SA-DON] → ([a-go a-go A-KON]
    TO [sa-do sa-do SA-DON] .2)
[ma-n ma-n MA-WAN] KAN TO [na-po na-po NA-BON] → ([a-go a-go KON]
    TO [na-po na-po NA-BON] .2)
[ma-n ma-n MA-WAN] KAN TO [ma-n ma-n MA-WAN] → ([a-go a-go KON]
    TO [ma-n ma-n MA-WAN] .2)
[a-go a-go A-KON] TO HOKU [a-go a-go A-KON] → ([a-go a-go A-KON]  TO
    [na-po na-po NA-BON] .1)
```

FIG. 5B

[a-go a-go A-KON] TO HOKU [sa-do sa-do SA-DON] → ([a-go a-go A-KON]
   TO [na-po na-po NA-BON] .1)
[a-go a-go A-KON] TO HOKU [na-po na-po NA-BON] → ([a-go a-go A-KON]
   TO [na-po na-po NA-BON] .1)
[a-go a-go A-KON] TO HOKU [ma-n ma-n MA-WAN] → ([a-go a-go A-KON]
   TO [na-po na-po NA-BON] .1)
[sa-do sa-do SA-DON] TO HOKU [a-go a-go A-KON] → ([sa-do sa-do
   SA-DON] TO [na-po na-po NA-BON] .1)
[sa-do sa-do SA-DON] TO HOKU [sa-do sa-do SA-DON] → ([sa-do sa-do
   SA-DON] TO [na-po na-po NA-BON] .1)
[sa-do sa-do SA-DON] TO HOKU [na-po na-po NA-BON] → ([sa-do sa-do SA-
   DON] TO [na-po na-po NA-BON] .1)
[sa-do sa-do SA-DON] TO HOKU [ma-n ma-n MA-WAN] → ([sa-do sa-do SA-
   DON] TO [na-po na-po NA-BON] .1)
[na-po na-po NA-BON] TO HOKU [a-go a-go A-KON] → ([na-po na-po NA-
   BON] TO [na-po na-po NA-BON] .1)
[na-po na-po NA-BON] TO HOKU [sa-do sa-do SA-DON] → ([na-po na-po NA-
   BON] TO [na-po na-po NA-BON] .1)
[na-po na-po NA-BON] TO HOKU [na-po na-po NA-BON] → ([na-po na-po NA-
   BON] TO [na-po na-po NA-BON] .1)
[na-po na-po NA-BON] TO HOKU [ma-n ma-n MA-WAN] → ([na-po na-po NA-
   BON] TO [na-po na-po NA-BON] .1)
[ma-n ma-n MA-WAN] TO HOKU [a-go a-go A-KON] → ([ma-n ma-n MA-
   WAN] TO [na-po na-po NA-BON] .1)
[ma-n ma-n MA-WAN] TO HOKU [sa-do sa-do SA-DON] → ([ma-n ma-n MA-
   WAN] TO [na-po na-po NA-BON] .1)
[ma-n ma-n MA-WAN] TO HOKU [na-po na-po NA-BON] → ([ma-n ma-n MA-
   WAN] TO [na-po na-po NA-BON] .1)
[ma-n ma-n MA-WAN] TO HOKU [ma-n ma-n MA-WAN] → ([ma-n ma-n MA-
   WAN] TO [na-po na-po NA-BON] .1)

FIG. 6

| FIG. 6A |
|---|
| FIG. 6B |

FIG. 6A

```
[a-go a-go A-KON] A EN [a-go a-go A-KON] → ([a-go a-go A-KON] A
    [a-go a-go A-KON] .1)
[a-go a-go A-KON] A EN [sa-do sa-do SA-DON] → ([a-go a-go A-KON] A
    [sa-do sa-do SA-DON] .1)
[a-go a-go A-KON]  A EN [na-po na-po NA-BON] → ([a-go a-go A-KON]  A
    [na-po na-po NA-BON] .1)
[a-go a-go A-KON]  A EN [ma-n ma-n MA-WAN] → ([a-go a-go A-KON]  A
    [ma-n ma-n MA-WAN] .1)
[sa-do sa-do SA-DON]  A EN [a-go a-go A-KON] → ([sa-do sa-do SA-DON]
    A [a-go a-go A-KON] .1)
[sa-do sa-do SA-DON]  A EN [sa-do sa-do SA-DON] → ([sa-do sa-do
    SA-DON] A [sa-do sa-do SA-DON] .1)
[sa-do sa-do SA-DON]  A EN [na-po na-po NA-BON] → ([sa-do sa-do SA-
    DON] A [na-po na-po NA-BON] .1)
[sa-do sa-do SA-DON]  A EN [ma-n ma-n MA-WAN] → ([sa-do sa-do SA-DON]
    A [ma-n ma-n MA-WAN] .1)
[na-po na-po NA-BON]  A EN [a-go a-go A-KON] → ([na-po na-po NA-BON]
    A [a-go a-go A-KON] .1)
[na-po na-po NA-BON]  A EN [sa-do sa-do SA-DON] → ([na-po na-po NA
    -BON] A [sa-do sa-do SA-DON] .1)
[na-po na-po NA-BON] A EN [na-po na-po NA-BON] → ([na-po na-po
    NABON] A [na-po na-po NA-BON] .1)
[na-po na-po NA-BON] A EN [ma-n ma-n MA-WAN] → ([na-po na-po NABON]
    A [ma-n ma-n MA-WAN] .1)
[ma-n ma-n MA-WAN]  A EN [a-go a-go A-KON] → ([ma-n ma-n MA-WAN]
    A [a-go a-go A-KON] .1)
[ma-n ma-n MA-WAN]  A EN [sa-do sa-do SA-DON] → ([ma-n ma-n MA-WAN]
    A [sa-do sa-do SA-DON] .1)
[ma-n ma-n MA-WAN]  A EN [na-po na-po NA-BON] → ([ma-n manMAWAN]
    A [na-po na-po NA-BON] .1)
[ma-n ma-n MA-WAN]  A EN [ma-n ma-n MA-WAN] → ([ma-n manMAWAN]
    A [ma-n ma-n MA-WAN] .1)
Σ A NICHI DEN SHI Σ → ([a-go a-go A-KON] NI CHI DEN [sa-do sa-do
    SA-DON] .2)
```

FIG. 6B

```
A NICHI DEN SHI KO GYO → ([a-go a-go A-KON] NI CHI DEN[sa-do sa-do
    SADON].1)
[a-go a-go A-KON] DEN SHI [a-go a-go A-KON] → ([a-go a-go A-KON] DEN
    [sa-do sa-do SA-DON] .1)
[a-go a-go A-KON] DEN SHI [sa-do sa-do SA-DON] → ([a-go a-go A-KON]
    DEN [sa-do sa-do SA-DON] .1)
[a-go a-go A-KON] DEN SHI[na-po na-po NA-BON] → ([a-go a-go A-KON]
    DEN [sa-do sa-do SA-DON] .1)
[a-go a-go A-KON] DEN SHI[ma-n ma-n MA-WAN] → ([a-go a-go A-KON] DEN
    [sa-do sa-do SA-DON] .1)
[sa-do sa-do SA-DON] DEN SHI[a-go a-go A-KON] → ([sa-do sa-do SA
    -DON] DEN [sa-do sa-do SA-DON] .1)
[sa-do sa-do SA-DON] DEN SHI[sa-do sa-do SA-DON] → ([sa-do sa-do
    SA-DON] DEN[sa-do sa-do SA-DON] .1)
[sa-do sa-do SA-DON] DEN SHI[na-po na-po NA-BON] → ([sa-do sa-do
    SA-DON] DEN [sa-do sa-do SA-DON] .1)
[sa-do sa-do SA-DON] DEN SHI[ma-n ma-n MA-WAN] → ([sa-do sa-do
    SA-DON] DEN [sa-do sa-do SA-DON] .1)
[na-po na-po NA-BON] DEN SHI[a-go a-go A-KON] → ([na-po na-po
    NA-BON] DEN [sa-do sa-do SA-DON] .1)
[na-po na-po NA-BON] DEN SHI[sa-do sa-do SA-DON] → ([na-po na-po
    NA-BON]  DEN [sa-do sa-do SA-DON] .1)
[na-po na-po NA-BON] DEN SHI[na-po na-po NA-BON] → ([na-po na-po
    NABON]  DEN [sa-do sa-do SA-DON] .1)
[na-po na-po NA-BON] DEN SHI[ma-n ma-n MA-WAN] → ([na-po na-po
    NABON]  DEN [sa-do sa-do SA-DON] .1)
[ma-n ma-n MA-WAN] DEN SHI[a-go a-go A-KON] → ([ma-n ma-n MA-WAN]
    DEN [sa-do sa-do SA-DON] .1)
[ma-n ma-n MA-WAN] DEN SHI[sa-do sa-do SA-DON] → ([ma-n ma-n MA-
    WAN] DEN [sa-do sa-do SA-DON] .1)
[ma-n ma-n MA-WAN] DEN SHI[na-po na-po NA-BON] → ([ma-n manMAWAN]
    DEN [sa-do sa-do SA-DON] .1)
[ma-n ma-n MA-WAN] DEN SHI[ma-n ma-n MA-WAN] → ([ma-nmanMAWAN]
    DEN [sa-do sa-do SA-DON] .1)
KAKU su pi n KYO MEI →  ([a-do a-do A-DON] su pi n [a-do a-do A-
    DON] .1). ( ( su pi n KYO MEI.1)
```

FIG.7

| |
|---|
| FIG. 7A |
| FIG. 7B |

FIG. 7A

```
1               5              10              15
A NICHI DEN SHI no DEN SHI su pi n KYO MEI SO CHI ha KAN TO TO A 20              25             30
DEN SHI no yo ri DEN SHI UN ga O ki i

① NICHI DEN  ②
      ┌─────────────┐
      │ ③  DEN   ② │
      └─────────────┘
        ③ DEN SHI  ③
              ②  no  ②
              ┌─────────────┐
              │  ③  DEN  ② │
              └─────────────┘
                    ③ DEN SHI  ②
                    Σ  DEN SHI su pi n
                          ⑤  su pi n ⑤
                    DEN SHI su pi n   Σ
                       Σ  su pi n KYO MEI
                          su pi n KYO MEI  Σ
                                ④ SO CHI  ③
                                    ②  ha  ①
                                     ③  KAN TO  ②
                                        ┌─────────────┐
                                        │ ①  TO   ② │
                                        └─────────────┘
                                            ②  TO  ①
```

FIG. 7B

② A ②
① DEN ②
① DEN SHI ③
② no ④
③ yo ri ②
④ DEN ②
④ DEN SHI ①
⑤ DEN SHI UN ⑤
① ga ②
① O ki ①

(Note 1)   [a-go a-go A-KON] is designated at a mark 「①」
          [sa-do sa-do SA-DON] is designated at a mark 「②」
          [na-po na-po NA-BON] is designated at a mark 「③」
          [ma-n ma-n MA-WAN] is designated at a mark 「④」
          [a-do a-do A-DON] is designated at a mark 「⑤」
          [na-n na-n NA-WAN] is designated at a mark 「⑥」

(Note 2)   The interior of 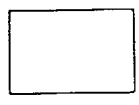 denotes an estimable index element.

FIG. 8

(① ga ②, [27,29])
(② no ②, [4,6])
(② no ④, [21,23])
(② ha ①, [14,16])
(③ yo ri ②, [22,25])
(⑤ su pi n ⑤, [7,11])
(Σ su pi n KYO MEI, [7,12])
(su pi n KYO MEI Σ, [8,13])
(② A ②, [18,20])
(③ KAN TO ② [15,18])
(④ SO CHI ③, [12,15])
(Σ DEN SHI su pi n, [5,10])
(DEN SHI su pi n Σ, [6,11])
(① O ki ①, [28,31])
(① DEN SHI ③, [19,22])
(③ DEN SHI ②, [5,8])
(③ DEN SHI ③ [2,5])
(⑤ DEN SHI UN ⑤, [24,28])
(② TO ①, [17,19])
(① NICHI DEN ②, [1,4])

(Note)  [a-go a-go A-KON] is represented at a mark 「①」
[sa-do sa-do SA-DON] is represented at a mark 「②」
[na-po na-po NA-BON] is represented at a mark 「③」
[ma-n ma-n MA-WAN] is represented at a mark 「④」
[a-do a-do A-DON] is represented at a mark 「⑤」
[na-n na-n NA-WAN] is represented at a mark 「⑥」

FIG.10

| FIG. 10A |
|---|
| FIG. 10B |
| FIG. 10C |
| FIG. 10D |
| FIG. 10E |
| FIG. 10F |

FIG. 10A

```
[? a-go a-go A-KON] i [? a-go a-go A-KON]
[? a-go a-go A-KON] i [sa-do sa-do SA-DON]
[? a-go a-go A-KON] i [na-po na-po NA-BON]
[? a-go a-go A-KON] i [ma-n ma-n MA-WAN]
[sa-do sa-do SA-DON] i [? a-go a-go A-KON]
[sa-do sa-do SA-DON] i [sa-do sa-do SA-DON]
[sa-do sa-do SA-DON] i [na-po na-po NA-BON]
[sa-do sa-do SA-DON] i [ma-n ma-n MA-WAN]
[na-po na-po NA-BON] i [? a-go a-go A-KON]
[na-po na-po NA-BON] i [sa-do sa-do SA-DON]
[na-po na-po NA-BON] i [na-po na-po NA-BON]
[na-po na-po NA-BON] i [ma-n ma-n MA-WAN]
[ma-n ma-n MA-WAN] i [? a-go a-go A-KON]
[ma-n ma-n MA-WAN] i [sa-do sa-do SA-DON]
[ma-n ma-n MA-WAN] i [na-po na-po NA-BON]
[ma-n ma-n MA-WAN] i [ma-n ma-n MA-WAN]
[? a-go a-go A-KON] no [? a-go a-go A-KON]

[ma-n ma-n MA-WAN] no [ma-n ma-n MA-WAN]
[? a-go a-go A-KON] no de [? a-go a-go A-KON]
[? a-go a-go A-KON] no de [sa-do sa-do SA-DON]
[? a-go a-go A-KON] no de [na-po na-po NA-BON]
[? a-go a-go A-KON] no de [ma-n ma-n MA-WAN]
[sa-do sa-do SA-DON] no de [? a-go a-go A-KON]

[ma-n ma-n MA-WAN] no de [ma-n ma-n MA-WAN]
[? a-go a-go A-KON] de [? a-go a-go A-KON]

[ma-n ma-n MA-WAN] de [ma-n ma-n MA-WAN]
[? a-go a-go A-KON] ha [? a-go a-go A-KON]
```

FIG. 10B

```
[ma-n ma-n MA-WAN] ha [ma-n ma-n MA-WAN]
[? a-go a-go A-KON] yo ri [? a-go a-go A-KON]

[ma-n ma-n MA-WAN] yo ri [ma-n ma-n MA-WAN]
[? a-do a-do A-DON] yo ri mo [? a-do a-do A-DON]
[? a-do a-do A-DON] yo ri mo [na-n na-n NA-WAN]
[na-n na-n NA-WAN] yo ri mo [? a-do a-do A-DON]
[na-n na-n NA-WAN] yo ri mo [na-n na-n NA-WAN]
[? a-go a-go A-KON] TO [? a-go a-go A-KON]

[ma-n ma-n MA-WAN] TO [ma-n ma-n MA-WAN]
```

FIG. 10C

```
[? a-go a-go A-KON] KYOKU TO [? a-go a-go A-KON]

[ma-n ma-n MA-WAN] KYOKU TO [ma-n ma-n MA-WAN]
[? a-go a-go A-KON] HOKU TO [? a-go a-go A-KON]

[ma-n ma-n MA-WAN] HOKU TO [ma-n ma-n MA-WAN]
[? a-do a-do A-DON] HOKU HOKU TO [? a-do a-do A-DON]
[? a-do a-do A-DON] HOKU HOKU TO [na-n na-n NA-WAN]
[na-n na-n NA-WAN] HOKU HOKU TO [? a-do a-do A-DON]
[na-n na-n NA-WAN] HOKU HOKU TO [na-n na-n NA-WAN]
[? a-go a-go A-KON] NAN TO [? a-go a-go A-KON]

[ma-n ma-n MA-WAN] NAN TO [ma-n ma-n MA-WAN]
[? a-do a-do A-DON] NAN NAN TO [? a-do a-do A-DON]
[? a-do a-do A-DON] NAN NAN TO [na-n na-n NA-WAN]
[na-n na-n NA-WAN] NAN NAN TO [? a-do a-do A-DON]
[na-n na-n NA-WAN] NAN NAN TO [na-n na-n NA-WAN]
[? a-go a-go A-KON] KAN TO [? a-go a-go A-KON]

[ma-n ma-n MA-WAN] KAN TO [ma-n ma-n MA-WAN]
[? a-go a-go A-KON] KAN SAI [? a-go a-go A-KON]

[ma-n ma-n MA-WAN] KAN SAI [ma-n ma-n MA-WAN]
[? a-go a-go A-KON] TO HOKU [? a-go a-go A-KON]

[ma-n ma-n MA-WAN] TO HOKU [ma-n ma-n MA-WAN]
[? a-go a-go A-KON] A [? a-go a-go A-KON]
```

FIG. 10D

```
[ma-n ma-n MA-WAN] A [ma-n ma-n MA-WAN]
[? a-go a-go A-KON] A EN [? a-go a-go A-KON]

[ma-n ma-n MA-WAN] A EN [ma-n ma-n MA-WAN]
[? a-do a-do A-DON] A EN BAN [? a-do a-do A-DON]
[? a-do a-do A-DON] A EN BAN [na-n na-n NA-WAN]
[na-n na-n NA-WAN] A EN BAN [? a-do a-do A-DON]
[na-n na-n NA-WAN] A EN BAN [na-n na-n NA-WAN]
Σ A NICHI DEN SHI Σ
A NICHI DEN SHI KO GYO
[? a-go a-go A-KON] DEN [? a-go a-go A-KON]

[ma-n ma-n MA-WAN] DEN [ma-n ma-n MA-WAN]
```

FIG. 10E

```
[? a-go a-go A-KON] DEN SHI [? a-go a-go A-KON]

[ma-n ma-n MA-WAN] DEN SHI [ma-n ma-n MA-WAN]
Σ DEN SHI su pi n
DEN SHI su pi n Σ
[? a-do a-do A-DON] DEN SHI UN [? a-do a-do A-DON]
[? a-do a-do A-DON] DEN SHI UN [na-n na-n NA-WAN]
[na-n na-n NA-WAN] DEN SHI UN [? a-do a-do A-DON]
[na-n na-n NA-WAN] DEN SHI UN [na-n na-n NA-WAN]
Σ DEN SHI MITSU DO Σ
Σ DEN SHI KI KI Σ
[? a-go a-go A-KON] KAKU [? a-go a-go A-KON]

[ma-n ma-n MA-WAN] KAKU [ma-n ma-n MA-WAN]
KAKU su pi n KYO MEI
[? a-do a-do A-DON] su pi n [? a-do a-do A-DON]
[? a-do a-do A-DON] su pi n [na-n na-n NA-WAN]
[na-n na-n NA-WAN] su pi n [? a-do a-do A-DON]
[na-n na-n NA-WAN] su pi n [na-n na-n NA-WAN]
Σ su pi n KYO MEI
su pi n KYO MEI Σ
su pi n KYO MEI KYU SHU
[? a-go a-go A-KON] CHII sa [? a-go a-go A-KON]

[ma-n ma-n MA-WAN] CHII sa [ma-n ma-n MA-WAN]
[? a-go a-go A-KON] O ki [? a-go a-go A-KON]

[ma-n ma-n MA-WAN] O ki [ma-n ma-n MA-WAN]
[? a-go a-go A-KON] SO CHI [? a-go a-go A-KON]
```

FIG. 10F

[ma-n ma-n MA-WAN] SO CHI [ma-n ma-n MA-WAN]
Σ KYO MEI SO CHI   Σ
[? a-go a-go A-KON] NICHI DEN [? a-go a-go A-KON]

[ma-n ma-n MA-WAN] NICHI DEN [ma-n ma-n MA-WAN]

FIG. 11

| FIG. 11A |
| FIG. 11B |

FIG. 11A

```
0 1              5              10             15
? A NICHI DEN SHI no DEN SHI su pi n KYO MEI SO CHI ha KAN TO 20            25           30  32
TO A DEN SHI no yo ri DEN SHI UN ga O ki i ?

Σ A NICHI DEN SHI Σ
   ┌──────────────────┐
   │ ①  NICHI DEN  ② │
   └──────────────────┘
      ┌──────────────┐
      │ ③  DEN    ② │
      └──────────────┘
         ┌──────────────────┐
         │ ③  DEN SHI    ③ │
         └──────────────────┘
                ②  no  ②
                   ┌──────────────┐
                   │ ③  DEN    ② │
                   └──────────────┘
                      ③ DEN SHI  ②
                      Σ  DEN SHI su pi n
                            ⑤  su pi n  ⑤
                         DEN SHI su pi n  Σ
                            Σ  su pi n KYO MEI
                               su pi n KYO MEI  Σ
                                  ④  SOU CHI  ③
                                     ②  ha  ①
                                        ③  KAN TO  ②
```

①　DEN　②

①　DEN SHI　③
　②　no　④
　　③　yo ri　②

④　DEN　②

④　DEN SHI　①

⑤　DEN SHI UN　⑤
　①　ga　②
　　①　0 ki　①
　　　①　i　①

(Note 1)　　[? a-go a-go A-KON] is noted at a mark　「①」
　　　　　　[sa-do sa-do SA-DON] is denoted at a mark　「②」
　　　　　　[na-po na-po NA-BON] is denoted at a mark　「③」
　　　　　　[ma-n ma-n MA-WAN] is denoted at a mark　「④」
　　　　　　[? a-do a-do A-DON] is denoted at a mark　「⑤」
　　　　　　[na-n na-n NA-WAN] is denoted at a mark　「⑥」

(Note 2)　　The interior of 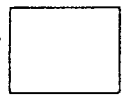 represents an estimable index element.

FIG. 12

(① i ①, [ 30,32])
(① ga ②, [ 27,29])
(② no ②, [4,6])
(② no ④, [21,23])
(② ha ①, [14,16])
(③ yo ri ②, [22,25])
(⑤ su pi n ⑤, [7,11])
(Σ su pi n KYO MEI, [7,12])
(su pi n KYO MEI Σ, [8,13])
(② A ②, [18,20])
(Σ A NICHI DEN SHI Σ, [0,5])
(③ KAN TO ②, [15,18])
(④ SO CHI ③, [12,15])
(Σ DEN SHI su pi n, [5,10])
(DEN SHI su pi n Σ, [6,11])
(① O ki ①, [28,31])
(① DEN SHI ③, [19,22])
(③ DEN SHI ②, [5,8])
(··· DEN SHI UN ···, [24,28])
(② TO ①, [17,19])

(Note)　　[? a-go a-go A-KON] is designated at a mark 「①」
　　　　　[sa-do sa-do SA-DON] is designated at a mark 「②」
　　　　　[na-po na-po NA-BON] is designated at a mark 「③」
　　　　　[ma-n ma-n MA-WAN] is designated at a mark 「④」
　　　　　[? a-do a-do A-DON] is designated at a mark 「⑤」
　　　　　[na-n na-n NA-WAN] is designated at a mark 「⑥」

FIG.14

| FIG. 14A |
|---|
| FIG. 14B |
| FIG. 14C |
| FIG. 14D |

FIG. 14A

```
a
i
u
e
o
ka ne
no
no de
ha
ba yo
yo ri
yo ri mo
ra n
a su
su pi n
su pi n KYO MEI
su pi n KYO MEI KYU SHU
zu
```

FIG. 14B

```
n
A
A
A EN
A EN BAN
A NICHI DEN SHI
A NICHI DEN SHI KO GYO

KAKU
KAKU su pi n KYO MEI
```

FIG. 14C

HOKU
HOKU TO
HOKU HOKU TO

KYOKU
KYOKU TO

KAN
KAN TO
KAN SAI

SO
SO CHI

DEN
DEN SHI
DEN SHI su pi n
DEN SHI UN
DEN SHI MITU DO
DEN SHI KI KI

TO
TO HOKU

FIG. 14D

CHII
CHII sa

O
O ki

NAN
NAN TO
NAN NAN TO

NICHI
NICHI DEN

WAN

FIG. 15

A NICHI DEN SHI no YO DEN SHI su pi n KYO MEI SO CHI ha KAN TO
TO A DEN SHI no yo ri DEN SHI UN ga O ki i

FIG.16

| FIG. 16A |
| FIG. 16B |
| FIG. 16C |

FIG. 16A

```
1              5              10             15
A NICHI DEN SHI no YO DEN SHI su pi n KYO MEI SO CHI ha KAN 20           25         30
TO TO A DEN SHI no yo ri DEN SHI UN ga O ki i

① NICHI ②

① NICHI DEN ②
    ③ DEN ②
         ③ DEN SHI ③
            ② SHI ③
               ② no ②
                ③ YOU ②
                   ③ DEN ②
                      ③ DEN SHI ②
                         ② SHI ②
                            ② su ③
                          Σ DEN SHI su pi n
                               ② pi ④
                                 ⑤ su pi n ⑤
```

DEN SHI su pi n Σ
　　Σ su pi n KYO MEI

④ KYO ④ su pi n KYO MEI Σ
① MEI ②

④ SO ②

④ SO CHI ③

② CHI ③

② ha ①

③ KAN ②

③ KAN TO ②

① TO ②

② TO ①

② A ②

① DEN ②

① DEN SHI ③

FIG. 16C

② SHI ③

② no ④

③ yo ④

③ yo ri ②

④ ri ②

④ DEN ②

④ DEN SHI ①

② SHI ①

⑤ DEN SHI UN ⑤

② UN ①

① ga ②

① 0 ①

① 0 ki ①

② ki ①

| Note 1) | [a-go a-go A-KON] is represented at a mark 「①」 |
| | [sa-do sa-do SA-DON] is represented at a mark 「②」 |
| | [na-po na-po NA-BON] is represented at a mark 「③」 |
| | [ma-n ma-n MA-WAN] is represented at a mark 「④」 |
| | [a-do a-do A-DON] is represented at a mark 「⑤」 |
| | [na-n na-n NA-WAN] is represented at a mark 「⑥」 |
| Note 2) | The interior of ☐ denotes an estimable index element. |

FIG. 17

(① ga ②, [ 27,29])
(② no ②, [ 4,6])
(② no ④, [21,23])
(② ha ①, [14,16])
(③ yo ri ②, [22,25])
(⑤ su pi n ⑤, [ 7,11])
( Σ su pi n KYO MEI, [ 7,12])
(su pi n KYO MEI Σ, [ 8,13])
(② A ②, [18,20])
(② UN ①, [27,29])
(③ KAN TO ②, [15,18])
(④ SO CHI ③, [12,15])
( Σ DEN SHI su pi n ([ 5,10])
( DEN SHI su pi n Σ, [ 6,11])
(① O ki ①, [28,31])
(① DEN SHI ③, [19,22])
(③ DEN SHI ②, [ 5,8])
(③ DEN SHI ③, [ 2,5])
(⑤ DEN SHI UN ⑤, [24,28])
(② TO ①, [17,19])
(① NICHI DEN ②, [ 1,4])
(① MEI ②, [ 12,14])
(③ YO ②, [ 5,7])

(Note)　　　[a-go a-go A-KON] is denoted at a mark 「①」
　　　　　　[sa-do sa-do SA-DON] is denoted at a mark 「②」
　　　　　　[na-po na-po NA-BON] is denoted at a mark 「③」
　　　　　　[ma-n ma-n MA-WAN] is denoted at a mark 「④」
　　　　　　[a-do a-do A-DON] is denoted at a mark 「⑤」
　　　　　　[na-n na-n NA-WAN] is denoted at a mark 「⑥」

FIG.19

| | |
|---|---|
| | FIG. 19A |
| | FIG. 19B |

FIG. 19A

| | |
|---|---|
| i | 120 |
| ga | 1894 |
| no | 3957 |
| no de | 761 |
| de | 1395 |
| ha | 1983 |
| yo ri | 862 |
| yo ri mo | 98 |
| T | 56 |
| KYOKU TO | 21 |
| HOKU TO | 48 |
| HOKU HOKU TO | 7 |
| NAN TO | 54 |
| NAN NAN TO | 10 |
| KAN TO | 292 |
| KAN SAI | 301 |
| TO HOKU | 136 |
| A | 39 |
| A EN | 70 |
| A EN BAN | 13 |
| A NICHI DEN SHI | 8 |
| A NICHI DEN SHI KO GYO | 21 |

FIG. 19B

```
DEN                            9
DEN SHI                      106
DEN SHI su pi n               12
DEN SHI UN                     3
DEN SHI MITSU DO              29
DEN SHI KI KI                 58
KAKU                          60
KAKU su pi n KYO MEI           5
su pi n                       12
su pi n KYO MEI                4
su pi n KYO MEI KYU SHU        1
CHI sa                       107
O ki                          89
SO CHI                       560
NICHI DEN                     86
```

FIG. 20

| |
|---|
| FIG. 20A |
| FIG. 20B |
| FIG. 20C |
| FIG. 20D |

FIG. 20A

```
Σ i Σ
[a-go a-go A-KON] ga [a-go a-go A-KON]

[ma-n ma-n MA-WAN] ga [ma-n ma-n MA-WAN]
[a-go a-go A-KON] no [a-go a-go A-KON]
[a-go a-go A-KON] no [sa-do sa-do SA-DON]
[a-go a-go A-KON] no [na-po na-po NA-BON]
[a-go a-go A-KON] no [ma-n ma-n MA-WAN]
[sa-do sa-do SA-DON] no [a-go a-go A-KON]
[sa-do sa-do SA-DON] no [sa-do sa-do SA-DON]
[sa-do sa-do SA-DON] no [na-po na-po NA-BON]
[sa-do sa-do SA-DON] no [ma-n ma-n MA-WAN]
[na-po na-po NA-BON] no [a-go a-go A-KON]
[na-po na-po NA-BON] no [sa-do sa-do SA-DON]
[na-po na-po NA-BON] no [na-po na-po NA-BON]
[na-po na-po NA-BON] no [ma-n ma-n MA-WAN]
[ma-n ma-n MA-WAN] no [a-go a-go A-KON]
[ma-n ma-n MA-WAN] no [sa-do sa-do SA-DON]
[ma-n ma-n MA-WAN] no [na-po na-po NA-BON]
[ma-n ma-n MA-WAN] no [ma-n ma-n MA-WAN]
[a-do a-do A-DON] no de [a-do a-do A-DON]
[a-do a-do A-DON] no de [na-n na-n NA-WAN]
[na-n na-n NA-WAN] no de [a-do a-do A-DON]
[na-n na-n NA-WAN] no de [na-n na-n NA-WAN]
[a-go a-go A-KON] de [a-go a-go A-KON]
```

FIG. 20B

[ma-n ma-n MA-WAN] de [ma-n ma-n MA-WAN]
[a-go a-go A-KON] ha [a-go a-go A-KON]

[ma-n ma-n MA-WAN] ha [ma-n ma-n MA-WAN]
[a-do a-do A-DON] yo ri [a-do a-do A-DON]
[a-do a-do A-DON] yo ri [na-n na-n NA-WAN]
[na-n na-n NA-WAN] yo ri [a-do a-do A-DON]
[na-n na-n NA-WAN] yo ri [na-n na-n NA-WAN]
Σ yo ri mo Σ
Σ TO Σ

FIG. 20C

```
KYOKU TO
Σ HOKU TO Σ
HOKU HOKU TO
Σ NAN TO Σ
NAN NAN TO
[a-do a-do A-DON] KAN TO [a-do a-do A-DON]
[a-do a-do A-DON] KAN TO [na-n na-n NA-WAN]
[na-n na-n NA-WAN] KAN TO [a-do a-do A-DON]
[na-n na-n NA-WAN] KAN TO [na-n na-n NA-WAN]
[a-do a-do A-DON] KAN SAI [a-do a-do A-DON]
[a-do a-do A-DON] KAN SAI [na-n na-n NA-WAN]
[na-n na-n NA-WAN] KAN SAI [a-do a-do A-DON]
[na-n na-n NA-WAN] KAN SAI [na-n na-n NA-WAN]
Σ TO HOKU Σ
A
Σ A EN Σ
A EN BAN
A NICHI DEN SHI
A NICHI DEN SHI KO GYO
DEN
Σ DEN SHI Σ
```

FIG. 20D

```
DEN SHI su pi n
DEN SHI UN
DEN SHI MITSU DO
Σ DEN SHI KI KI Σ
Σ KAKU Σ
KAKU su pi n KYO MEI
su pi n
su pi n KYO MEI
su pi n KYO MEI KYU SHU
Σ O ki Σ
Σ CHII sa Σ
[a-do a-do A-DON] SO CHI [a-do a-do A-DON]
[a-do a-do A-DON] SO CHI [na-n na-n NA-WAN]
[na-n ma-n MA-WAN] SO CHI [a-do a-go A-KON]
[na-n ma-n MA-WAN] SO CHI [na-n ma-n MA-WAN]
Σ NICHI DEN Σ
```

FIG. 21

| |
|---|
| FIG. 21A |
| FIG. 21B |

FIG. 21A

```
1              5            10            15
A NICHI DEN SHI no DEN SHI su pi n KYO MEI SO CHI ha KAN TO 20           25          30
TO A DEN SHI no yo ri DEN SHI UN ga O ki I
```

```
┌───┐
│ A │
└───┘
    ┌──────────────────┐
    │ Σ NICHI DEN Σ    │
    └──────────────────┘
       A NICHI DEN SHI
        ┌─────┐
        │ DEN │
        └─────┘
          Σ DEN SHI Σ
             ② no ②
             ┌─────┐
             │ DEN │
             └─────┘
               Σ DEN SHI Σ
                 DEN SHI su pi n
                  ┌──────────┐
                  │ su pi n  │
                  └──────────┘
                    su pi n KYO MEI
                       ⑥ SO CHI ⑥
```

FIG. 21B

② ha ①
⑤ KAN TO ⑤

[TO]

TO
A

[DEN]

Σ DEN SHI Σ
② no ④
⑥ yo ri ⑤

[DEN]

[Σ DEN SHI Σ]

⑤ DEN SHI UN ⑤
① ga ②
Σ O ki Σ

(Note 1)  [a-go a-go A-KON] is designated at a mark 「①」
          [sa-do sa-do SA-DON] is designated at a mark 「②」
          [na-po na-po NA-BON] is designated at a mark 「③」
          [ma-n ma-n MA-WAN] is designated at a mark 「④」
          [a-do a-do A-DON] is designated at a mark 「⑤」
          [na-n na-n NA-WAN] is designated at a mark 「⑥」

(Note 2)  The interior of  depicts an estimable index element.

FIG. 22

(① ga ②, [ 27,29])
(② no ②, [4,6])
(② no ④, [21,23])
(② ha ①, [14,16])
(⑥ yo ri ⑤, [22,25])
(su pi n KYO MEI, [8,12])
(A, [19,19])
(A NICHI DEN SHI, [1,4])
(⑤ KAN TO ⑤, [15,18])
(⑥ SO CHI ⑥, [12,15])
(DEN SHI su pi n, [6,10])
(Σ O ki Σ, [28,31])
 (Σ DEN SHI Σ, [19,22])
(Σ DEN SHI Σ, [5,8])
(Σ DEN SHI Σ, [2,5])
(⑤ DEN SHI UN ⑤, [24,28])
(TO, [18,18])

(Note)    [ a-go a-go A-KON] is represented at a mark 「①」
          [sa-do sa-do SA-DON] is represented at a mark 「②」
          [na-po na-po NA-BON] is represented at a mark 「③」
          [ma-n ma-n MA-WAN] is represented at a mark 「④」
          [a-do a-do A-DON] is represented at a mark 「⑤」
          [na-n na-n NA-WAN] is designated at a mark 「⑥」

FIG. 25

RETRIEVAL CONDITION CHARACTER STRING : 「DEN SHI su pi n KYO MEI」

* Word Coat for 「DEN SHI su pi n KYO MEI」 :
  (DEN SHI su pi n, [1,5]), (su pi n KYO MEI, [3,7])

* Extension Normal Expression Set of 「DEN SHI su pi n」
  conforming to 「DEN SHI su pi n KYO MEI」 :
  | Σ DEN SHI su pi n, DEN SHI su pi n Σ |

* Matching Character Positional Range Set of
  | Σ DEN SHI su pi n, DEN SHI su pi n Σ | : |[6, 10]|

* Extension Normal Expression Set of 「 su pi n KYO MEI」
  conforming to 「DEN SHI su pi n KYO MEI」
  | Σ su pi n KYO MEI , su pi n KYO MEI Σ, su pi n KYO MEI KYU SHU |

* Matching Character Positional Range Set of | Σ su pi n KYO MEI , su pi n KYO MEI Σ、 su pi n KYO MEI KYU SHU (: |[8, 12]|

* Of Element Strings in the above-mentioned two kinds of Matching Character Positional Range Sets, Set of Element Strings with Continuous Occurrence Character Position
  : |[6, 10], [8, 12]|

* Retreival Result (Set of Matching Character Positions)
  |6|

FIG.26

| FIG. 26A |
|---|
| FIG. 26B |

FIG. 26A

```
RETRIEVAL CONDITION CHARACTER STRING : 「 TO A DEN SHI 」

* Word Coat for 「 TO A DEN SHI 」 :
    |( TO,[1,1] ) , ( A, [2,2] ) , ( DEN SHI , [ 3,4] ) |

* Extension Normal Expression Set of ( TO,[1,1] )
   conforming to 「 TO A DEN SHI 」 ( :
    | [a-go a-go A-KON] TO[a-go a-go A-KON] , [sa-do sa-do
    SA-DON] TO [a-go a-go  A-KON],
    [na-po na-po NA-BON] TO[a-go a-go A-KON], [ma-n ma-n
    MA-WAN] TO  [a-go a-go A-KON] ,
    [a-go a-go A-KON] KYOKU TO[a-go a-go A-KON],[sa-do sa-do
    SA-DON]  KYOKU TO[a-go a-go A-KON],
    [na-po na-po NA-BON] KYOKU TO [a-go a-go A-KON] ,
    [ ma-n ma-n MA-WAN] KYOKU TO [a-go a-go A-KON],
    [a-go a-go A-KON] HOKU TO [a-go a-go A-KON] , [sa-do sa-do
    SA-DON] HOKU TO [a-go a-go A-KON],
    [na-po na-po NA-BON] HOKU TO [a-go a-go A-KON] , [ma-n ma-n
    MA-WAN] HOKU TO [a-go a-go A-KON] ,
    [a-do a-do A-DON] HOKU HOKU TO [a-do a-do A-DON] ,[na-n na-n
    NA-WAN] HOKU HOKU TO[a-do a-do A-DON] ,
    [a-go a-go A-KON] NAN TO [a-go a-go A-KON] , [sa-do sa-do
    SA-DON] NAN TO [a-go a-go A-KON] ,
    [na-po na-po NA-BON] NAN TO [a-go a-go A-KON] , [ma-n ma-n
    MA-WAN] NAN TO[a-go a-go A-KON] ,
    [a-do a-do A-DON] NAN NAN TO [a-do a-do A-DON] , [na-n na-n
    NA-WAN] NAN NAN TO [a-do a-do A-DON] (

* Matching Character Positional Range Set of the above-
    mentioned Extension Normal Expression Set  : |[ 18,18 ] |

* Extension Normal Expression Set of (A, [2, 2]) conforming to
    「TO A DEN SHI」 :
    | [sa-do sa-do SA-DON] A [sa-do sa-do SA-DON] |
```

FIG. 26B

* Matching Character Positional Range Set of |A| :
  | [19, 19] |

* Extension Normal Expression Set of (DEN SHI,[3,4]) conforming to 「TO A DEN SHI」 :
  | [a-go a-go A-KON] DEN SHI [a-do a-do A-DON], [a-go a-go A-KON] DEN SHI [sa-do sa-do SA-DON] ,
  [a-go a-go A-KON] DEN SHI [na-po na-po NA-BON] , [a-go a-go A-KON] DEN SHI [ma-n ma-n MA-WAN]
  Σ DEN SHI su pi n ,
  [a-do a-do A-DON] DEN SHI UN [a-do a-do A-DON] , [a-do a-do A-DON] DEN SHI UN [na-n na-n NA-WAN] ,
  Σ DEN SHI MITSU DO Σ ,
  Σ DEN SHI KI KI Σ |

* Matching Character Positional Range Set of the above-mentioned Extension Normal Expression Set :
  | [6,7] , [20, 21] |

* Of Element Strings in the above-mentioned three kinds of Matching Character Positional Range Sets, Set of Element Strings with Continuous Occurrence Character Position :
  | ( [18, 18] , [19,19] [20, 21] ) |

* Retreival Result (Set of Matching Character Positions)
  | 18 |

FIG. 29

```
i
no
no de
de
ha
yo ri
yo ri mo
TO
KYOKU TO
HOKU TO
HOKU HOKU TO
NAN TO
NAN NAN TO
KAN TO
KAN SAI
TO HOKU
A
A EN
A EN BAN
A NICHI DEN SHI
A NICHI DEN SHI KO GYO
DEN
DEN SHI
DEN SHI su pi n
DEN SHI UN
DEN SHI MITSU DO
DEN SHI KI KI
KAKU
KAKU su pi n KYO MEI
su pi n
su pi n KYO MEI
su pi n KYO MEI KYU SHU
CHII sa
O ki
SO CHI
NICHI DEN
```

FIG. 30

```
A NICNI DEN SHI no DEN SHI su pi n KYO MEI SO CHI ha KAN TO
TO A DEN SHI no yo ri DEN SHI UN ga O ki I
```

FIG. 31

```
1              5             10             15
A NICNI DEN SHI no DEN SHI su pi n KYO MEI SO CHI ha KAN TO 20            25            30
TO A DEN SHI no yo ri DEN SHI UN ga O ki I

A NICNI DEN SHI
           no
            DEN SHI su pi n
                     su pi n KYO MEI
                             SO CHI
                                   ha
                                     TO
                                      A
                                       DEN SHI
                                              no
                                                yo ri
                                                     DEN SHI UN
                                                              ga
                                                                O ki
                                                                    i
```

FIG. 32 PRIOR ART

```
(i,    [ 31, 31])
(ga ,  [ 28,28])
(no ,  [5,5])
(no ,  [22,22])
(ha ,  [15,15])
(yo ri , [23,23])
(su pi n KYO MEI, [8,12])
(A, [19,19])
(A NICHI DEN SHI, [1,4])
(KAN TO , [16,17])
(SO CHI , [13,14])
(DEN SHI su pi n, [6,10])
(O ki , [29,30])
(DEN SHI , [20,21])
(DEN SHI UN , [25,27])
(TO, [18,18])
```

FIG. 33 PRIOR ART

RETRIEVAL CONDITION CHARACTER STRING : 「DEN SHI su pi n KYO MEI」

* Word Coat for 「DEN SHI su pi n KYO MEI」
  (DEN SHI su pi n, [1,5]), (su pi n KYO MEI, [3,7])

* Extension Word Set of 「DEN SHI su pi n 」 conforming to
  「DEN SHI su pi n KYO MEI」 : | DEN SHI su pi n |

* Matching Character Positional Range Set of | DEN SHI
  su pi n | : | [6,10] |

* Extension Word Set of 「su pi n KYO MEI」 conforming to
  「DEN SHI su pi n KYO MEI」 :
  | su pi n KYO MEI , su pi n KYO MEI KYU SHU |

* Matching Character Positional Range Set of | su pi n
  KYO MEI, su pi n KYO MEI KYU SHU | : | [8,12] |

* Of Element Strings in the above-mentioned two kinds of
  Matching Character Positional Range Sets, Set of Element
  Strings with Continuous Occurrence Character Position :
  | ([6, 10] , [8,12]) |

* Retreival Result (Set of Matching Character Positions)
  | 6 |

FIG. 34 PRIOR ART

RETRIEVAL CONDITION CHARACTER STRING : 「TO A DEN SHI」

* Word Coat for 「TO A DEN SHI」 :   |(TO, [1,1]), (A, [2,2]) ,
  ( DEN SHI ,[3,4])( Extension Word Set of (TO, [1,1]) conforming to 「TO A DEN SHI」
   | TO, KYOKU TO, KAN TO, HOKU TO, HOKU HOKU TO, NAN TO,
   NAN NAN TO |

* Matching Character Positional Range Set of
  | TO, KYOKU TO, KAN TO, HOKU TO, HOKU HOKU TO, NAN TO,
  NAN NAN TO |  | [16, 17], [18, 18] |

* Extension Word Set of ( A, [ 2,2 ] ) conforming to
  「TO A DEN SHI」 :  | A |

* Matching Character Positional Range Set of | A | :
  | [19, 19] |

* Extension Word Set of ( DEN SHI, [ 3,4 ] ) conforming to
  「TO A DEN SHI」 :
  | DEN SHI, DEN SHI su pi n , DEN SHI UN,  DEN SHI
  MITSU DO, DEN SHI KI KI |

* Matching Character Positional Range Set of | DEN SHI,
  DEN SHI su pi n , DEN SHI UN,  DEN SHI MITSU DO, DEN SHI
  KI KI |  |[ 6, 10 ], [20, 21], [25, 27] |

* Of Element Strings in the above-mentioned two kinds of
  Matching Character Positional Range Sets, Set of Element
  Strings with Continuous Character Position :
  | | [18, 18], [19,19 ], [20,21]) |

* Retreival Result (Set of Matching Character Positions)
  | 18 |

DICTIONARY AND INDEX CREATING SYSTEM AND DOCUMENT RETRIEVAL SYSTEM

BACKGROUND OF THE INVENTION

1. Field of the Invention

The present invention relates to a dictionary and index creating system for creating a machine-retrievable dictionary and index available for document managing systems, document editing systems and others which work to manage, edit and retrieve document information accumulated as electronic data, through the use of computers.

2. Description of the Related Art

Recently, owing to the widespread use of word processors, personal computers and large-capacity and low-cost storage media such as CD-ROM and the development of networks represented by Ethernet, the full-text (whole-passage) databases in which the character information in all or most of documents (texts) are expressed as character code strings and accumulated have come into practical and widespread use.

In the case of the prior document databases, the common way for the document retrieval (text search) involves the keyword retrieval making use of keywords prepared for each of documents. However, this way has caused problems such as difficulty in coping with the increase in the accumulated documents because of the troublesome keyword preparation work, the triteness of the keywords with the passage of time and the lack of relevant documents in retrieval result due to the difference in interpretations between the keyword preparing person and the retrieval conducting person. For these reasons, lately, interest has been shown toward the so-called full-text retrieval which does not require the keyword preparation.

The full-text retrieval is of the type performing the collation and matching in character string between the retrieval condition based upon a character string given from the user and a character string constituting the accumulated documents to output a document(s) satisfying the retrieval condition, whereupon there is no need to prepare keywords in advance. So far, various methods have been proposed as means to realize this full-text retrieval. The detailed description of the overall arrangement thereof has been disclosed by, for example, William B. Frakes and Ricardo Baeza-Yates (eds.), "Information Retrieval-Data Structure & Algorithms, Prentice Hall (1992), which is roughly classified into the following three methods from a viewpoint of the index preparation prior to the retrieval to the documents undergoing retrieval or being the target of retrieval (hereinafter referred to as retrieval documents).

(1) Full-text Scan Method
(2) Signature File Method
(3) Transposition File Method Of these methods, the full-text scan method involves making the matching or collation between the retrieval condition character string and the retrieval documents whenever a question takes place to bring the retrieval result, so that there is no need to previously prepare an index for the retrieval, thus saving the storage capacity and allowing the retrieval under complicated requirements. On the other hand, the retrieval speed is relatively slow as compared with the other methods, and from this viewpoint, the full-text scan method is not fit for a large amount of retrieval.

Furthermore, the signature file method (2) is such that a document file, so-called signature, is constructed in advance as an index for retrieval and this signature file is first retrieved to cut back the quantity of documents undergoing the full-text scanning. In comparison with the above-mentioned method (1), a high-speed retrieval becomes feasible, whereas in general this requires constructing and retaining the signature file constituting several tens %of the capacity of the retrieval documents.

Still further, the transposition file method (3) involves previously constructing as a retrieval index a document in which characters/words/n-character succession (n-gram) occur or appear or a transposition file recording the document positions therein so that the retrieval is made through the use of only this transposition file (that is, without the use of the retrieval documents). This method permits an extremely high speed retrieval as compared with the methods (1) and (2). However, in the case that the retrieval documents are written in Japanese, because the boundaries between the words are not clear unlike the western languages, this method requires several times the capacity of the retrieval documents when conducting the retrieval on the basis of the n-character succession.

Since each of the above-mentioned three methods has an advantage and a disadvantage, it is necessary to use them properly to match each of the document retrieval requests. For instance, for the retrieval of an extremely large volume of document including an extremely large number of characters, such as the whole text of an Unexamined Patent Publication, the high-speed retrieval is essential, and in this case, the above-mentioned method (3) is most suitable.

In order to apply the method (3) to a retrieval document based on the no-space languages (there is no space between words) such as Japanese and Chinese, a method of constructing a transposition file of one- or two-character succession to realize a high-speed document retrieval system has been proposed in "A Fast Full-Text Search Method for Japanese Text Database" written by Chuichi Kikuchi, Electronic Information Communication Society Paper Magazine, Vol. J75-D-I, No. 9, pp.836–846 (1992). In addition, a method of constructing a transposition file of one to three-character succession for the preparation of an index when necessary has been proposed in "Development of n-gram Type Large-Scale Full-text Retrieval Method" written by Sugaya, Kawaguchi, Hatayama, Tada, Kato, Information Processing Society of Japan 53rd National Conference Pre-Draft Collection, 3–235, (1996).

However, according to the prior methods, the index file drawn up comes to twice the retrieval documents, and if increasing the number of characters organizing the character succession for the purpose of the speed-up, the capacity of the index file further increases, which creates the problem in that difficulty is encountered to realize them in the case that limitation is imposed on the usable capacity of a memory unit. Moreover, in the case of such a retrieval condition character string as "katakana (characters inherent in Japanese)" with long character strings and many high-frequency character chains, the retrieval data amount in the index file increases, with the result that the retrieval speed reduces.

As one possible way to solve these problems, in the Japanese Unexamined Patent Publication No. 8-249354 there has been disclosed a method in which words are cut out even in the Japanese retrieval documents through the use of a large-scale word dictionary to constitute a transposition file as well as the western languages so that the full-text retrieval is carried out on the basis of an arbitrary retrieval condition character string through the use of the constructed transposition file at high speed. This method will be referred hereinafter to as a prior index retrieval method.

In the prior index retrieval method, a word index storing the occurrence (appearance) positions of character strings respectively matching with words in the retrieval documents and all of only the maximal (longest) index elements of the index elements paired with the words is constructed as a maximal extension index through the use of a word dictionary being a set of a definite number of words (character strings), thereby arranging index information by far smaller than an inverted file of n-character succession (n-gram string) and having a capacity similar to the capacity of the retrieval documents.

In the retrieval, word strings in the dictionary in which each of the characters in a retrieval condition character string is included in at least one of the words is obtained as a cover of the retrieval condition character string, and in terms of each of extension words of each of works including each of words organizing the cover, the set of index elements corresponding to that word are obtained, and of the strings of index element sets corresponding to the words, only the index element string appearing in succession in the retrieval documents is obtained and the matching start position of the leading (first) index element is outputted as a retrieval result. Owing to this retrieval, in case where the retrieval condition character string coincides with a word in the dictionary or in case where it can be covered with a small number of words in the dictionary which appear at a low frequency in the document, it is possible to conduct the full-text retrieval processing at a relatively high speed and further to considerably overcome the disadvantage of the aforesaid transposition file based on the character chain.

A description will be made hereinbelow of a prior word index creating method and prior document retrieval system according to the prior index retrieval method. First of all, the description will begin with the prior word index creating method. FIG. 27 is a block diagram showing the entire arrangement of a prior word index creating system. In FIG. 27, reference numeral 401 represents a word dictionary storing a finite or definite number of character strings, numeral 402 designates a retrieval document storage for storing retrieval documents undergoing retrieval for which the index preparation (indexing) is made, and numeral 403 denotes a longest match word retrieving means for retrieving a word organizing the longest leftmost partial character string of the specified character strings. Further, numeral 404 depicts a character number storage area for storing the number of characters of the retrieved word and for subtracting the stored value by 1 each time the observing retrieval document position advances by one character.

Moreover, numeral 405 signifies a maximal index element creating means for reading the retrieval documents from the retrieval document storage 402 and for driving the longest match word retrieving means 403 to appoint a character string corresponding to the character number of the longest word in the word dictionary 401 in the longest match word retrieving means 403 on the basis of the respective character positions of the retrieval documents 402 to successively retrieve the longest match words so that, if the number of characters being the retrieval result exceeds the value of the character number storage area 404, a set of (a group made by) the word and the occurrence character positional range is outputted as an index element and the character number being the retrieval result is stored in the character number storage area 404. Numeral 406 indicates an index element sorting means for sorting the sets of index elements outputted from the maximal index element creating means 405 at every word, and numeral 407 stands for a word index for storing the arrangement result of the index element lineup means 406.

An operation of the word index creating system thus arranged will be described hereinbelow with reference to the drawings using a simple dictionary and simple retrieval documents. FIG. 29 is an illustration of an example showing a list of words organizing a word dictionary taken in a dictionary type index retrieving method, FIG. 30 is an illustration of an example of retrieval documents, FIG. 31 is a conceptual illustration of processing for deriving maximal index elements from the FIG. 30 retrieval document through the use of the word dictionary composed of the words shown in FIG. 29, and FIG. 32 is a conceptual illustration of the contents of the word index drawn up from the FIG. 30 retrieval documents using the word dictionary comprising the words shown in FIG. 29.

First, prior to the index preparation, the dictionary data corresponding to the contents shown in FIG. 29 is stored in the word dictionary 401, and the FIG. 30 retrieval document data is put in the retrieval document storage 402. In addition, the character number storage area 404 is set to 0. Further, since the number of characters of the longest word of the FIG. 29 dictionary data reaches 7, the character string length which is designated from the maximal index element creating means 405 toward the longest match word retrieving means 403 results in 7.

In this case, the first 7 characters "A NICHI DEN SHI NO DEN SHI (which respectively correspond to the Japanese characters (including "hiragana" characters, "katakana" characters and Chinese Characters, and each comprising a set of letters) using the alphabet, but not having the meanings in English and each Japanese character is represented as a character code, an EOC code or a JIS code)" of the FIG. 30 retrieval document is read out by the maximal index element creating means 405 and is presented as a key of the retrieval to the longest match word retrieving means 403. In the word dictionary having the contents shown in FIG. 29, the longest leftmost character sub-string of the "A NICHI DEN SHI", and the number of characters of this word is 4 which is larger than 0 set in the character number storage area 404, the index element (A NICHI DEN SHI, [1, 4]) is outputted to the index element lineup means 406, so that the value of the character number storage area 404 reaches 4.

Subsequently, 7 characters being "NICHI DEN SHI NO DEN SHI SU" taking place by advancing the observing character position of the retrieval document by one character are produced in the maximal index element creating means 405 and designated as a key to the longest match word retrieving means 403, thereby retrieving the word "NICHI DEN" constituting the longest leftmost partial character string. Further, the value of the character number storage area 404 is decreased by one to come to 3. However, since the number of characters of "NICHI DEN" which is 2 is smaller than the value 3 of the character number storage area 404, it is found that this "NICHI DEN" does not assume the maximal (included in "A NICHI DEN SHI"), with the result that no output of the index element occurs. The maximal index element creating means 405 conducts such an operation while shifting the observing character position in the sentence-end direction to output only the maximal index elements shown in FIG. 31 to the index element lineup means 406.

If the above-described processing reaches the end of the retrieval document, the index elements outputted therefrom are arranged in order in units of words in the index element sorting means 406, thus making out the word index shown in FIG. 32.

Secondly, a description will be taken hereinbelow of a prior document retrieval system using the prior word index drawn up by the above-described prior word index creating method. FIG. 28 is a block diagram showing one example of the entire arrangements of the prior document retrieval system. In this illustration, numeral 411 represents a word dictionary, numeral 412 designates a word index created in the FIG. 27 prior word index creating system using the word dictionary 411, and numeral 413 denotes a retrieval condition inputting means for inputting a retrieval condition character string. In addition, numeral 414 denotes a word cover calculating means for retrieving the word dictionary 411 to obtain a word cover of the retrieval condition character string in the form of the set of word cover elements being the combinations of the words in the dictionary and the cover character positional ranges of the retrieval condition character string. Further, numeral 415 depicts an extension word calculating means for retrieving the word dictionary 411 in relation to the word cover element specified to obtain all the words, coinciding with the retrieval condition character string, of the words in the dictionary which constitute the character strings including the words of the word cover elements.

Furthermore, numeral 416 signifies a matching character positional range set calculating means for obtaining all the index elements of the specified word sets to correct matching character positional ranges and further to create matching character positional range sets. Further, numeral 417 designates a connection matching character positional range string calculating means for obtaining all the matching character positional range strings, appearing in succession in the retrieval document, of the specified matching character positional range set string, numeral 418 depicts a matching position set calculating means for obtaining a set of matching start character positions which serves as the leading element of the matching character positional range string, and numeral 419 denotes a retrieval result outputting means for outputting the retrieval result.

An operation of the document retrieval system thus arranged will be described hereinbelow with reference to the drawings using the simple dictionary and retrieval document used in the above description of the prior word index creating system. FIGS. 33 and 34 are conceptual illustrations showing the full-text retrieval processing based upon a word index having the FIG. 32 contents and a word dictionary having the FIG. 29 contents in terms of a retrieval condition character strings "DEN SHI s u p i n KYO MEI" and "TO A DEN SHI" (the capital letter string represents a Chinese character and the small-letter string underlined denotes a "katakana" character).

Referring to FIG. 33, the description will begin with the retrieval processing to be conducted for when the character string "DEN SHI s u p i n KYO MEI" is inputted as the retrieval condition character string from the retrieval condition inputting means 413. First, the word cover calculating means 414 obtains the retrieval condition character string as follows. In a state where each of the rightmost partial character strings of the retrieval condition character strings: "DEN SHI s u p i n KYO MEI", "SHI s u p i n KYO MEI", "DEN SHI s u p i n KYO MEI", "s u p i n KYO MEI", "p i n KYO MEI", "n KYO MEI", "KYO MEI", and "MEI" is taken as a key, the word cover calculating means 414 successively retrieves the words being the longest leftmost partial character strings of the keys in the word dictionary 411, and records, as the word cover elements, them together with the cover character positional ranges in the retrieval condition character strings.

In the case of this example, in terms of "DEN SHI s u p i n KYO MEI", 3 words "DEN", "DEN SHI" and "DEN SHI s u p i n" are retrieved or picked up as the leftmost partial words thereof, and the (DEN SHI s u p i n, [1, 5]) being the set of the "DEN SHI s u p i n" whose number of characters is the largest and the cover character positional range [1, 5] of the retrieval condition character string "DEN SHI s u p i n KYO MEI" is recorded, whereas the leftmost partial words of "SHI s u p i n KYO MEI" are not recorded because of absence in the word dictionary 411 assuming the contents of FIG. 29. Further, for "s u p i n KYO MEI", the 2 words "s u p i n" and "s u p i n KYO MEI" are retrieved as the leftmost partial words so that (s u p i n KYO MEI, [3, 7]) being the set of the longest word "s u p i n KYO MEI" and the cover character positional range [3, 7] are recorded, whereas the leftmost partial words of "p i n KYO MEI" and "n KYO MEI" are not recorded because of absence in the word dictionary 411 assuming the contents of FIG. 29. Moreover, for "KYO MEI", only the "KYO MEI" is retrieved as the leftmost partial word and the set (KYO MEI, [6, 7] being the combination with the cover character positional range [6, 7] is recorded.

Subsequently, the word cover elements not showing the maximal, that is, the word cover elements whose cover character positional ranges completely lie in the cover character positional ranges of the other word cover elements, are removed from the recorded word cover elements. After the removal, the set of remaining word cover elements cover the retrieval condition character string. More specifically, in the case that the sum-set of the cover character positional ranges of the respective word cover elements of the word cover set is the entire retrieval condition character string, the set of these remaining word cover elements are recorded as a word cover. If the set of word cover elements left after the removal does not cover the retrieval condition character string, the retrieval processing comes to an end after the retrieval result outputting means 419 outputs a predetermined special retrieval result indicative of "retrieval impossible".

In this instance, of the three index elements (DEN SHI s u p i n, [1, 5]), (s u p i n KYO MEI, [3, 7]) and (KYO MEI, [6, 7]), the cover character positional range [6, 7] of the (KYO MEI, [6, 7]) fully exists within the cover character positional range [3, 7] of (s u p i n KYO MEI, [3, 7]), and therefore, (KYO MEI, [6, 7]) undergoes removal. The remaining word cover elements produces the following set:

H={(DEN SHI s u p i n, [1, 5]), (s u p i n KYO MEI, [3, 7])} and the sum-set of the cover character positional ranges thereof results in [1, 5] ∪ [3, 7]=[1, 7], which makes character positional range of the whole retrieval condition character string "DEN SHI s u p i n KYO MEI", so that the aforesaid H is recorded as the word cover for the retrieval condition character string "DEN SHI s u p i n KYO MEI".

After the word cover calculating means 414 derives the word cover for the retrieval condition character string, the extension word calculating means 415 obtains a set of extension words of the respective word cover elements being on word covering, which conform to or match with the retrieval condition character string. the "extension word conforming to the retrieval condition character string c" here signifies a word that, if defining a=min(s−1, |p|), b=min(|c|−e, |q|) in terms of the word x=p·w·q (p, q denote an arbitrary character string other than number of characters=0) including the observing word cover element (w, [s, e]) as a partial character string, satisfies both:

(1) a=0, or c[(s−a) . . . (s−1)]=p [(|p|−a+1) . . . |p|); and (2) b=0, or c[(e+1) ... (e+b)]=q[1 ... b].

In this case, the partial character string from i-th character to j-th character of a character string T (the leading character is the first character) is expressed as T[i ... j] and the number of characters of the character string T is expressed as |T|.

In this instance, the extension word set of (DEN SHI s u p i n, (1, 5]) agreeing with "DEN SHI s u p i n KYO MEI" makes {DEN SHI s u p i n }, and the extension word set of (s u p i n KYO MEI, [3, 7]) agreeing with "DEN SHI s u p i n KYO MEI" becomes {s u p i n KYO MEI, s u p i n KYO MEI KYU SHU}. The word "KAKU s u p i n KYO MEI" in the FIG. 29 word dictionary includes "s u p i n KYO MEI" as a partial character string, and hence, is the extension word of "s u p i n KYO MEI". On the other hand, since the partial character string "KAKU" corresponding to p of the aforesaid x=p·w·q does not coincide with the corresponding partial character string "SHI" of the retrieval condition character string "DEN SHI s u p i n KYO MEI", it is not the extension word conforming to "DEN SHI s u p i n KYO MEI".

After obtaining the extension word set of the respective word cover elements being in word cover which is fit for the retrieval condition character string, in terms of the respective extension word sets, the matching character positional range set calculating means 416 obtains an index element which takes as the first term the word being the element of that extension word set from the word index 412, and corrects the second term of each of the obtained index elements to the matching character positional range corresponding to the word of the word cover element which produces that extension word set to attain the set of matching character positional ranges after the correction.

In the case of this example, the index element for the extension word set {DEN SHI s u p i n } of (DEN SHI s u p i n, [1, 5]) agreeing with "DEN SHI s u p i n KYO MEI" is only (DEN SHI s u p i n, [6, 10]), and the only one element "DEN SHI s u p i n" of the extension word set is equal to the word "DEN SHI s u p i n" which makes the extension word set, and therefore, the correction of the matching character positional range is unnecessary, and the matching character positional range set is obtained as {[6, 10]}. Similarly, the index element for the extension word set {s u p i n KYO MEI, s u p i n KYO MEI KYU SHU} of ( s u p i n KYO MEI, [3, 7]) agreeing with the "DEN SHI s u p i n KYO MEI" is also only {(s u p i n KYO MEI, [8, 12])}, so that the correction of the matching character positional range is unnecessary, the matching character positional range set results in {[8, 12]}.

After obtaining the matching character positional range set in terms of the respective extension word sets, the connection matching character positional range string calculating means 417 obtains, of the respective matching character positional range strings, all the matching character positional range strings appearing in succession in the retrieval document.

In the case of this example, the difference (that is, 2) in start character position between the element [6, 10] of the matching character positional range set {[6, 10]} to (DEN SHI s u p i n, [1, 5]) and the element [8, 12] of the matching character positional range set {[8, 12]} to (s u p i n KYO MEI, [3, 7]) is equal to the difference (that is, 2) in start character position of the cover character positional range between the two corresponding word cover elements (DEN SHI s u p i n, [1, 5]) and (s u p i n KYO MEI, [3, 7]), and it is found to appear in succession in the character positional range [6, 12] of the retrieval document, thus obtaining {([6, 10], [8, 12])} as a set of matching character positional range strings.

After all the matching character positional range strings occurring in succession in the retrieval document are obtained, the matching position set calculating means 418 subsequently obtains the matching position set being the set of the matching start positions of the first matching character positional ranges of the respective matching character positional range strings from the matching character positional range string set, and the retrieval result outputting means 419 this obtained matching position set as a retrieval result.

In the case of this example, the matching position set calculating means 418 obtains the set {6} composed of only 6 which indicates the matching start character position of the leading element [6, 10] of the string ([6, 10], [8, 12]) constituting only one element, and the retrieval result outputting means 419 outputs the obtained set as a retrieval result. This retrieval result is representative of that in the retrieval character string only one portion matches with the retrieval condition character string "DEN SHI s u p i n KYO MEI" and it begins with the 6th character of the retrieval character string.

The description made above is about the retrieval processing to be taken for when the character string "DEN SHI s u p i n KYO MEI" is inputted as the retrieval condition character string.

As shown in FIG. 34, the retrieval processing to be taken for when the character string "TO A DEN SHI" is inputted as the retrieval condition character string is basically similar to the above description. First, in FIG. 34, the set composed of three elements {(TO, [1, 1]), (A, [2, 2]), (DEN SHI, [3, 4])} is obtainable as the word cover. If expressing the extension word set of the respective word cover elements agreeing with "TO A DEN SHI" and the corresponding matching character positional range set as "word cover element→ extension word set→ matching character positional range", (TO, [1, 1])→{TO,KYOKU TO, KAN TO, HOKU TO, HOKU HOKU TO, NAN TO, NAN NAN TO}→{[16, 17], [18, 18]}

(A, [2, 2])→{A}→{[19, 19]}

(DEN SHI, [3,4])→{DEN SHI, DEN SHI s u p i n, DEN SHI UN, DEN SHI MITSU DO, DEN SHI KI KI}→{ [6, 10], [20, 21], [25, 27]}

Of the element strings of these three kinds of matching character positional range sets, the element string in which the character positions are in succession is only ([18, 18], [19, 19], [20, 21]), with the result that {18} is outputted as the retrieval result.

Although the description has been made above of two examples, in general, like the first example ("SEN SHI s u p i n" is covered with two words "DEN SHI s u p i n" and "s u p i n KYO MEI"), in the case that the retrieval character string is covered with words having a relatively large number of characters and overlapping with each other, this prior document retrieval system can ensure effective retrieval processing, and for the following reasons.

(1) As the number of characters of a word being a word cover element increases, the number of extension words decreases, and the number of elements of the matching character positional range sets also tends to decrease, so that the computational complexity for obtaining the extension word set and the matching positional range set lessens.

(2) As the overlapping portion between the words constituting the word cover elements increases, the difference between the matching character positional range set of the corresponding extension words and the final retrieval result, that is, the complexity of the useless matching character positional ranges not contributing to the final retrieval result, lessens, thus reducing the complexity in the connection character positional range string calculating means 417.

In the case of the second example (the retrieval for "TO A DEN SHI"), the above-mentioned reasons (1) and (2) do not hold true, and the word cover elements consist of 1 to 2 characters and there is no overlapping portion. For this reason, as represented by (TO, [1, 1])→{HIGASHI, KYOKU TO, HOKU TO, HOKU HOKU TO, NAN TO, NAN NAN TO}, it is required to examine the index elements comprising a large number of extension words, and like {[8, 12], [22, 23], [27, 29]}, the matching character positional range set includes many useless elements not contributing to the final result, with the result that the efficiency lowers.

Accordingly, as described above, in the case that the retrieval character string is covered with words comprising a relatively small number of characters and making less overlapping portions, the efficiency of the retrieval processing of the prior document retrieval system employing the word index made out according to the above-described prior index creating method lowers as compared with the case that the retrieval character string is covered with words having a relatively large number of characters and establishing much overlapping portion.

Although it is possible to reduce the situations, in which the retrieval processing efficiency lowers, in a manner of increasing the number of words to be stored in the word dictionary, particularly adding to the word dictionary the frequently appearing words of the long units of words (compound words, phrases, or the like) appearing in the retrieval document, commonly limitation is imposed on the number of words to be stored in the word dictionary, and hence, difficulty is experienced to completely eliminate the reduction of the efficiency.

SUMMARY OF THE INVENTION

It is therefore an object of the present invention to provide a dictionary and index creating system and a document retrieval system which are capable of, even if the retrieval character string is covered with words comprising a relatively small number of characters and making less overlapping portions, preventing the reduction of the retrieval efficiency and further of carrying out the high-speed full-text retrieval processing without increasing the index capacity so much.

For this purpose, in accordance with the present invention, a dictionary and index creating system is arranged to create a regular expression dictionary and a word index on the basis of a retrieval document undergoing retrieval and a word dictionary, while a document retrieval system is arranged to retrieve a retrieval character string in the retrieval document through the use of the regular expression dictionary and word index created through the dictionary and index creating system. The dictionary and index creating system and document retrieval system thus arranged are capable of, even if the retrieval character string is covered with words comprising a relatively large number of characters and establishing less overlap with each other, carrying out full-text retrieval processing at a high speed to enhance the retrieval efficiency.

Accordingly, a dictionary and index creating system according to this invention comprises means for creating a regular expression dictionary on the basis of a retrieval document undergoing retrieval and a word dictionary according to a rule depending on each of words of the word dictionary, and means for creating a word index which is composed of a set of regular expression and matching character positional range and which is made by a collection of index elements deducible from other index elements.

Furthermore, a dictionary and index creating system according to this invention comprises means for creating a regular expression dictionary on the basis of a retrieval document undergoing retrieval and a word dictionary according to a rule depending on an occurrence frequency in a sample document, and means for creating a word index which is composed of a set of regular expression and matching character positional range and which is made by a collection of index elements deducible from other index elements.

Still further, a dictionary and index creating system according to this invention comprises means for creating a first word index on the basis of a sample document and a word dictionary, and means for creating a regular expression dictionary and a second word index on the basis of a word frequency in the first word index and a retrieval document undergoing retrieval.

Moreover, a dictionary and index creating system according to this invention comprises means for adding a terminal character to before and after a retrieval document undergoing retrieval as occasion demands through the use of an enlarged character set to produce an enlarged retrieval document.

Besides, a dictionary and index creating system according to this invention comprises means for, when a word composed of only arbitrary characters of a character set is not included in a word dictionary, preparing an expansion word dictionary by adding the word to the word dictionary.

On the other hand, in accordance with the present invention, a document retrieval system comprises a word dictionary storage unit, word dictionary retrieving means, a regular expression dictionary storage unit, regular expression dictionary retrieving means, a word index storage unit, word index retrieving means, question inputting means, word calculating means, extension regular expression set calculating means, index element set retrieving means, connection index element calculating means, matching position set calculating means, and retrieval result outputting means.

In addition, a document retrieval system according to this invention includes means for adding a terminal character to before and after a retrieval document undergoing retrieval as occasion demands through the use of an enlarged character set to prepare an enlarged retrieval document.

More specifically, in accordance with an aspect of the present invention, a dictionary and index creating system, designed to create a regular expression dictionary and a word index on the basis of a retrieval document undergoing retrieval and a word dictionary, comprises a retrieval document storage unit for storing a retrieval document composed of a lineup of a finite number of characters included in a predetermined character set, a word dictionary storage unit for storing a word dictionary in which registered are a finite number of words each being a lineup of one or more characters included in the character set, means for reading out one word w from the word dictionary in the word dictionary storage unit and further for making out one or more sets of regular expressions a, b indicative of sets of character strings having the same length except null sets on the character set according to a rule depending on the word w, a regular expression dictionary storage unit for joining the regular expressions a, b to before and after the word w to make out one or more regular expressions awb and further for collecting the regular expressions awb to produce a regular expression dictionary, different from the aforesaid word dictionary, according to a predetermined rule depending on the word w and even for storing the regular expression dictionary, means for retrieving a character string matching with a regular expression in the regular expression dictionary from the retrieval document storage unit and further for creating an index element comprising a set of the regular expression and a matching character positional range in the retrieval document, and a word index storage unit for storing a word index made out by a collection of the index elements decided as being non-deducible (inestimable) from other index elements. This dictionary and index creating system can create a regular expression dictionary and a word index which are capable of, when a retrieval character string is covered with words comprising a relatively small number of characters and establishing less overlap with each other, prevent the retrieval efficiency from lowering and further of carrying out higher-speed full-text retrieval processing without increasing the index capacity so much.

Furthermore, in accordance with another aspect of this invention, the above-mentioned dictionary and index creating system is made such that each of the regular expressions a, b to be joined to before and after each word w in the word dictionary takes a character class string or a null string. This also can create a regular expression dictionary and a word index which are capable of, when a retrieval character string is covered with words comprising a relatively small number of characters and establishing less overlap with each other, prevent the lowering of the retrieval efficiency and further of carrying out higher-speed full-text retrieval processing without increasing the index capacity so much.

Still further, in accordance with a different aspect of this invention, a dictionary and index creating system, made to create a regular expression dictionary and a word index on the basis of a retrieval document undergoing retrieval, a word dictionary and word frequency data, comprises a retrieval document storage unit for storing a retrieval document composed of a lineup of a finite number of characters included in a predetermined character set, a word dictionary storage unit for storing a word dictionary in which registered are a finite number of words each being a lineup of one or more characters included in the character set, a word frequency data storage unit for storing word frequency data indicative of an occurrence frequency of each of words of the word dictionary in a sample document comprising a lineup of a finite number of characters included in the predetermined character set, means for reading out one word w from the word dictionary in the word dictionary storage unit and further for making out regular expressions a, b indicative of sets of character strings having the same length except null sets on the character set according to a rule depending on the frequency of the word w in the word frequency data, a regular expression dictionary storage unit for joining the regular expressions a, b to before and after the word w to make out one or more regular expressions awb and further for collecting all the regular expressions awb made out for all the words in the word dictionary to produce a regular expression dictionary different from the aforesaid word dictionary and even for storing the regular expression dictionary, means for retrieving a character string matching with a regular expression in the regular expression dictionary from the retrieval document storage unit and further for creating an index element comprising a set of the regular expression and a matching character positional range in the retrieval document, and a word index storage unit for storing a word index made out by a collection of the index elements decided as being non-deducible from other index elements. This dictionary and index creating system can create a regular expression dictionary and a word index which allow a higher-speed retrieval as the word has a higher occurrence frequency in the sample document.

Moreover, in accordance with a different aspect of this invention, a dictionary and index creating system, made to create a regular expression dictionary and a word index on the basis of a retrieval document undergoing retrieval, a word dictionary and a sample document, comprises a retrieval document storage unit for storing a retrieval document composed of a lineup of a finite number of characters included in a predetermined character set, a word dictionary storage unit for storing a word dictionary in which registered are a finite number of words each being a lineup of one or more characters included in the character set, a sample document storage unit for storing a sample document comprising a lineup of a finite number of characters included in a predetermined character set, means for retrieving a character string matching with a word in the word dictionary from the sample document storage unit and further for creating an index element being a set of the word and a matching character positional range in the retrieval document to check whether or not the index element is deducible from other index elements and even for collecting the index elements decided as being non-deducible from the other index elements to produce a first word index, means for producing word frequency data in a manner that the number of index elements to each of words in the first word index is handled as a word frequency, means for reading out one word w from the word dictionary in the word dictionary storage unit and further for making out regular expressions a, b indicative of sets of character strings having the same length except null sets on the character set according to a rule depending on the frequency of the word w in the word frequency data, a regular expression dictionary storage unit for joining the regular expressions a, b to before and after the word w to make out one or more regular expressions awb and further for collecting all the regular expressions awb made out for all the words in the word dictionary to produce a regular expression dictionary different from the aforesaid word dictionary and even for storing the regular expression dictionary, means for retrieving a character string matching with a regular expression in the regular expression dictionary from the retrieval document storage unit and further for creating an index element comprising a set of the regular expression and a matching character positional range in the retrieval document, and a word index storage unit for storing a second word index made out by a collection of the index elements decided as being non-deducible from other index elements. This dictionary and index creating system can create a regular expression dictionary and a word index which allow a higher-speed retrieval as the word has a higher occurrence frequency in the sample document and the word dictionary.

In the above-mentioned dictionary and index creating system, the means for making out the regular expression according to the rule depending on the word w is composed of means for making out a regular expression composed of the word w through the use of 3N parameters being N frequency limit values, N left-side character classes and N right-side character classes if the occurrence frequency of the word w recorded in the word frequency data is below a first frequency limit value, means for joining a character class a being an element in an mth left-side character class set and a character class b being an element in an mth right-side character class set to the word w to make out regular expressions awb in relation to all the possible character classes a, b if the occurrence frequency of the word w recorded in the word frequency data is higher than a mth frequency limit value but is lower than a m+1th frequency limit value, and means for joining a character class a being an element in an Nth left-side character class set and a character class b being an element in an Nth right-side character class set to make out regular expressions awb in relation to all the possible character classes a, b if the occurrence frequency of the word w recorded in the word frequency data is more than an N−1th frequency limit value. This dictionary and index creating system can create a regular expression dictionary and a word index which allow a higher-speed retrieval as the word has a higher occurrence frequency in the sample document.

Furthermore, in the dictionary and index creating system, the sample document is made up of all or a portion of the retrieval document, thereby creating a regular expression dictionary and a word index which allow a higher-speed retrieval as the word has a higher occurrence frequency in the sample document.

Still further, in the dictionary and index creating system, an enlarged character set is used which is prepared by adding as a terminal character one special character not included in the retrieval document, and the terminal character is added to before and after the retrieval document as occasion demands to produce an enlarged retrieval document, so that the enlarged character set is employed as a character set while the enlarged retrieval document is used as a retrieval document. Accordingly, this can create a regular expression dictionary and a word index, which permits a high-speed retrieval, through the use of the terminal character.

Besides, in the dictionary and index creating system, further included are means for, if a word composed of only c which is an arbitrary character in a determined character set is not included in a given word dictionary, creating an extended word dictionary by adding that word to the word dictionary, and means for creating a regular expression dictionary and a word index through the use of the extended word dictionary as the word dictionary. Thus, through the use of the extended word dictionary produced by adding a one-character word thereto, it is possible to create a regular expression dictionary and a word index which are capable of a high-speed retrieval.

Moreover, in accordance with a still further aspect of this invention, there is provided a document retrieval system comprising a word dictionary storage unit for storing a word dictionary made by a collection of a finite number of words each being a character string on a given character set, word dictionary retrieving means for conducting retrieval to the word dictionary, a regular expression dictionary storage unit for storing a regular expression dictionary made on the basis of a retrieval document undergoing retrieval and being a finite number of lineups of characters included in the character set and the word dictionary, regular expression dictionary retrieving means for performing retrieval to the regular expression dictionary, a word index storage unit for storing a word index created from the retrieval document and the word dictionary, word index retrieving means for performing retrieval to the word index, a question inputting means for inputting as a question character string an arbitrary character string on the character set, word cover calculating means including means for calculating a word cover being a set of word cover elements for the question character string (the word cover element is a pair of a word constituting a partial character string of the question character string in the word dictionary and a cover character positional range, and a character at an arbitrary position in the question character string is included in the cover character positional range of any one of the word cover elements being in word covering) and means for outputting a special retrieval result representative of "retrieval impossible" to retrieval result outputting means if there is no word cover for the question character string, extension regular expression set calculating means for calculating an extension regular expression set for each of word cover elements under the word covering from the regular expression dictionary when a word cover is obtained (the extension regular expression set is a set of regular expressions including a first term word of each of the word cover elements of the question character string being in word covering, and a set satisfying to an arbitrary extension question character string including the question character string the two conditions: (a) including a regular expression matching with a character string in a second character positional range of the extension question character string, which includes a cover character positional range being a second term of the word cover element; and (b) not including a regular expression other than the regular expression set, which matches a character string in a third character positional range of the extension question character string including the second character position range, in the regular expression dictionary), index element set retrieving means for conducting retrieval to the word index to obtain all index elements in which each of regular expressions of the extension regular expression set is taken as a first term, connection index element calculating means for obtaining all index element strings being elements of each of two or more index element sets and appearing in succession in the document, matching position set calculating means for obtaining a set of matching start character positions of second terms of index elements being leading elements of the index element strings to set it as a retrieval result, and retrieval result outputting means for outputting the retrieval result. This arrangement, when a retrieval character string is covered with words comprising a relatively small number of characters and establishing less overlap with each other, is capable of preventing the impairment of the retrieval efficiency and further of carrying out higher-speed full-text retrieval processing without increasing the index capacity so much.

In the above-mentioned document retrieval system, the word cover calculating means obtains a word cover having the smallest number of word cover elements, so that, when a retrieval character string is covered with words comprising a relatively small number of characters and establishing less overlap with each other, it is possible to prevent the impairment of the retrieval efficiency and further to carry out higher-speed full-text retrieval processing without increasing the index capacity so much.

In addition, in the above-mentioned document retrieval system, the word cover calculating means calculates a word cover where the minimum value of the length of the cover character positional range being the second term of the word cover element is the largest. Accordingly, in the case that a retrieval character string is covered with words comprising a relatively small number of characters and establishing less overlap with each other, it is possible to prevent the impairment of the retrieval efficiency and further to carry out higher-speed full-text retrieval processing without increasing the index capacity so much.

BRIEF DESCRIPTION OF THE DRAWINGS

The object and features of the present invention will become more readily apparent from the following detailed description of the preferred embodiments taken in conjunction with the accompanying drawings in which:

FIG. 2A–FIG. 2F, which is illustrated over several sheets as composed of component FIGS. 2A through 2F, is an illustration of the contents of a regular expression dictionary in the first embodiment;

FIG. 3A–FIG. 3C, which is illustrated over several sheets as composed of component FIGS. 3A through 3C, is an illustration of a portion of an example of deducible index element tables in the first embodiment;

FIG. 4A–FIG. 4C, which is illustrated over several sheets as composed of component FIGS. 4A through 4C, is an illustration of a portion of an example of deducible index element tables in the first embodiment;

FIG. 5A–FIG. 5B, which is illustrated over several sheets as composed of component FIGS. 5A through 5B, is an illustration of a portion of an example of deducible index element tables in the first embodiment;

FIG. 6A–FIG. 6B, which is illustrated over several sheets as composed of component FIGS. 6A through 6B, is an illustration of a portion of an example of deducible index element tables in the first embodiment;

FIG. 7A–FIG. 7B, which is illustrated over several sheets as composed of component FIGS. 7A through 7B, is a conceptual illustration of processing for obtaining an independent index element in the first embodiment;

FIG. 8 is an illustration of an example of independent index elements standing in line in the first embodiment;

FIG. 10A–FIG. 10F, which is illustrated over several sheets as composed of component FIGS. 10A through 10F, is an illustration of the contents of a regular expression dictionary in the second embodiment;

FIG. 11A–FIG. 11B, which is illustrated over several sheets as composed of component FIGS. 11A through 11B, is a conceptual illustration of processing for obtaining an independent index element in the second embodiment;

FIG. 12 is an illustration of an example of independent index elements standing in line in the second embodiment;

FIG. 14A–FIG. 14D, which is illustrated over several sheets as composed of component FIGS. 14A through 14D, is an illustration of an example of lists of words constituting an extended word dictionary in the third embodiment;

FIG. 15 is an illustration of an example of retrieval documents undergoing retrieval in the third embodiment;

FIG. 16A–FIG. 16C, which is illustrated over several sheets as composed of component FIGS. 16A through 16C, is a conceptual illustration of processing for obtaining an independent index element in the third embodiment;

FIG. 17 is an illustration of an example of independent index elements standing in line in the third embodiment;

FIG. 19A–FIG. 19B, which is illustrated over several sheets as composed of component FIGS. 19A through 19B, is an illustration of an example of word frequency data in the fourth embodiment;

FIG. 20A–FIG. 20D, which is illustrated over several sheets as composed of component FIGS. 20A through 20D, is an example of regular expression dictionaries in the fourth embodiment;

FIG. 21A–FIG. 21B, which is illustrated over several sheets as composed of component FIGS. 21A through 21B, is a conceptual illustration of processing for obtaining an independent index element in the fourth embodiment;

FIG. 22 is an illustration of an example of independent index elements standing in line in the fourth embodiment;

FIG. 25 is a conceptual illustration of full-text retrieval processing by the document retrieval system according to the sixth embodiment;

FIG. 26A–FIG. 26B, which is illustrated over several sheets as composed of component FIGS. 26A through 26B, is a conceptual illustration of full-text retrieval processing by the document retrieval system according to the sixth embodiment;

FIG. 29 is an illustration of an example of lists of words organizing a word dictionary;

FIG. 30 is an illustration of an example of retrieval documents undergoing retrieval;

FIG. 31 is a conceptual illustration of processing for obtaining a word index element;

FIG. 32(Prior Art) is a conceptual illustration of the contents of a prior art word index;

FIG. 33(Prior Art) is a conceptual illustration of full-text retrieval processing using a prior art word index; and FIG. 34(Prior Art) is a conceptual illustration of full-text retrieval processing using a prior art word index.

DETAILED DESCRIPTION OF THE INVENTION

Figure 1:
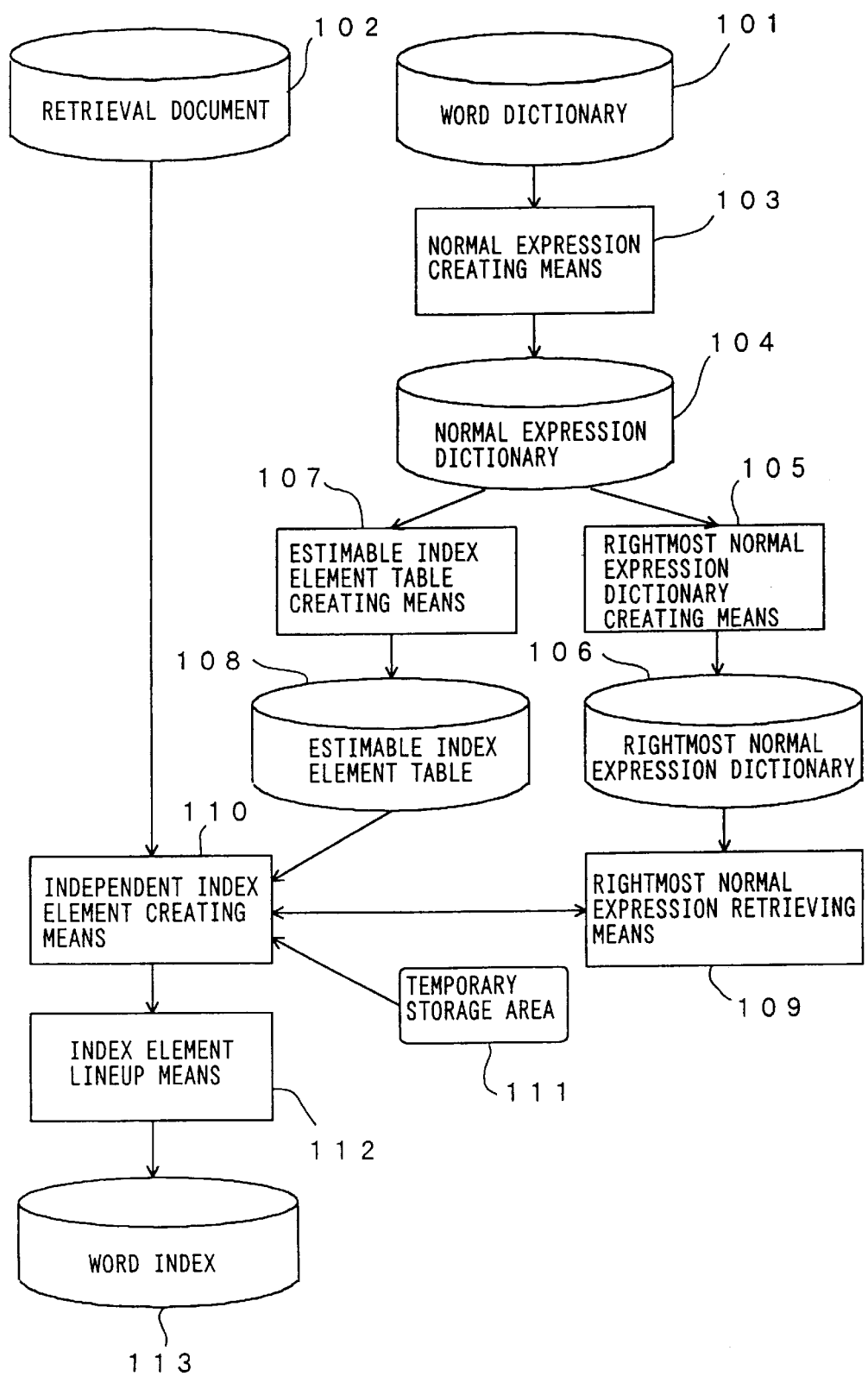
FIG. 1 is a block diagram showing the entire arrangement of a dictionary and index creating system according to a first embodiment of the present invention.

Prior to a description of embodiments of this invention, a description will first conceptually be taken hereinbelow of a regular expression, a finite-state automation closely related with the regular expression and a finite-state machine. The regular expression on a character set (a set of a finite number of characters) $\Sigma$ signifies a method of simply expressing a set comprising character strings on $\Sigma$ (strings made by arranging 0 or more characters belonging to $\Sigma$) using "pattern". The regular expression on $\Sigma$ and the character string set shown by the regular expression are defined by the following (1) to (9):

(1) $\phi$ represents a regular expression, and signifies a null set { };

(2) $\epsilon$ stands for a regular expression, and indicates a set {" "} of only character strings whose length is 0;

(3) In the case of each element a of $\Sigma$, a denotes a regular expression, and denotes a set {"a"};

(4) In terms of each element $c_1, \ldots, c_n$ of $\Sigma$, a regular expression $[c_1, c_2, \ldots, c_n]$ signifies a set $\{"c_1", "c_2", \ldots, "c_n"\}$, and a regular expression $[c_1, \ldots c_k d_1 \ldots c_m d_1 \ldots c_n]$ including characters $d_1, \ldots, d_n$ in successive ranges is also written as $[c_1, \ldots c_k d_1 \ldots c_m d_1 \ldots c_n]$, particularly, a regular expression indicative of a set composed of an arbitrary one-character word in $\Sigma$ is also written as $\Sigma$;

(5) When regular expressions on $\Sigma$ are taken to be s, t and the sets denoted by them are taken as S, T, sit denotes a regular expression, and signifies a set S∪T;

(6) When regular expressions on $\Sigma$ are taken to be s, t and the sets denoted by them are taken as S, T, st depicts a regular expression and signifies a set ST={pq|p∈S,q∈T} which is a set of all the character strings occurring by the concatenation of the character strings of S and T;

(7) Assuming that s is taken as a regular expression on $\Sigma$, s* denotes a regular expression and signifies a closure {" "} ∪S∪SS∪SSS∪SSSS∪... of a set S taken by s;

(8) Assuming that s is taken as a regular expression on $\Sigma$,(s) denotes a regular expression and signifies the same set as s; and (9) Only the expressions derived by applying the above-mentioned (1) to (8) finite times are the regular expressions.

For instance, "19[247-9]$\Sigma$" is a regular expression on a set of numeric characters (figures) "0", "1", ..., "9", and signifies a set of character strings {"1920", "1921", ..., "1929", "1940", ..., "1949", "1970", "1971", ..., "1979", ..., "1980", ..., "1989", "1990", ..., "1999"}.

In addition, "the character string x is in matching with the regular expression s" means that a partial string x [p, q] (a character string made by arranging the characters from the pth to qth characters of x in this sequence) of the character string x takes an element of a set expressed by s. At this time, the matching character positional range of s is [p, q], the matching start character position is p and the matching end character position is q. Incidentally, when describing character strings in the illustrations, if there is a possibility of misunderstanding, the mark "will be omitted. The following description will be made using, of the foregoing regular expressions, limited regular expressions produced according to the rules other than (5) and (7).

The regular expression, the finite-state automaton closely related with the regular expression and the finite-state machine have widely been studied since in the 1950's up to now, and as the documents handling them in detail, for instance there are many textbooks such as "Automaton Formal Language Theory & Computation Theory", Iwanami Koza Information Science 6, Iwanami Shoten, written by Fukumura and Inagaki, (1982), "Automaton Language Theory & Computation Theory" Science Co.,Ltd, written by J. E. Hopcroft, J. D. Ullman (translated by Nozaki, Takahashi, Machida, Yamazaki) (1984), and "Automaton Theory" Kyoritsu Shuppan, written by A. Salomma (translated by Kitagawa, Sato). According to these textbooks, the finite-state machine used even in the following description corresponds to a set R of regular expressions on $\Sigma$, and is "recognition machine" which, when inputting a character string x on a predetermined character set $\Sigma$, brines about a state transition by each of the characters of x and outputs a regular expression (or its identifier) in R expressing a set having x as an element. The above-mentioned textbooks have disclosed a method of mechanically constructing such a (deterministic) finite-state machine equivalent to the set R of the regular expressions on $\Sigma$ through the use of "Robinson's Method" and "Sub-set Construction Method".

Embodiments of the present invention will be described hereinbelow with the reference to the drawings.

First Embodiment

A first embodiment of this invention relates to a dictionary and index creating system for creating a regular expression dictionary and a word index based on the form of independent (i.e., non-deducible) index element strings from a document undergoing retrieval (which will be referred hereinafter to as a retrieval document) and a word dictionary.

The dictionary and index creating system according to the first embodiment of this invention will be described hereinbelow with reference to FIGS. 1 to 8. FIG. 1 is a block diagram showing the entire arrangement of the dictionary and index creating system according to the first embodiment.

In FIG. 1, the dictionary and index creating system comprises a word dictionary storage 101 (which will sometimes be referred hereinafter to as a word dictionary 101), a retrieval document storage 102 for storing a retrieval document (which will sometimes be referred hereinafter to as retrieval document 102), a regular expression creating means 103 for making out one or more regular expressions on the basis of each of words (character strings) in the word dictionary 101 according to a predetermined rule(s) which will be described herein later, a regular expression dictionary 104 for storing a set of regular expressions made out by the regular expression creating means 103, a rightmost regular expression dictionary creating means 105 for creating a dictionary in the form of a finite-state machine for the retrieval of all the regular expressions in the regular expression set 104 matching with the rightmost partial strings of a specified character string, a rightmost regular expression dictionary 106 created by the rightmost regular expression dictionary creating means 105, and a deducible index element table creating means 107 for, when an arbitrary character string x is in matching with each of regular expressions s in the regular expression dictionary 104, obtaining all sets (t, p) of a different regular expression t making it certainly deducible that the character string x is also in matching with the regular expression t and a relative character position p being the matching start character position of t taken for when the matching start character position of s is 1 (or a different appropriate number).

Also included in the dictionary and index creating system are a deducible index element table 108 for storing all the deducible index elements obtained by the deducible index element table creating means 107, and a rightmost regular expression retrieving means 109 for performing retrieval to the rightmost regular expression dictionary 106 with respect to a specified character string to obtain, of regular expressions matching with the character string, the regular expressions whose matching end character position takes the last character position of the character string, i.e., all the regular expressions matching with the rightmost sub-strings of the character string.

Further included therein are a temporary storage area 111 for temporarily storing index elements, and an independent index element creating means 110 for successively reading the retrieval document 102 and for driving the rightmost regular expression retrieving means 109 to obtain all the regular expressions matching with the rightmost partial character strings up to an observing character position so that they are put together with matching character positional ranges as index elements in the temporary storage area 111 and further for conducting retrieval to the deducible index element table 108 to remove or erase the deducible index elements of the stored index elements which already exist in the temporary storage area 111, to output the final independent index elements in the temporary storage area 111 after the removal, with the independent index element creating means 110 repeatedly conducting these operations up to the end of the retrieval document 102.

Still further included therein are an index element lineup means 112 for arranging the independent index elements outputted from the independent index element creating means 110 in the order of character string originating from the words of the corresponding regular expressions (if the character strings originating from the words are the same, in a predetermined constant order depending on the regular expressions before and after it) and further for outputting the arranged independent index elements, and a word index 113 outputted from the index element lineup means 112.

Figures 2, 2A, 2B, 2C, 2D, 2E, 2F:
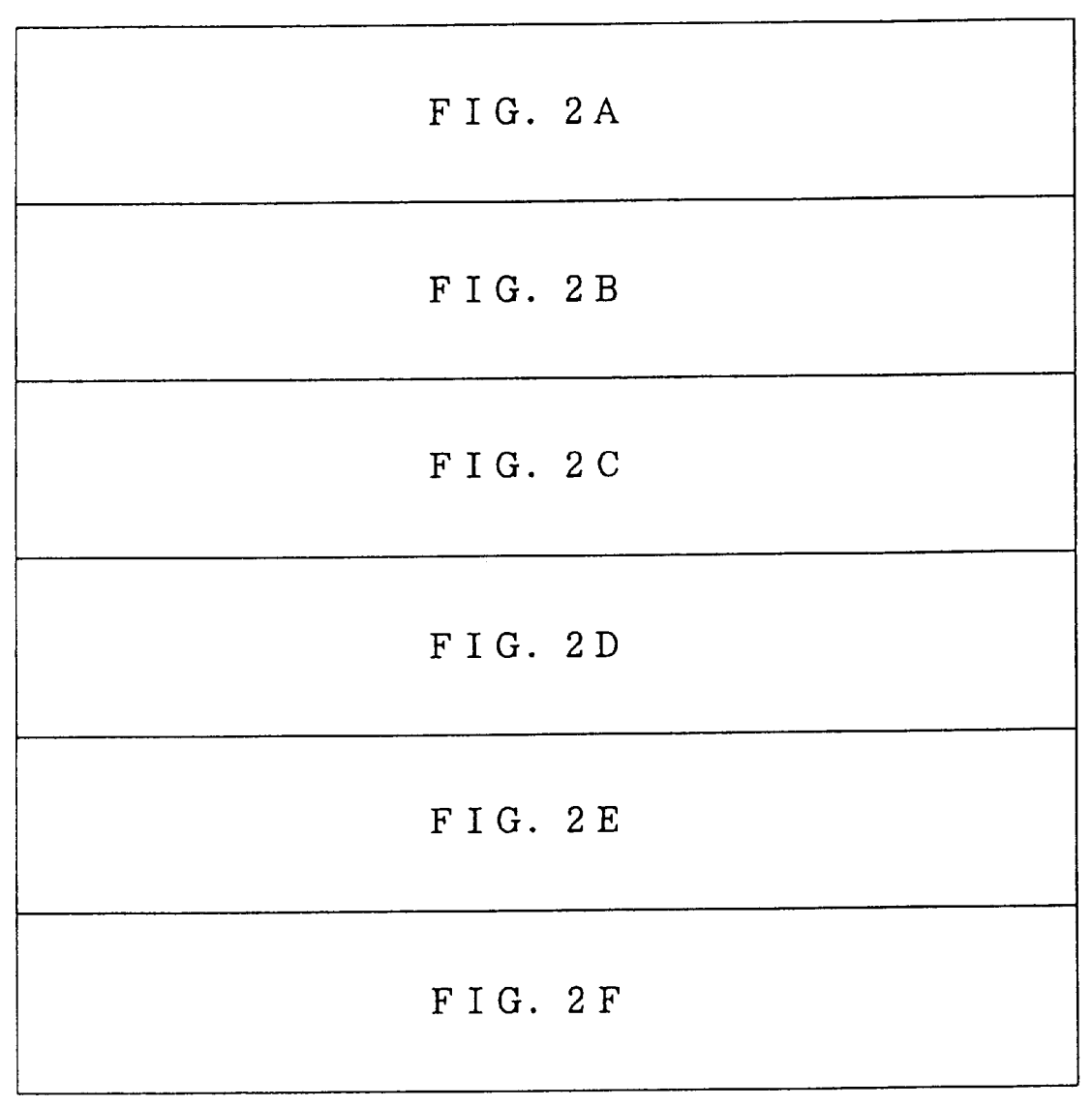
Figures 6, 6A, 6B:
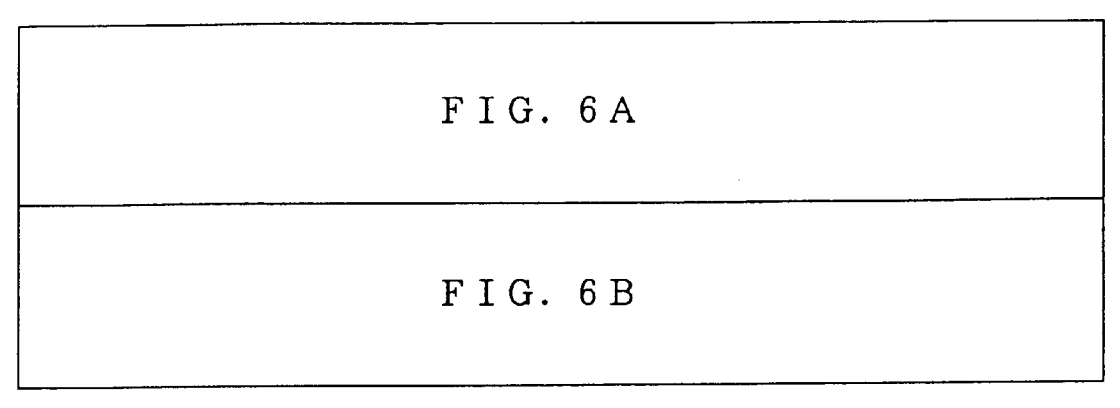
Figures 7, 7A, 7B:
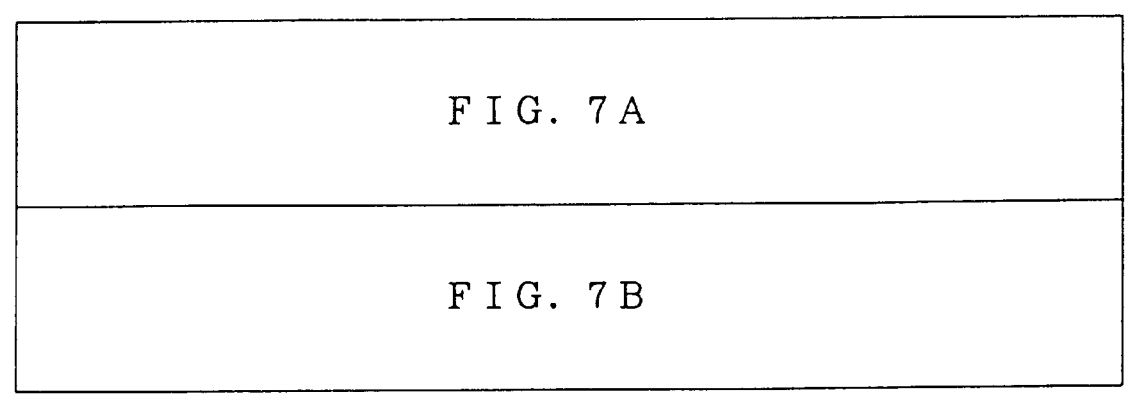

Referring to the drawings, a description will be made hereinbelow of an operation of the dictionary and index creating system thus arranged, using an example based upon a simple word dictionary and a simple retrieval document. FIG. 29 is an illustration of an example of lists of words organizing a word dictionary, FIG. 30 is an illustration of an example of retrieval documents, FIG. 2 is an illustration of an example of regular expression dictionaries made using the word dictionary comprising the words shown in FIG. 29, FIGS. 3 to 6 are illustrations of examples of deducible index element tables, FIG. 7 is a conceptual illustration of processing for obtaining a regular expression matching with the rightmost partial strings at every character position, and FIG. 8 is a conceptual illustration of the contents of a word index made out from the FIG. 30 retrieval document through the use of a regular expression dictionary composed of the regular expressions shown in FIG. 2.

In this instance, as a character set Σ, there are used "hiragana" characters "a" to "n", "Katakana" characters "a" to "n" and JIS first level standard Chinese characters (character class) "A" to "WAN". Let it be assumed that other characters do not appear in the retrieval document 101 as well as in the word dictionary 102.

First of all, prior to the preparation of an index, the dictionary data having the contents shown in FIG. 29 are stored in the word dictionary 101 while the retrieval document data shown in FIG. 30 are put in the retrieval document 102. In addition, the observing character position is set to the head of the sentence, and the temporary storage area 110 is set to an empty condition. Before the creation of the word index 113, first, each of the words in the word dictionary 101 having the contents shown in FIG. 29 is read out by the regular expression creating means 103, thereby creating regular expressions. The regular expression creating means 103 creates one or more regular expressions, depending upon the number of characters, for each of the words in the word dictionary 101 according to the following three rules.

(1) If the number of characters of the observing word w assumes 1 or 2, any one of the following character groups is added to the left- and right-hand sides of w, thus producing 16 regular expressions in total.

[a-go a-g o A-KON]
[sa-do s a-d o SA-DON]
[na-po n a-p o NA-BON]
[ma-n m a-n MA-WAN]

(2) If the number of characters of the observing word w assumes 3, any one of the following character groups is added to the left- and right-hand sides of w, thus producing 4 regular expressions in total.

[a-do a-d o A-BON]
[na-n n a-n NA-WAN]

(3) If the number of characters of the observing word w takes 4, Σ is added to the left- and right-hand sides of w, thus producing one regular expression ΣwΣ.

(4) If the number of characters of the observing word w takes 5, Σ is added to the left-hand side of w to produce a regular expression Σw and is also added to the right-hand side of w to produce a regular expression wΣ: 2 regular expressions in total.

(5) If the number of characters of the observing word w takes 6 or more, one regular expression composed of only w is produced.

In FIG. 2, for instance, for the word "i" in the word dictionary, because of being a one-character word, 16 regular expressions from "[a-go a-g o A-KON] i [a-go a-g o A-KON]" to "[ma-n m a-n MA-WAN] i [ma-n m a-n MA-WAN]+ are produced. Further, for a word "yo ri mo", because of a three-character word, 4 regular expressions are produced as indicated below.

"[a-do a-d o A-DON] yo ri mo [a-do a-d o A-DON]"
"[a-do a-d o A-DON] yo ri mo [na-n na-n NA-WAN]"
"[na-n n a-n NA-WAN] yo ri mo [a-do a-d o A-DON]"
"[na-n n a-n NA-WAN] yo ri mo [na-n n a-n NA-WAN]"

Furthermore, in terms of a word "A NICHI DEN SHI", because of a four-character word, only "Σ A NICHI DEN SHI Σ" is produced. Still further, for a word "DEN SHI s u p i n", because or a five-character word, two regular expressions "ΣDEN SHI s u p i n" and "DEN SHI s u p i n Σ" are made out. For a word "A NICHI DEN SHI KO GYO" or " s u p i n KYO MEI KYUSHU", because the number of characters is 6 or more, a regular expression "A NICHI DEN SHI KO GYO" or "s u p i n KYO MEI KYU SHU", Thus, the regular expression dictionary shown in FIG. 2 is created in this way. Further, at the same time, the maximal value L of the number of characters of matching character strings of each of the regular expressions created is obtained and recorded in the regular expression dictionary.

In the second place, the deducible index element table 108 having the contents shown in FIGS. 3 to 6 is drawn up from the regular expression dictionary 104 having the contents shown in FIG. 2. In each of lines in FIGS. 3 to 6, the index element $(t_1, [p+a_1, -1, p+a_1+|t_1|-2]), \ldots, (t_m, [p+a_m-1, p+a_m+|t_m|-2])$ is deducible from the index element $(s, [p, q])$, that is, if the index element $(s, [p, q])$ is retrieved by the rightmost regular expression retrieving means 109, in the case that in consequence the index element $(t_1, [p+a_1-1, p+a_1+|t_1|-2]), \ldots, (t_m, [p+a_m-1, p+a_m+|t_m|-2])$ is certainly deducible, all the deducible index elements of the regular expression s are listed in the following form.

$$s \rightarrow (t_1, a_1), \ldots, (t_m, a_m)$$

The procedure for drawing up this table in the deducible index element table creating means 107 is as follows. First, the regular expressions are successively read out from the regular expression dictionary 104 having the contents shown in FIG. 2. In this instance, the first reading-out begins with "[a-go a-g o A-KON] i [a-go a-g o A-KON]". Then, of the regular expressions other than this observing regular expression "[a-go a-g o A-KON] i [a-go a-g o A-KON]", the regular expressions equal or smaller in number of characters to or than the matching character string are scanned in order as regular expressions undergoing the examination (which will be referred hereinafter to as examination regular expressions), and the examination is made whether or not being deducible from the index element of the observing regular expression, so that all the deducible regular expressions are obtained. In the case that the deducible regular expression found is one or more in number, they are outputted in the aforesaid form of s→($t_1$, $a_1$), . . . , ($t_m$, $a_m$).

The above-mentioned operation continues until all the regular expressions in the regular expression dictionary 104 are read out as the observing regular expressions, thereafter coming to an end.

The decision as to whether deducible or not is made as follows. First, in case where the number of characters of the matching character string of the observing regular expression is larger by N characters than the number of characters of the matching character string of the examination regular expression, the patterns corresponding to k characters from the left end of the observing regular expression and corresponding to N-k characters from the right end thereof are deleted to produce a deleted observing regular expression so that the numbers of characters of the matching character strings coincide with each other. However, k is systematically shifted from 0 to N. examination is made to each examination regular expression as to whether or not the character string set represented by the deleted observing regular expression coincides with a partial set of the character string set indicated by examination regular expression. In the case that the character string set the deleted observing regular expression expresses is equal to the partial set of the character string set the examination regular expression represents, the examination regular expression surely comes into matching, and a decision is made to that the index element of the examination regular expression that the relative matching start character position separates by k is deducible from the index element of the deleted observing regular expression. On the other hand, in case where the character string set the deleted observing regular expression expresses does not assume the partial set of the character string set the examination regular expression represents, a decision is made to that it is non-deducible.

For instance, in the case that the observing regular expression is "[a-go a-g o A-KON] i [a-go a-g o A-KON]", the number of characters of the matching character string reaches 3. Although "[a-go a-g o A-KON] i [sa-do s a-d o SA-DON]" is first selected as the examination regular expression, the number of characters of the matching character string of this regular expression is also 3, N=0, that is, k assumes only 0, so that the deleted observing regular expression becomes the observing regular expression itself. Since the character string set represented by the deleted observing regular expression and the character string set denoted by the examination regular expression do not have a common portion and a partial set does not occur, a decision is made to that the index element of this examination regular expression is non-deducible. Further, although "[a-go a-g o A-KON] i [na-po n a-p o NA-BON]" is selected as the second examination regular expression, similarly the character string set represented by this regular expression and the character string set expressed by the observing regular expression do not have a common portion and are not in a partial set relation to each other, a decision is made to that it is non-deducible.

As described above, in the FIG. 2 regular expression dictionary, the regular expressions where the number of characters of the matching character string is smaller than 3 are successively selected as the examination regular expressions and the decision is made as to whether deducible or not. Nothing is decided as being deducible from the observing regular expression [a-go a-g o A-KON] i [a-go a-g o A-KON]", and this observing regular expression does not have a deducible index element, and hence, nothing is outputted to the deducible index element table 108.

Furthermore, for instance, when "[a-go a-g o A-KON] no de [a-go a-g o A-KON]" is selected as the observing regular expression, the number of characters of the matching character string of this regular expression is 4, and therefore, the regular expressions where the number of characters of the matching character string is smaller than 4 are successively chosen as the examination regular expressions.

Now, if "[a-go a-g o A-KON] no [sa-do s a-d o SA-DON]" is selected as the examination regular expression, since the number of characters of the matching character string is 3, N=1, the check is made in terms of two cases of k=0 and k=1. In the case of k=0, "[a-go a-g o A-KON] no de" after the deletion of "[a-go a-g o A-KON]" of the final pattern of the observing regular expression becomes the deleted observing regular expression, and the elements of the character string set {"a no d e", . . . , "o no d e", . . . , "a no d e", . . . , "o no d e", . . . , "A no d e", . . . , "KON no d e"} expressed by this deleted observing regular expression are all the elements of the character string set expressed by the examination regular expression "[a-go a-g o A-KON] no [sa-do s a-d o SA-DON]" (because, "sa-do s a-d o SA-DON]" comes into matching with "de"), and hence the character string set this deleted observing regular expression expresses coincides with the partial set of the character string set the examination regular expression expresses. Accordingly, a decision is made to that the index element ("[a-go a-g o A-KON] no [sa-do s a-d o SA-DON]", [p, p+2]) is deducible from the index element ("[a-go a-g o A-KON] no de [a-go a-g o A-KON]", [p, p+3]).

On the other hand, in the case of k=1, "no de [a-go a-g o A-KON]" after the deletion of "[a-go a-g o A-KON]" from the start pattern of the observing regular expression makes the deleted observing regular expression, and the character string set {"no de a", . . . , "no de o", . . . , "no de a", . . . , "no de o", . . . , "no de A", . . . , "no de KON"} expressed by this deleted observing regular expression, all the elements are not included in the character string set expressed b y the examination regular expression ("[a-go a-g o A-KON] no [sa-do s a-d o SA-DON]" (the first and second characters differ), and hence, the decision is made to that the index element is non-deducible.

Even if "[na-po n a-p o NA-BON] de [a-go a-g o A-KON]" is chosen as the examination regular expression, as well as in the above-mentioned case, N=1, and in the case of k=1, a decision is made to that the index element ("[na-po n a-p o NA-BON] de [a-go a-g o A-KON]", [p+1, p+3]) is deducible from the index element ("[a-go a-g o A-KON] no de [a-go a-g o A-KON]", [p, p+3]).

In the case of the examination regular expression other than these two, no deducible index element exists, and [a-go a-g o A-KON] no de [a-go a-g o A-KON]"→("[a-go a-g o A-KON] no [sa-do s a-d o SA-DON]", 1), ("[na-po n a-p o DNA-BON] de [a-go a-g o A-KON]", 2) is outputted finally for this observing regular expression.

With the above-described operations, the deducible index elements are obtainable in relation to all the regular expressions shown in FIG. 2, thus making the deducible index element table 108 shown in FIGS. 3 to 6.

After the deducible index element table 108 shown in FIGS. 3 to 6 is thus drawn up, in the third place, the rightmost regular expression dictionary creating means 105 produces the rightmost regular expression dictionary 109 in the form of a deterministic finite-state machine from the regular expression dictionary 104 having the contents shown in FIG. 2. This finite-state machine corresponds to a regular expression set composed of all t=(Σ*)s made by adding a regular expression Σ* to before each of the regular expressions in the regular expression dictionary 104, and when the characters of the character string of the retrieval document is inputted one by one from the head, the state transition occurs by the character, and an operation is made as "character string matching machine" which outputs all the regular expressions s matching with the rightmost partial character strings of the character string up to that character, so that the retrieval of the rightmost expression is effectively possible with the processing comprising only one state transition irrespective of the number of regular expressions within the regular expression dictionary 104. A method of producing this deterministic finite-state machine according to "Robinson's Method" and "Partial Set Constructing Method" is written in the above-mentioned textbooks and the state transition diagram of the deterministic finite-state machine being the production result is extremely complicated, and therefore, the description of the production procedure and the production result will be omitted for brevity.

The above-described three processing are conducted to create the regular expression dictionary 104, the deducible index element table 108 and the rightmost regular expression dictionary 106, and then the fourth processing starts to produce the word index 113 from the retrieval document 102.

The independent index element creating means 110 successively reads the retrieval document 102 and drives the rightmost regular expression retrieving means 109 to obtain all the regular expressions s matching with the rightmost partial character strings up to the observing character position q and makes the temporary storage area 111 store them together with the matching character positional ranges [p, q] as the index elements (s, [p, q]), and further retrieves the elements having the form of s→($t_1$, $a_1$), . . . , ($t_m$, $a_m$) from the deducible index element table 108 using each of the retrieved regular expressions s as a key to obtain candidates ($t_1$, [p+$a_1$−1, p+$a_1$+|$t_1$|−2]), . . . , ($t_m$, [p+$a_m$−1, p+$a_m$+|$t_m$|−2) for the deducible index elements of the index elements (s, [p, q]). If these candidates exist in the temporary storage area 111, these index elements are removed. Thereafter, in the temporary storage area 111, the index elements that the matching start character position is below (q+1−L) is not deleted finally with the following processing because the number of characters of the matching character string of the regular expression in the regular expression dictionary 104 is L, and therefore, is outputted as "independent index element" (the index element non-deducible from any other index elements), and the index element outputted is unnecessary for the following processing and, hence, is removed from the temporary storage area 111. The independent index element creating means 110 repeats the above-described operations until the observing character position q reaches the end of the retrieval document 102. At last, all the index elements in the temporary storage area 111 are outputted, and thereafter the independent index element creating processing comes to an end.

Referring to the FIG. 7 conceptual illustration, a description will be made hereinbelow of the processing for obtaining the independent index element to the retrieval document having the contents shown in FIG. 30 through the use of the regular expression dictionary 104 having the contents shown in FIG. 2, the corresponding deducible index element table 108 and the rightmost regular expression dictionary 106. In FIG. 7, portions of the regular expression pattern are denoted with symbols 1 to 6 surrounded by a circle for simplicity.

After the leading character "A" is read at the observing character position q=1, the rightmost regular expression retrieving means 109 retrieves from the rightmost regular expression dictionary 106 the regular expressions being in matching with the rightmost partial character string of "A", that is, "A" itself. However, as is obvious from FIG. 2, there is no pertinent regular expression therein. (In the regular expressions in FIG. 2, the number of characters of their matching character string is 3 to 7.) Since the temporary storage area 111 is empty, the deleting processing and the outputting processing are not done.

At q=2, the second character "NICHI" is taken in. Although the rightmost regular expression retrieving means 109 retrieves the regular expressions being in matching with the rightmost partial character strings of "A NICHI", i.e., either "NICHI" or "A NICHI", similarly there is no pertinent regular expression. The temporary storage area 111 is empty, thus not conducting the deleting processing and the outputting processing.

Even at q=3, the character string "A NICHI DEN" up to the third character "DEN" also makes no pertinent expression. Likewise, the deleting processing and the outputting processing are not done because the temporary storage area 111 is empty.

When q=4, "A NICHI DEN SHI" being one of the rightmost partial character strings of the character string "A NICHI DEN SHI" up to the fourth character "SHI" comes into matching with the regular expression "[a-go a-g o A-KON] NICHI DEN [sa-do s a-d o SA-DON]" produced from "NICHI DEN", and "NICHI DEN SHI" being one of the rightmost partial character strings of "A NICHI DEN SHI" comes into matching with the regular expression "[na-po n a-p o NA-BON]DEN[sa-do s a-d o SA-DON]" produced from "DEN",and hence, the two index elements ("[a-go a-g o A-KON] NICHI DEN [sa-do s a-d o SA-DON]", [1, 4]) and ("[na-po n a-p o NA-BON] DEN [sa-do s a-d o SA-DON]", [2,4]) of the two regular expressions are recorded in the temporary storage area 111. In the deducible index element table 108 having the contents shown in FIGS. 3 to 6, there is the element having the form of "[a-go a-g o A-KON] NICHI DEN [sa-do s a-d o SA-DON]"→("[na-po n a-p o NA-BON] DEN [sa-do s a-d o SA-DON]", 1), and it is found from ("[a-go a-g o A-KON] NICHI DEN [sa-do s a-d o SA-DON]", [1, 4]) that ("[na-po n a-p o NA-BON] DEN [sa-do s a-do SA-DON]", [2, 4]) is deducible. This deducible index element is one of the index elements stored just now in the temporary storage area 111, and this index element is removed from the temporary storage area 111. As written in (Note 2) of FIG. 7, the index elements to be deleted are surrounded with a box in FIG. 7. Further, since (q+1−L)=4+1−7=−2, the final elements which are free from deletion do not exist in the temporary storage area 111, thus not conducting the outputting processing. In consequence, at the time of the completion of the processing at q=4, the temporary storage area 111 retains only one index element ("[a-go a-g o A-KON] NICHI DEN [sa-do s a-d o SA-DON]", [1, 4]).

When q=5, of the rightmost partial character strings of the character string "A NICHI DEN SHI no" up to the fifth character "no", the regular expression "[na-po n a-p o NA-BON] DEN SHI [na-po n a-p o NA-BON]" produced from "DEN SHI" comes into matching with only "NICHI DEN SHI no", and the index element ("[na-po n a-p o NA-BON] DEN SHI [na-po n a-p o NA-BON]", [2, 5]) is stored in the temporary storage area 111. The deducible index element of this index element is ("[na-po n a-p o NA-BON] DEN [sa-do s a-d o SA-DON]", [2, 4]) as found from FIG. 6, but does not exists in the temporary storage area 111 because of being already deleted at q=4, so that the deleting processing is not done. Since (q+1−L)=5+1−7=−1, similarly the outputting processing is not done. In consequence, at the time of the completion of the processing at q=5, the temporary storage area 111 stores two index elements ("[a-go a-g o A-KON] NICHI DEN [sa-do s a-d o SA-DON]", [1, 4]) and ("[na-po n a-p o NA-BON] DEN SHI [na-po n a-p o NA-BON]", [2, 5]).

At q=6, of the rightmost partial character strings of the character string "A NICHI DEN SHI no DEN" up to the sixth character "DEN", the regular expression "[sa-do s a-d o SA-DON] no [sa-do s a-d o SA-DON]" produced from "no" comes into matching with only "SHI no DEN", and the index element ("[sa-do s a-d o SA-DON] NO [sa-do s a-d o SA-DON]", [4, 6]) is stored in the temporary storage area 111. The deleting processing is not done because there is no deducible index element to this regular expression. Further, since (q+1−L)=6+1−7=0, the outputting processing is not done. As a result, at the time of the completion of the processing at q=6, the temporary storage area 111 retains three index elements ("[a-go a-g o A-KON] NICHI DEN [sa-do s a-d o SA-DON]", [1, 4]) and ("[na-po n a-p o NA-BON] DEN SHI [na-po n a-p o NA-BON]", [2, 5]), and ("[sa-do s a-d o SA-DON] no [sa-do s a-d o SA-DON]", [4, 6]).

At q=7, in the rightmost partial character strings of the character string "A NICHI DEN SHI no DEN SHI" up to the seventh character "DEN", the regular expression "[na-po n a-p o NA-BON] DEN [sa-do s a-d o SA-DON]" produced from "DEN" comes into matching with only "no DEN SHI", and the index element ("[na-po n a-p o NA-BON] DEN [sa-do s a-d o SA-DON]", [5, 7]) is stored in the temporary storage area 111. Since there is no deducible index element to this regular expression, no deleting processing is done. Further, since (q+1−L)=7+1−7=1, the index element ("[a-go a-g o A-KON] NICHI DEN[sa-do s a-d o SA-DON]", [1, 4]), whose matching start character position is below 1, in the temporary storage area 111 is decided as being not deleted, and is outputted as the independent index element, but is removed from the temporary storage area 111. As a result, at the time of the completion of the processing at q=7, three index elements ("[na-po n a-p o NA-BON] DEN SHI [na-po n a-p o NA-BON]", [2, 5]), ("[sa-do s a-d o SA-DON] NO [sa-do s a-d o SA-DON]", [4, 6]), and ("[na-po n a-p o NA-BON] DEN ("[sa-do s a-p o SA-DON]", [5, 7]) are stored in the temporary storage area 111.

At q=8, in the rightmost partial character strings of the character string "A NICHI DEN SHI no DEN SHI su" up to the seventh character "su", the regular expression "[na-po n a-p o NA-BON] DEN SHI [sa-do s a-d o SA-DON]" produced from "DEN SHI" comes into matching with only "no DEN SHI su", and the index element ("[na-po n a-p o NA-BON] DEN SHI [sa-do s a-d o SA-DON]", [5, 8]) is stored in the temporary storage area 111. The deducible index element of this index element is ("[na-po n a-p o NA-BON] DEN [sa-do s a-p o SA-DON]", [5, 7]) as obvious from FIG. 6, but this index element is deleted because of existing in the temporary storage area 111. Thereafter, ("[na-po n a-p o NA-BON] DEN SHI [na-po n a-p o NA-BON]", [2, 5]) is outputted as the index element, of the matching start character position being below (q+1−L)=8+1−7=2, in the temporary storage area 111, and is simultaneously removed from the pemtorary storage area 111. In consequence, at the time of the completion of the processing at q=8, two index elements ("[sa-do s a-d o SA-DON] no [sa-do s a-d o SA-DON]", [4, 6]) and ("[na-po n a-p o NA-BON] DEN SHI [na-po n a-p o NA-BON]", [5, 8]) are stored in the temporary storage area 111.

Thus, the processing is successively advanced in a state where the character position q is shifted one by one backwardly, and after the completion of the processing at q=31 corresponding to the text end, the index elements ("[a-go a-g o A-KON] ga [sa-do s a-d o SA-DON]", [27, 29]) and ("[a-go a-g o A-KON] Oki [a-go a-g o A-KON]", [28, 31]) are outputted from the temporary storage area 111, and the independent index element creating processing comes to an end. At the time of the creating processing completion, as shown in FIG. 7, 6 index elements surrounded by a rectangle are deleted while the remaining 20 index elements are outputted as the independent index elements.

The independent index element creating processing ends with the above-described fourth processing, and then the fifth processing starts to make a lineup of the independent index elements. The index element lineup means 112 processes the index elements, outputted from the independent index element creating means 110, according to the following four rules or standards:

(1) The index elements are arranged in the ascending order (that is, in the order conforming to the dictionary) of the character strings in the word dictionary the regular expressions originate;

(2) The index elements taking the same order under the above-mentioned rule (1) are arranged in the ascending order of the regular expressions added to the left-hand side of the corresponding character strings;

(3) The index elements taking the same order under the above-mentioned rule (2) are arranged in the ascending order of the regular expressions added to the right-hand side of the corresponding character strings; and (4) The index elements taking the same order under the above-mentioned rule (3) are arranged in the ascending order of the matching character positional ranges.

In this case, the "order of regular expressions" is determined in accordance with the relationship in size or length between the minimum character strings of the character string set the regular expressions express, and if the minimum character strings are the same, the orders depend upon the relationship in size between the character strings following the minimum character strings, and likewise, the comparison is made between the larger character strings until the relationship in size therebetween is settled. In case where the character string on one regular expression side ends during the comparison, that character string is decided as being smaller. Further, if the character strings on both the regular expression sides concurrently run out, both are considered as being equal to each other.

On the other hand, the "order of matching character positional ranges" depends upon the relationship between the matching start character positions, and if the matching start character positions coincide with each other, the relationship between the matching end character positions is put to use.

For example, in the case of the regular expression s=[a-go a-g o A-KON]"and the regular expression t="[a-do a-g o SA-DON]", the character string set S the regular expression s expresses corresponds to a partial set of the character string set T the regular expression t represents, and since the character string to be compared on the s side runs out, the comparison results shows s<t. Further, in the case of the regular expression s ="[a-go a-g o A-KON]"and the regular expression t="i", because the minimum element of the character string set S the regular expression s represents is "a", the comparison result makes s<t. In accordance with the above-described lineup rules, the index element lineup means 112 arranges 20 index elements as shown in FIG. 8 through the use of the "quick sort" method which is a commonly employed lineup technique to draw up the word index 113. Whereupon, the regular expression dictionary creation and word index creation processing comes to an end.

As described above, according to the dictionary and index creating system constituting the first embodiment of this invention, since the word index is made out in the form of the independent (non-deducible) index element strings using the regular expressions, as compared with the prior index creating method, the matching character positional range of each of the index elements becomes longer and makes a larger overlapping portion, and therefore, it is possible to sharply reduce the case that "the retrieval character strings are covered with words having a relatively small number of characters and making less overlap with each other" which causes the impairment of efficiency inherent in the prior word index, thereby permitting higher-speed full-text retrieval processing.

Second Embodiment

A second embodiment of the present invention relates to a dictionary and index creating system which gives a special character as a start/end mark to before and after a retrieval document to create a regular expression dictionary and a word index.

Figure 9:
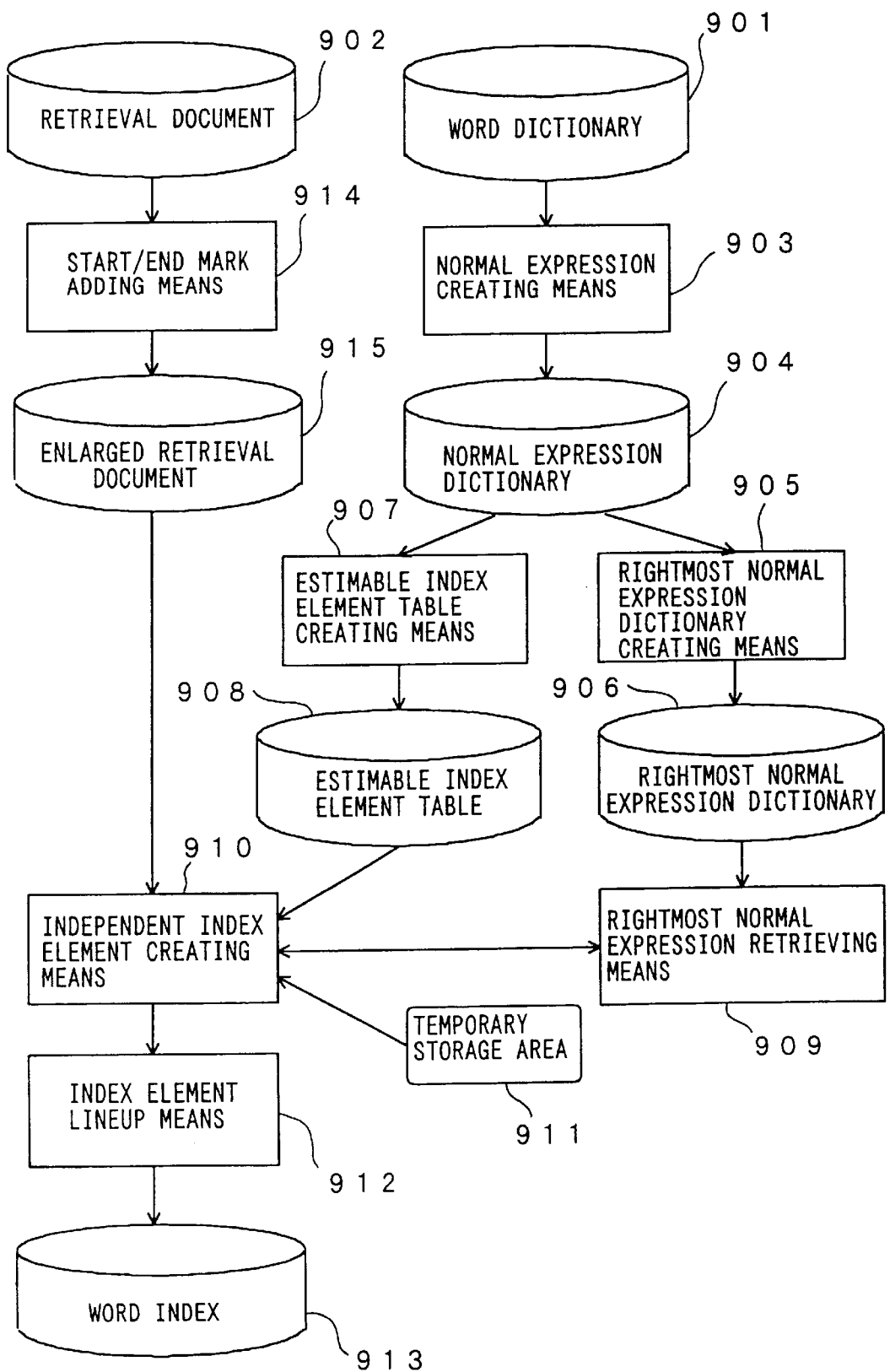
FIG. 9 is a block diagram showing the entire arrangement of a dictionary and index creating system according to a second embodiment of the present invention.

Referring to FIGS. 9 to 12, a description will be made hereinbelow of the dictionary and index creating system according to the second embodiment of this invention. FIG. 9 is a block diagram showing the whole arrangement of the dictionary and index creating system according to the second embodiment.

In FIG. 9, the dictionary and index creating system is composed of a word dictionary 901, a retrieval document 902, a start/end mark adding means 914 for giving one special character "?" to the head and end of the retrieval document 902, an enlarged retrieval document 915 outputted from the start/end mark adding means 914, a regular expression creating means 903 for creating one or more regular expressions on the basis of each of words (character strings) in 15 the word dictionary 901 according to a predetermined rule(s), and a regular expression dictionary 904 for storing a set of regular expressions created by the regular expression creating means 903.

Also included in the dictionary and index creating system are a rightmost regular expression dictionary creating means 905 for creating a dictionary in the form of a finite-state machine for retrieving all the regular expressions of the regular expression set 904 matching with the rightmost partial string(s) of a specified character string, a rightmost regular expression dictionary 906 created by the rightmost regular expression dictionary creating means 905, and a deducible index element table creating means 907 for, when an arbitrary character string x is in matching with each of regular expressions s in the regular expression dictionary 904, obtaining all sets (t, p) of a different regular expression t making it certainly deducible that the character string x is also in matching with the regular expression t and a relative character position p being the matching start character position of t taken for when the matching start character position of s is 1 (or a different appropriate number).

Further included therein are a deducible index element table 908 for storing all the deducible index elements obtained by the deducible index element table creating means 907, a rightmost regular expression retrieving means 909 for conducting retrieval to the rightmost regular expression dictionary 906 with respect to the specified character string to obtain, of the regular expressions being in matching with the character string, all the regular expressions whose matching end character position coincides with the last character position of the character string, that is, the regular expressions being in matching with the rightmost partial string(s) of the character string, and a temporary storage area 911 for temporarily storing index elements Still further included therein is an independent index element creating means 910 for successively reading the enlarged retrieval document 915 and for driving the rightmost regular expression retrieving means 909 to obtain all the regular expressions matching with the rightmost partial character strings up to an observing character position so that the regular expressions, together with the matching character positional ranges, are stored as index elements in the temporary storage area 911, and further for performing retrieval to the deducible index element table 908 so that the deducible index element which exists in the temporary storage area 911 is removed from the stored index elements, and even for outputting the independent index elements left in the temporary storage area 911 after the removal, with the independent index element creating means 910 repeating these operations until reaching the end of the enlarged retrieval document 915.

Moreover, included therein are an index element lineup means 912 for arranging the independent index elements, outputted from the independent index element creating means 910, in the order originating from the words of the regular expressions (in this case, if the character strings originating from the words are the same, in a predetermined constant order depending upon the regular expressions before and after them), and a word index 913 outputted from the index element lineup means 912. The components 901 to 913 in FIG. 9 correspond to the components 101 to 113 in FIG. 1 being the block diagram showing the first embodiment.

Figures 10, 10A, 10B, 10C, 10D, 10E, 10F:
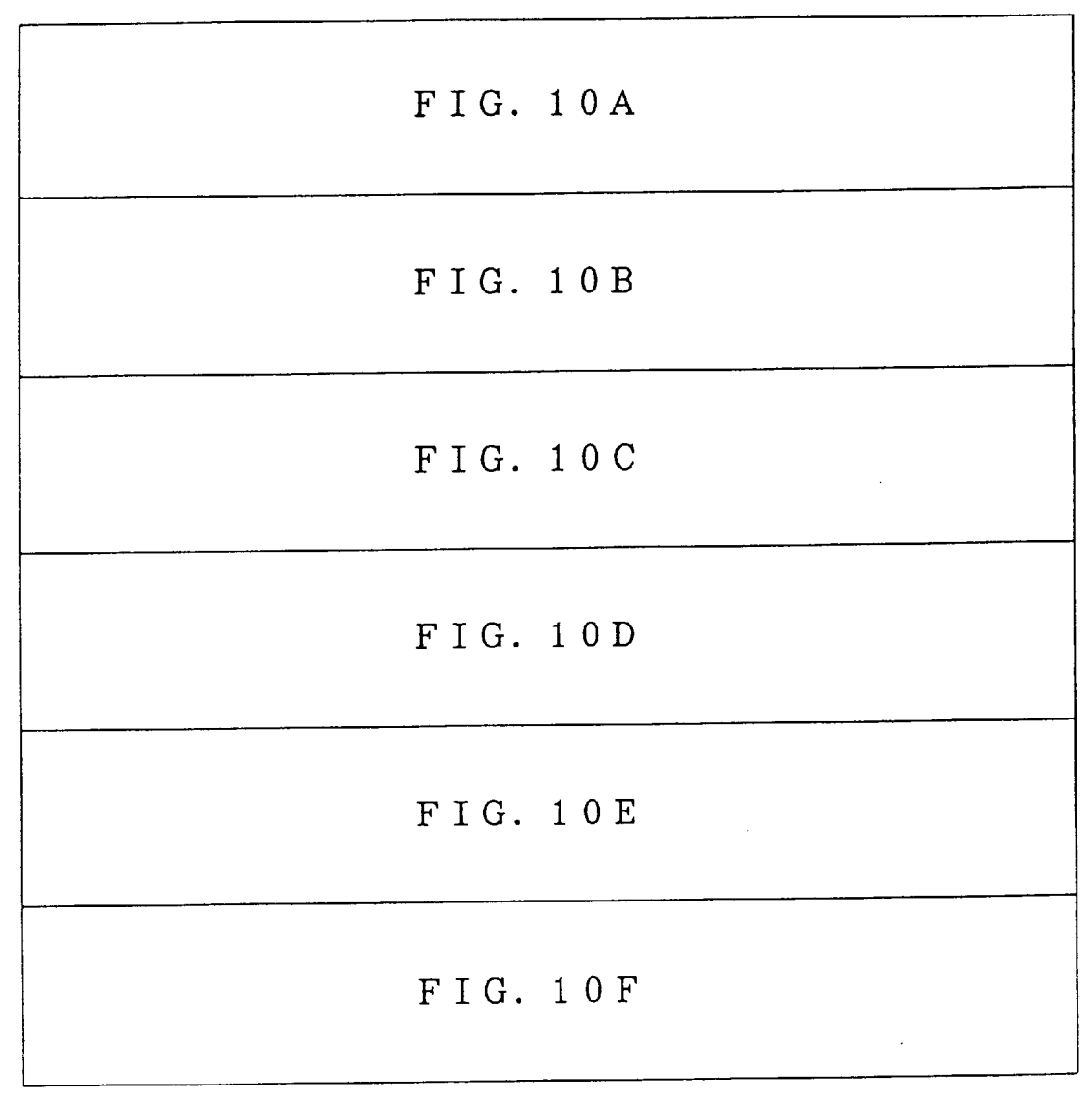

Referring to the drawings, a description will be made hereinbelow of an operation of the dictionary and index creating system thus constructed using an example involving a simple word dictionary and a simple retrieval document. FIG. 29 is an illustration of an example of lists of words constituting a word dictionary, FIG. 30 is an illustration of an example of retrieval documents, FIG. 10 is an illustration of an example of regular expression dictionaries produced on the basis of the word dictionary comprising the words shown in FIG. 29, FIG. 1 is a conceptual illustration of the processing for obtaining the regular expression matching with the rightmost partial string at every character position from the head of the enlarged retrieval document made by adding a character "?" to across the FIG. 30 retrieval document, and FIG. 12 is a conceptual illustration of the contents of a word index drawn up through the use of the regular expression dictionary composed of the regular expressions shown in FIG. 10.

In this instance, as character sets Σ, there are used "hiragana" characters "a" to "n", "katakana" characters "a" to "n", JAS first standard Chinese characters "A" to "WAN", and a special character "?". Let it be assumed that, for the comparison in size between characters, "?" is smaller than any other character and, the special character "?" and the other characters do not appear in the retrieval document 901 as well as in the word dictionary 902.

First of all, prior to the preparation of an index, the dictionary data having the contents shown in FIG. 29 are stored in the word dictionary 901 while the retrieval document data shown in FIG. 30 are put in the retrieval document 902. Subsequently, the start/end mark adding means 914 produces a character string by giving "?" to before and after a character string being the retrieval document and puts it in the enlarged retrieval document 915. In addition, the observing character position is set to the head of the sentence, and the temporary storage area 910 is set to an empty condition. However, the "?" character position of the head of the document is set to 0 so that the character position of "A" being the original head character of the retrieval document becomes 1.

In this instance, in the regular expression creating means 903 which will be described herein later, since each of the character strings of the character string set represented by the regular expression made out from each of words in the word dictionary 901 corresponds to a character string made by adding a maximal one character to before and after the original word, the numbers of characters the start/end mark adding means 914 add to before and after the retrieval document 902 are determined to be 1, respectively.

Before the creation of the word index 913, first, each of the words in the word dictionary 901 having the contents shown in FIG. 29 is read out by the regular expression creating means 903, thereby creating regular expressions. The regular expression creating means 903 creates one or more regular expressions, depending upon the number of characters, for each of the words in the word dictionary 901 according to the following three rules as well as the regular expression creating means 103 in the first embodiment.

(1) If the number of characters of the observing word w assumes 1 or 2, any one of the following character groups is added to the left- and right-hand sides of w, thus producing 16 regular expressions in total.

[? a-go a-g o A-KON]
[sa-do s a-d o sa-do SA-DON]
[na-po n a-p o NA-BON]
[ma-n m a-a MA-WAN]

(2) If the number of characters of the observing word w assumes 3, any one of the following character groups is added to the left- and right-hand sides of w, thus producing 4 regular expressions in total.

[? a-do a-d o A-BON]
[na-n n a-n NA-WAN]

(3) If the number of characters of the observing word w takes 4, $\Sigma$ is added to the left- and right-hand sides of w, thus producing one regular expression $\Sigma w \Sigma$.

(4) If the number of characters of the observing word w takes 5, $\Sigma$ is added to the left-hand side of w to produce a regular expression $\Sigma w$ and is also added to the right-hand side of w to produce a regular expression $w\Sigma$: 2 regular expressions in total.

(5) If the number of characters of the observing word w takes 6 or more, one regular expression composed of only w is produced.

In FIG. 10, for instance, for the word "i" in the word dictionary, because of being a one-character word, 16 regular expressions from "[? a-go a-g o A-KON] i [a-go a-g o A-KON]" to "[? m a-n m a-n MA-WAN] i [ma-n m a-n MA-WAN]" are produced. Further, for a word "yo ri mo", because of a three-character word, 4 regular expressions are produced as indicated below.

[? a-do a-d o A-DON] yo ri mo [a-do a-d o A-DON]"
[? a-do a-d o A-DON] yo ri mo [na-n n a-n NA-WAN]"
[na-n n a-n NA-WAN] yo ri mo [? a-do a-d o A-DON]"
[na-n n a-n NA-WAN] yo ri mo [na-n n a-n NA-WAN]"

Thus, the regular expression dictionary shown in FIG. 10 is created in a way similar to the processing in the first embodiment. Further, at the same time, the maximal value L of the number of characters of matching character strings of each of the regular expressions created is obtained and recorded in the regular expression dictionary. In this instance, L=7 is stored therein.

In the second place, the deducible index element table 908 is created from the regular expression diction 904 having the contents shown in FIG. 10. The format of the deducible index element table 908 and the creating procedure of the deducible index element table 908 are the same as those in the first embodiment, and the description thereof will be omitted for brevity.

After the deducible index element table 908 is thus drawn up, in the third place, the rightmost regular expression dictionary creating means 905 produces the rightmost regular expression dictionary 909 in the form of a deterministic finite-state machine from the regular expression dictionary 904 having the contents shown in FIG. 2. This finite-state machine corresponds to a regular expression set composed of all $t=(\Sigma^*)$s made by adding a regular expression $\Sigma^*$ to before each of the regular expressions in the regular expression dictionary 904, and when the characters of the character string of the retrieval document is inputted one by one from the head, the state transition occurs by the character, and an operation is made as "character string matching machine" which outputs all the regular expressions s matching with the rightmost partial character strings of the character string up to that character, with it being made out as in the case of the first embodiment.

The above-described three processing are conducted to create the regular expression dictionary 904, the deducible index element table 908 and the rightmost regular expression dictionary 906, and then the fourth processing starts to produce the word index 913 from the enlarged retrieval document 915.

The independent index element creating means 910 successively reads the enlarged retrieval document 915 and drives the rightmost regular expression retrieving means 909 to obtain all the regular expressions s matching with the rightmost partial character strings up to the observing character position q (the head position takes 0) and makes the temporary storage area 911 store them together with the matching character positional ranges [p, q] as the index elements (s, [p, q]), and further retrieves the elements having the form of s→($t_1$, $a_1$), . . . , ($t_m$, $a_m$) from the deducible index element table 908 using each of the retrieved regular expressions s as a key to obtain candidates ($t_1$, [p+$a_1$−1, p+$a_1$+|$t_1$|−2]), . . . , ($t_m$, [p+$a_m$−1, p+$a_m$+|$t_m$|−2]) for the deducible index elements of the index elements (s, [p, q]). If these candidates exist in the temporary storage area 911, these index elements are removed.

Thereafter, in the temporary storage area 911, the index elements whose matching start character position is below (q+1−L) is not deleted finally with the following processing because the number of characters of the matching character string of the regular expression in the regular expression dictionary 904 is L, and therefore, is outputted as "independent index element" (the index element non-deducible from any other index elements), and the index element outputted is unnecessary for the following processing and, hence, is removed from the temporary storage area 911. The independent index element creating means 910 repeats the above-described operations until the observing character position q reaches the end of the enlarged retrieval document 915. At last, all the index elements in the temporary storage area 911 are outputted, and thereafter the independent index element creating processing comes to an end.

FIG. 11 is a conceptual illustration of processing for obtaining independent index elements for the enlarged retrieval document, made by giving "?" to before and after the retrieval document having the FIG. 30 contents, through the use of the regular expression dictionary 904 having the FIG. 10 contents, the corresponding deducible index element table 908 and the rightmost regular expression dictionary 906. The processing procedure is the same as the processing procedure for the independent index element creation in the first embodiment except that the head character position is 0, and therefore, the description of the processing will be omitted for simplicity. However, because of the presence of "?" at the head, "Σ A NICHI DEN SHI Σ" is in matching, and hence, "circled 1 NICH DEN circled 2" and "circled 3 DEN SHI circled 3" are deleted, and further, because of the presence of "?" at the end, "circled 1 i circled 1" is in matching. Thus, as compared with the case of absence of "?", the processing results differ in the vicinity of the head and end of the document.

The independent index element creating processing ends with the above-described fourth processing, and then the fifth processing begins to make a lineup of the independent index elements. Since the lineup processing procedure in the index element lineup means 912 is also the same as that of the index element lineup means 112 in the first embodiment, and the description will be omitted for brevity. Only one difference is that the character "?" smaller than any character is added to the character set Σ. Finally, the word index 913 having the contents shown in FIG. 12 is made out, and the regular expression dictionary and word index creating processing comes to an end.

As described above, according to the dictionary and index creating system being the second embodiment of this invention, since the special character is given to across the retrieval document, the regular expressions drawn up on the basis of the words (character strings) matching with the head and end portions in the word dictionary come into matching with the head and end portions of the retrieval document, respectively, and hence, in the entire retrieval document including the head and end portions, as compared with the prior index creating method, the matching character positional range of each of the index elements becomes longer and the overlap enlarges, and therefore, it is possible to sharply reduce the case that "the retrieval character strings are covered with words having a relatively small number of characters and making less overlap with each other" which causes the impairment of efficiency inherent in the prior word index, thereby permitting higher-speed full-text retrieval processing.

Third Embodiment

A third embodiment of the present invention relates to a dictionary and index creating system which creates a regular expression dictionary and a word index by adding all one-character words, not existing in a word dictionary, to the word dictionary.

Figure 13:
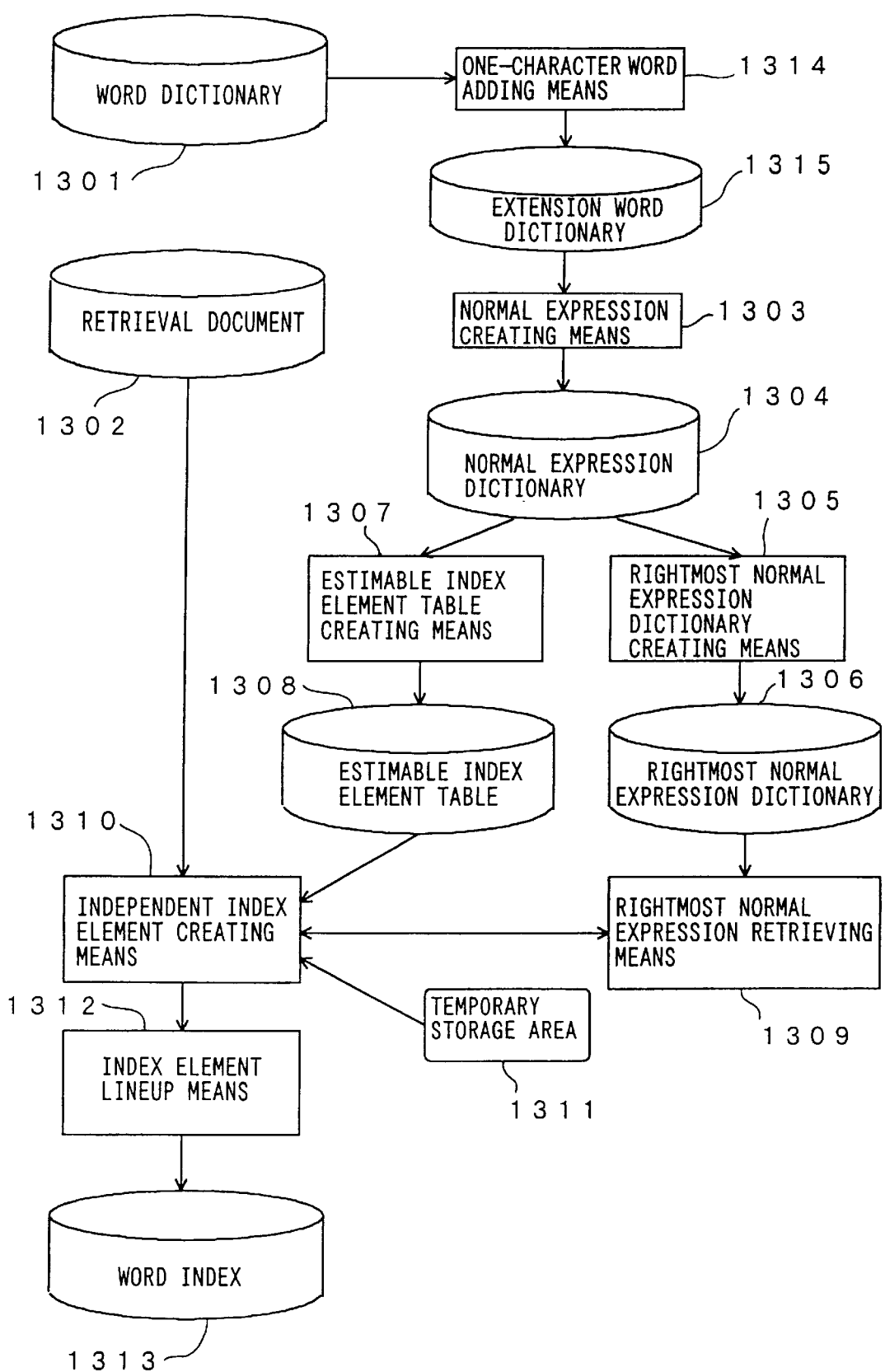
FIG. 13 is a block diagram showing the entire arrangement of a dictionary and index creating system according to a third embodiment of the present invention.

Referring to FIGS. 13 to 17, a description will be taken hereinbelow of the dictionary and index creating system according to the third embodiment. FIG. 13 is a block diagram showing the whole arrangement of the dictionary and index creating system according to the third embodiment.

In FIG. 13, the dictionary and index creating system is made up of a word dictionary 1301, a retrieval document 1302, a one-character word adding means 1314 for adding all one-character words, not existing the word dictionary 1301, to the word dictionary 1301, an extended word dictionary 1315 outputted from the one-character word adding means 1314, a regular expression creating means 1303 for creating one or more regular expressions on the basis of each of words (character strings) in the extended word dictionary 1315 according to a predetermined rule(s), and a regular expression dictionary 1304 for storing a set of regular expressions created by the regular expression creating means 1303.

Also included in the dictionary and index creating system are a rightmost regular expression dictionary creating means 1305 for creating a dictionary in the form of a finite-state machine for retrieving all the regular expressions of the regular expression set 1304 matching with the rightmost partial string(s) of a specified character string, a rightmost regular expression dictionary 1306 created by the rightmost regular expression dictionary creating means 1305, and a deducible index element creating means 907 for, when an arbitrary character string x is in matching with each of regular expressions s in the regular expression dictionary 1304, obtaining all sets (t, p) of a different regular expression t making it certainly deducible that the character string x is also in matching with the regular expression t and a relative character position p being the matching start character position of t taken for when the matching start character position of s is 1 (or a different appropriate number).

Further included therein are a deducible index element table 1308 for storing all the deducible index elements obtained by the deducible index element table creating means 1307, a rightmost regular expression retrieving means 1309 for conducting retrieval to the rightmost regular expression dictionary 1306 with respect to the specified character string to obtain, of the regular expressions being in matching with the character string, all the regular expressions whose matching end character position coincides with the last character position of the character string, that is, the regular expressions being in matching with the rightmost partial string(s) of the character string, a temporary storage area 1311 for temporarily storing index elements, and an independent index element creating means 1310 for successively reading the retrieval document 1302 and for driving the rightmost regular expression retrieving means 1309 to obtain all the regular expressions matching with the rightmost partial character strings up to an observing character position so that the regular expressions, together with the matching character positional ranges, are stored as index elements in the temporary storage area 1311, and further for performing retrieval to the deducible index element table 1308 so that the deducible index element which exists in the temporary storage area 1311 is removed from the stored index elements, and even for outputting the independent index elements left in the temporary storage area 1311 after the removal, with the independent index element creating means 1310 repeating these operations until reaching the end of the retrieval document 1302.

Moreover, included therein are an index element lineup means 1312 for arranging the independent index elements, outputted from the independent index element creating means 1310, in the order originating from the words of the regular expressions (in this case, if the character strings originating from the words are the same, in a predetermined constant order depending upon the regular expressions before and after them), and a word index 1313 outputted from the index element lineup means 1312. The components 1301 to 1313 in FIG. 9 correspond to the components 101 to 113 in FIG. 1 being the block diagram showing the first embodiment.

Referring to the drawings, a description will be made hereinbelow of an operation of the dictionary and index creating system thus constructed using an example involving a simple word dictionary and a simple retrieval document. FIG. 29 is an illustration of an example of lists of words constituting a word dictionary, FIG. 15 is an illustration of an example of retrieval documents, FIG. 14 is an illustration of an example of extended word dictionaries drawn up using the word dictionary comprising the words shown in FIG. 29, FIG. 16 is a conceptual illustration of the processing for obtaining the regular expression matching with the rightmost partial string at every character position from the head of the FIG. 15 retrieval document, and FIG. 17 is a conceptual illustration of the contents of a word index drawn up through the use of the regular expression dictionary made out on the basis of the FIG. 14 extended word dictionary.

In this instance, as character sets Σ, there are used "hiragana" characters "a" to "n", "katakana" characters "a" to "n" JAS first standard Chinese characters "A" to "WAN", and a special character "?". Let it be assumed that, in the comparison in size between characters, "hiragana" character is smaller than "katakana" character and "katakana" character is smaller than Chinese character and further the relationship in size between Chinese characters depends upon the size or length of "hiragana" strings in the Chinese sounds. In addition, the other characters do not appear in the retrieval document 1301 as well as in the word dictionary 1302.

First of all, prior to the preparation of an index, the dictionary data having the contents shown in FIG. 29 are stored in the word dictionary storage 1301 while the retrieval document data shown in FIG. 15 are put in the retrieval document storage 1302. Subsequently, the one-character word adding means 1314 produces a word dictionary with the FIG. 14 contents by adding all one-character words, not existing in the word dictionary 1310, to the word dictionary 1301 and puts it in the extended word dictionary 1315. In addition, the observing character position is set to the head of the text, and the temporary storage area 1310 is set to an empty condition.

Figures 14, 14A, 14B, 14C, 14D:
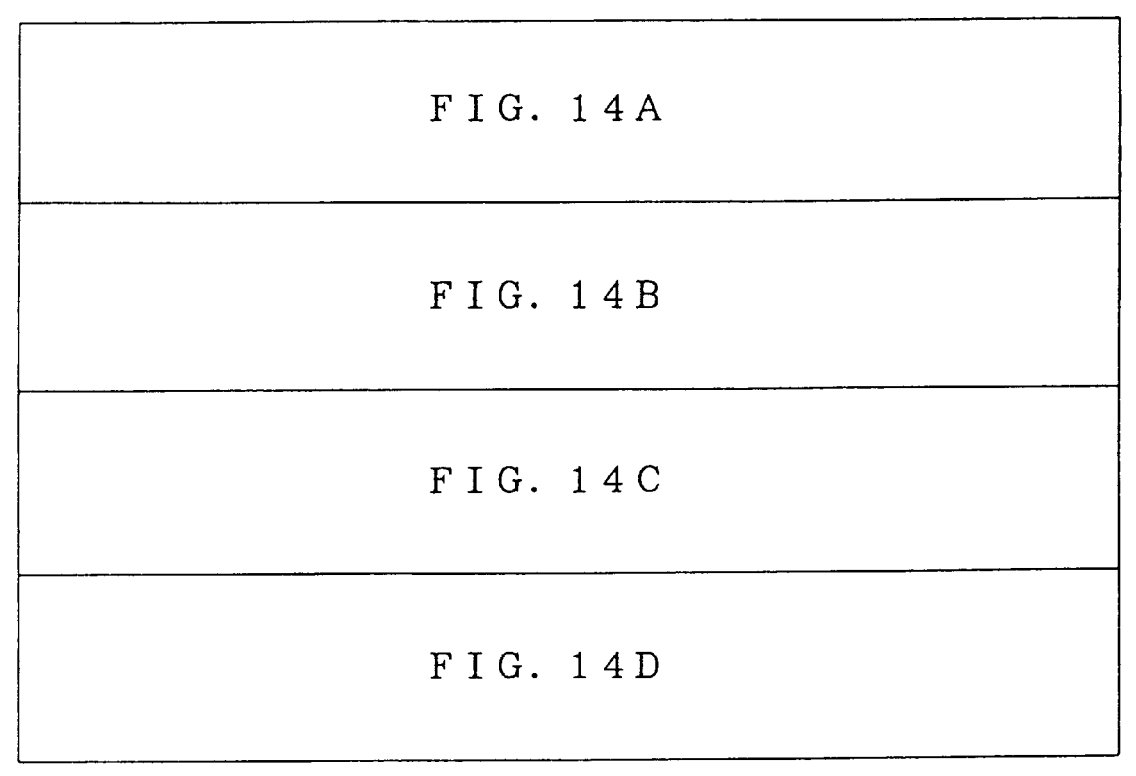

Before the creation of the word index 1313, first, each of the words in the extended word dictionary 1315 having the contents shown in FIG. 14 is read out by the regular expression creating means 1303, so that regular expressions are created in accordance with the processing similar to that of the first embodiment. At this time, simultaneously the maximal value L of the number of characters of the matching character strings of each of the created regular expressions is obtained and recorded in the regular expression dictionary. In this instance, L=7.

In the second place, the deducible index element table 1308 is created from the regular expression dictionary 1304. The format of the deducible index element table 1308 and the creating procedure of the deducible index element table 1308 are the same as those in the first embodiment, and the description thereof will be omitted for brevity.

In the third place, the rightmost regular expression dictionary creating means 1305 produces the rightmost regular expression dictionary 1309 in the form of a deterministic finite-state machine from the regular expression dictionary 1304. The creation procedure for the rightmost regular expression dictionary 1309 is the same as that of the first embodiment, and the description thereof will be omitted for brevity.

The above-described three processing are conducted to create the regular expression dictionary 1304, the deducible index element table 1308 and the rightmost regular expression dictionary 1306, and then the fourth processing starts to produce the independent index elements from the retrieval document 1302. The independent index element creation procedure in the independent index element creating means 1310 and the index element lineup procedure in the index element lineup means 1312 are the same as the independent index element creation procedure in the independent index element creating means 110 and the index element lineup procedure in the index element lineup means 112 in the first embodiment, respectively.

FIG. 16 is a conceptual illustration of processing for obtaining independent index elements to the retrieval document with the FIG. 15 contents through the use of the extended word dictionary 1315 having the FIG. 14 contents, the corresponding deducible index element table 1308 and the rightmost regular expression dictionary 1306. The description of the processing procedure will be omitted because of being the same as that of the first embodiment. However, the retrieval document includes A character "YO" not appearing in the word dictionary before the extension, and in the word dictionary before the extension, although the matching with a portion including this character does not occur, because of using this extended word dictionary, all the one-character words including "YO" exist in the extended word dictionary, and the index element of the portion including this character is selected.

The independent index element creating processing ends with the above-described fourth processing, and then the fifth processing starts. Since the lineup processing procedure in the index element lineup means 1312 is also the same as that of the index element lineup means 112 in the first embodiment, and the description will be omitted for brevity. Finally, the word index 1313 having the contents shown in FIG. 17 is made out, and the regular expression dictionary and word index creating processing comes to an end.

As described above, according to the dictionary and index creating system being the third embodiment of this invention, since all the one-character words which do not appear in the word dictionary are added to the word dictionary, even if the retrieval document includes a character not appearing in any word in the word dictionary before the addition, the regular expression drawn up on the basis of the added one-character word comes into matching with a portion including such a character, and hence, in the entire retrieval document, as compared with the prior index creating method, the matching character positional range of each of the index elements becomes longer and the overlap enlarges, and therefore, it is possible to sharply reduce the case that "the retrieval character strings are covered with words having a relatively small number of characters and making less overlap with each other" which causes the impairment of efficiency inherent in the prior word index, thereby permitting higher-speed full-text retrieval processing.

Fourth Embodiment

A fourth embodiment of the present invention relates to a dictionary and index creating system which creates a regular expression dictionary in which words with a higher occurrence frequency are finely classified into a larger number of regular expressions while regular expressions with a small number of characters are allocated to words with a low frequency, and further which produces a word index using this regular expression dictionary.

Figure 18:
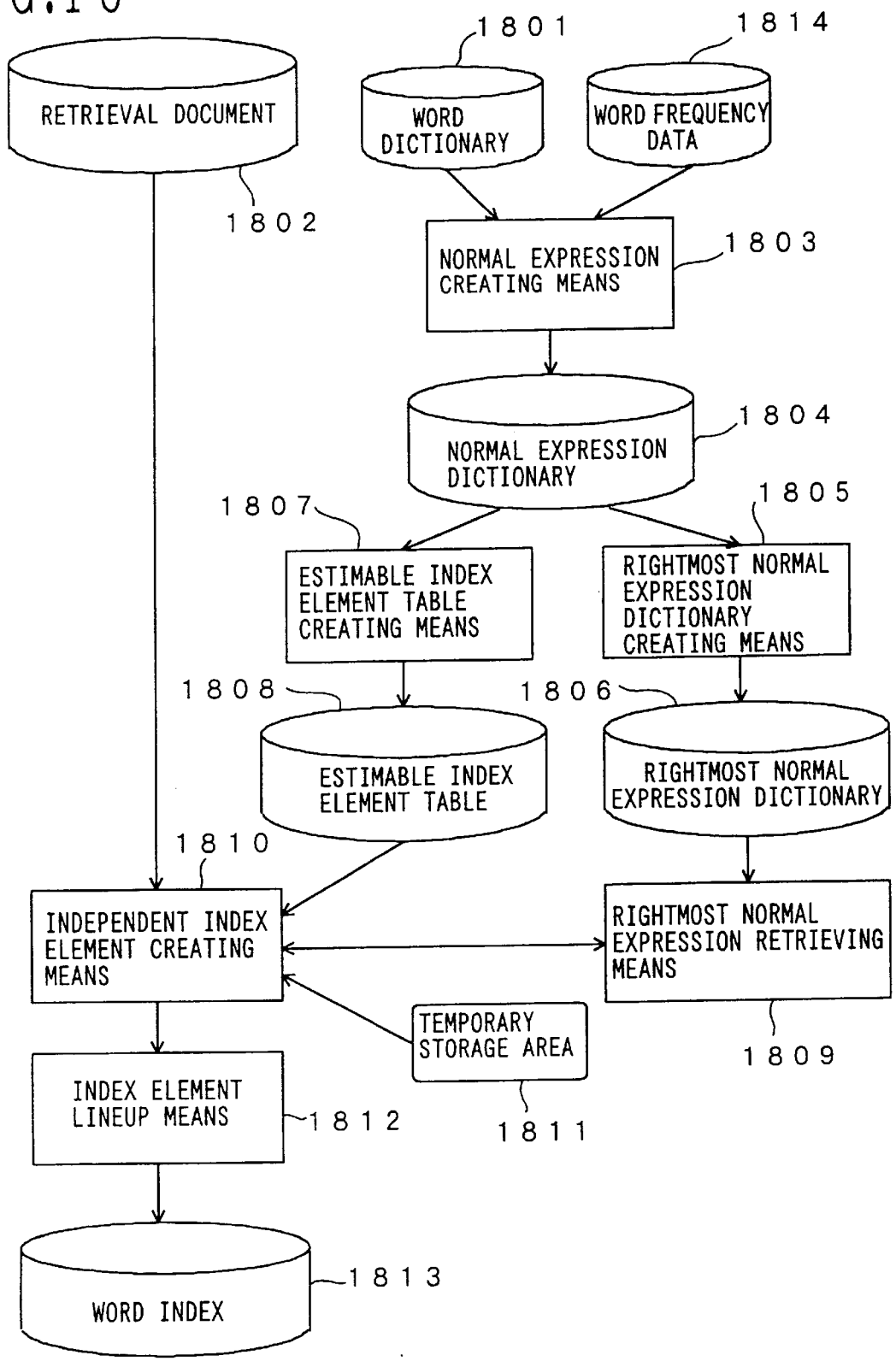
FIG. 18 is a block diagram showing the entire arrangement of a dictionary and index creating system according to a fourth embodiment of the present invention.

Referring to FIGS. 18 to 22, a description will be made hereinbelow of the dictionary and index creating system according to the fourth embodiment of this invention. FIG. 18 is a block diagram showing the whole arrangement of the dictionary and index creating system according to the fourth embodiment.

In FIG. 18, the dictionary and index creating system is composed of a word dictionary 1801, a retrieval document 1802, a word frequency data (storage) 1814 including an occurrence frequency of each of words in a sample document, a regular expression creating means 1803 for creating one or more regular expressions on the basis of each of words (character strings) in the word dictionary 1801 and the frequency of each of the words in the word frequency data 1814 according to a predetermined rule(s) which will be described herein later, and a regular expression dictionary 1804 for storing a set of regular expressions created by the regular expression creating means 1803.

Also included in the dictionary and index creating system are a rightmost regular expression dictionary creating means 1805 for creating a dictionary in the form of a finite-state machine for retrieving all the regular expressions of the regular expression set 1804 matching with the rightmost partial string(s) of a specified character string, a rightmost regular expression dictionary 1806 created by the rightmost regular expression dictionary creating means 1805, a deducible index element table creating means 1807 for, when an arbitrary character string x is in matching with each of regular expressions s in the regular expression dictionary 1804, obtaining all sets (t, p) of a different regular expression t making it certainly deducible that the character string x is also in matching with the regular expression t and a relative character position p being the matching start character position of t taken for when the matching start character position of s is 1 (or a different appropriate number), a deducible index element table 1808 for retaining all the deducible index elements obtained by the deducible index element table creating means 1807, and a rightmost regular expression retrieving means 1809 for conducting retrieval to the rightmost regular expression dictionary 1806 with respect to the specified character string to obtain, of the regular expressions being in matching with the character string, all the regular expressions whose matching end character position coincides with the last character position of the character string, that is, the regular expressions being in matching with the rightmost partial string(s) of the character string.

Further included therein are a temporary storage area 1811 for temporarily storing index elements, and an independent index element creating means 1810 for successively reading the retrieval document 1802 and for driving the rightmost regular expression retrieving means 1809 to obtain all the regular expressions matching with the rightmost partial character strings up to an observing character position so that the regular expressions, together with matching character positional ranges, are stored as index elements in the temporary storage area 1811, and further for performing retrieval to the deducible index element table 1808 so that, when existing in the temporary storage area 1811, the deducible index element is removed from the stored index elements, and even for outputting the final independent index elements left in the temporary storage area 1811 after the removal, with the independent index element creating means 1810 repeating these operations until reaching the end of the retrieval document 1802.

Still further, included therein are an index element lineup means 1812 for arranging the independent index elements, outputted from the independent index element creating means 1810, in the order originating from the words of the regular expressions (in this case, if the character strings originating from the words are the same, in a predetermined constant order depending upon the regular expressions before and after them), and a word index 1813 outputted from the index element lineup means 1812. The components 1801 to 1813 in FIG. 18 correspond to the components 101 to 113 in FIG. 1 being the block diagram showing the first embodiment.

Referring to the drawings, a description will be made hereinbelow of an operation of the dictionary and index creating system thus constructed using an example involving a simple word dictionary and a simple retrieval document. FIG. 29 is an illustration of an example of lists of words constituting a word dictionary, FIG. 30 is an illustration of an example of retrieval documents, FIG. 19 is an illustration of an example of word frequency data, FIG. 20 is an illustration of an example of regular expression dictionaries produced on the basis of the word dictionary comprising the words shown in FIG. 29 and the word frequency data having the contents shown in FIG. 19, FIG. 21 is a conceptual illustration of the processing for obtaining the regular expressions matching with the rightmost partial string at every character position from the head of the FIG. 30 retrieval document, and FIG. 22 is a conceptual illustration of the contents of a word index drawn up through the use of the regular expression dictionary composed of the regular expressions shown in FIG. 20. In this instance, as character sets Σ, there are used "hiragana" characters "a" to "n", "katakana" characters "a" to "n", JAS first standard Chinese characters "A" to "WAN", and let it be assumed that the other characters do not appear in the retrieval document 1801 and in the word dictionary 1802.

First of all, prior to the preparation of an index, the dictionary data having the contents shown in FIG. 29 are stored in the word dictionary 1801 while the retrieval document data shown in FIG. 30 are put in the retrieval document 1802. Subsequently, the observing character position is set to the head of the text, and the temporary storage area 1810 is set to an empty condition. Further, before the creation of the word index 1813, first, each of the words in the word dictionary 1801 having the contents shown in FIG. 29 and the frequency value corresponding to the word in the word frequency data 1814 having the contents shown in FIG. 19 are read out by the regular expression creating means 1803, thereby creating regular expressions. The regular expression creating means 1803 creates one or more regular expressions, depending upon the number of characters, for each of the words in the word dictionary 1801 according to the following rules.

(1) If the frequency of the observing word w assumes exceeds 1000, any one of the following character groups is added to the left- and right-hand sides of w, thus producing 16 regular expressions in total.

[a-go a-g o A-KON]
[sa-do s a-d o SA-DON]
[na-po n a-p o NA-BON]
[ma-n m a-n MA-WAN]

(2) If the frequency of the observing word w assumes 200 or more but below 1000, any one of the following character groups is added to the left- and right-hand sides of w, thus producing 4 regular expressions in total.

[a-do a-d o A-BON]
[na-n n a-n NA-WAN]

(3) If the frequency of the observing word w takes 40 or more but below 200, Σ is added to the left- and right-hand sides of w, thus producing one regular expression ΣwΣ.

(4) If the frequency of the observing word w is below 40, one regular expression composed of w itself is made out.

In FIG. 19, for instance, for the word "i" in the word dictionary, because the frequency is 40 or more but below 200, ΣwΣ is made out. Further, for a word "no", because the frequency is 1000 or more, 16 regular expressions from "[a-go a-g o A-KON] no [a-go a-g o A-KON]" to "[ma-n m a-n MA-WAN] no [ma-n m a-n MA-WAN]". Still further, for a word "no d e", because the frequency assumes 200 or more but below 1000, 4 regular expressions are produced as follows.

"[a-do a-d o A-DON] no de [a-do a-d o A-DON]"
"[a-do a-d o A-DON] no de [na-n n a-n NA-WAN]"
"[na-n n a-n NA-WAN] no de [a-do a-d o A-DON]"
"[na-n n a-n NA-WAN] no de [na-n n a-n NA-WAN]"

Moreover, for a word "A NICHI DEN SHI", since the frequency is below 40, "A NICHI DEN SHI" is drawn up.

Thus, the regular expression dictionary shown in FIG. 19 is created, and at the same time, the maximal value L of the number of characters of matching character strings of each of the regular expressions created is obtained and recorded in the regular expression dictionary.

The second processing and the following processing are the same as the second processing and the following processing in the first embodiment. Thus, index elements are drawn up as shown in FIG. 21, and finally, a word index shown in FIG. 22 is made out, and the regular expression dictionary and word index creating processing comes to an end.

As described above, according to the dictionary and index creating system being the fourth embodiment of this invention, since for the creation of the regular expression dictionary the words with a higher frequency are finely classified in a larger number of regular expressions under their left- and right-hand circumstances while regular expressions without the left- and right-hand patterns and with a smaller number of characters than that of the other words are allocated to the words with a minimum rank of frequency and the word index is made out using this regular expression dictionary, the following effects are obtainable.

(1) As a word has a higher frequency, the matching character positional range of the index element of the regular expression corresponding to that word becomes longer and the number of index elements for each of the regular expressions decreases.

(2) A portion of the index elements for a word taking a minimum rank is also recorded as the index elements for the regular expression corresponding to a word not taking the minimum rank at the same portions in the retrieval document.

Owing to these advantages, as compared with the prior art, it is possible to sharply reduce the cases that "the retrieval character strings are covered with words having a relatively small number of characters and making less overlap with each other" and "it is required to obtain the index elements for many words" in a state of holding back the index capacity, which causes the impairment of efficiency inherent in the prior word index, thereby permitting higher-speed full-text retrieval processing.

Fifth Embodiment

A fifth embodiment of the present invention relates to a dictionary and index creating system which creates a word index through the use of a sample document or text to obtain occurrence frequencies of words and makes out a regular expression dictionary and a final word index on the basis of the word frequency data.

Figure 23:
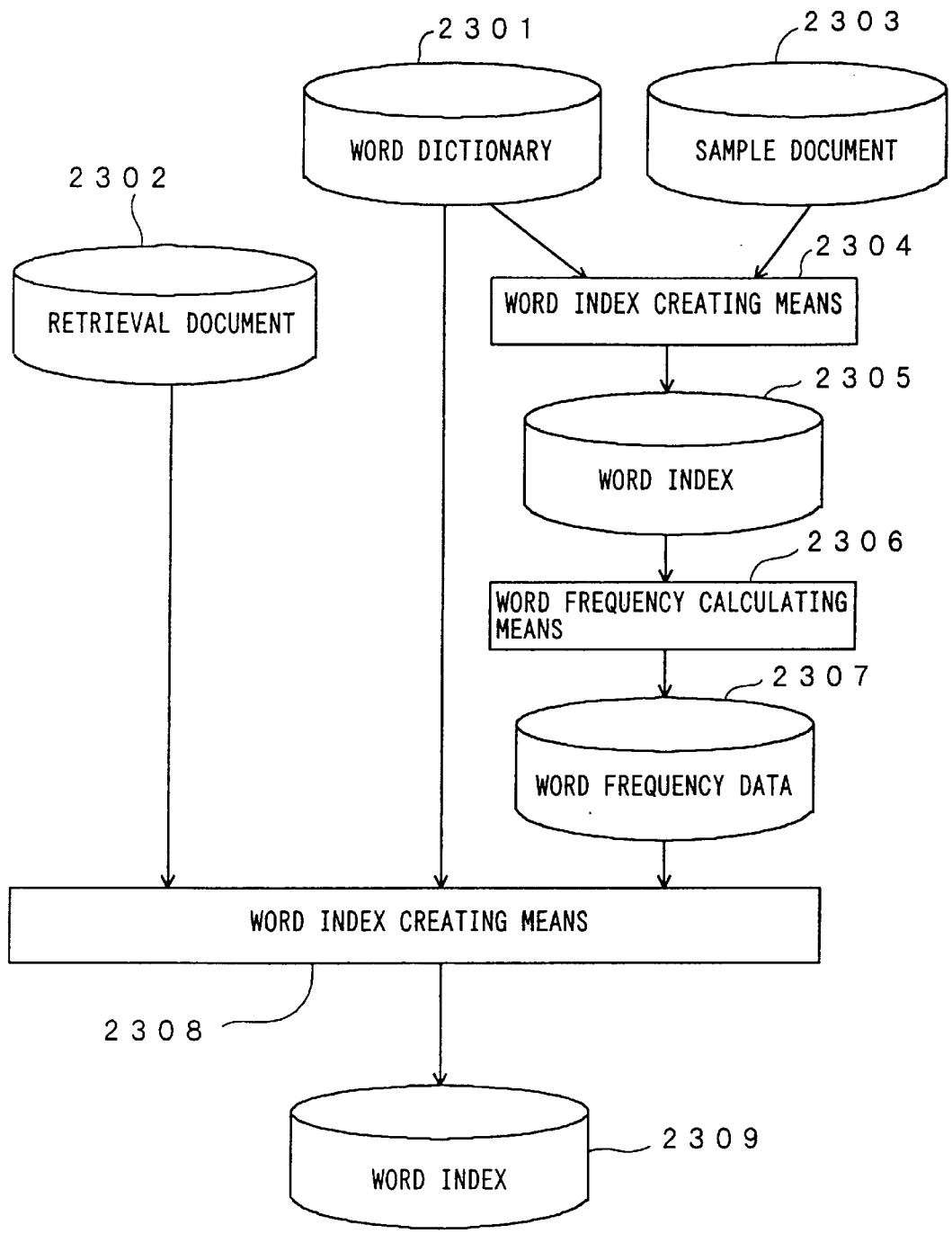
FIG. 23 is a block diagram showing the entire arrangement of a dictionary and index creating system according to a fifth embodiment of the present invention.

Referring to the drawings, a description will be made hereinbelow of the dictionary and index creating system according to the fifth embodiment of this invention. FIG. 23 is a block diagram showing the whole arrangement of the dictionary and index creating system according to the fifth embodiment.

In FIG. 23, the dictionary and index creating system is made up of a word dictionary 2301, a retrieval document 2302, a sample document 2303, a first word index creating means 2304 for creating a word index for the sample document 2303 through the use of the word dictionary 2301, a first word index made out by the first word index creating means 2304, a word frequency calculating means 2306 for calculating the number of index elements for each of words in the word dictionary 2301 as a word frequency on the basis of the first word index 2305, word frequency data 2307 involving pairs of words and occurrence frequencies estimated by the word frequency calculating means 2306, a second word index creating means 2308 for drawing up a word index for the retrieval document 2302 through the use of the word dictionary 2301 and the word frequency data 2307, and a second word index 2309 made out by the second word index creating means 2308.

Figure 27:
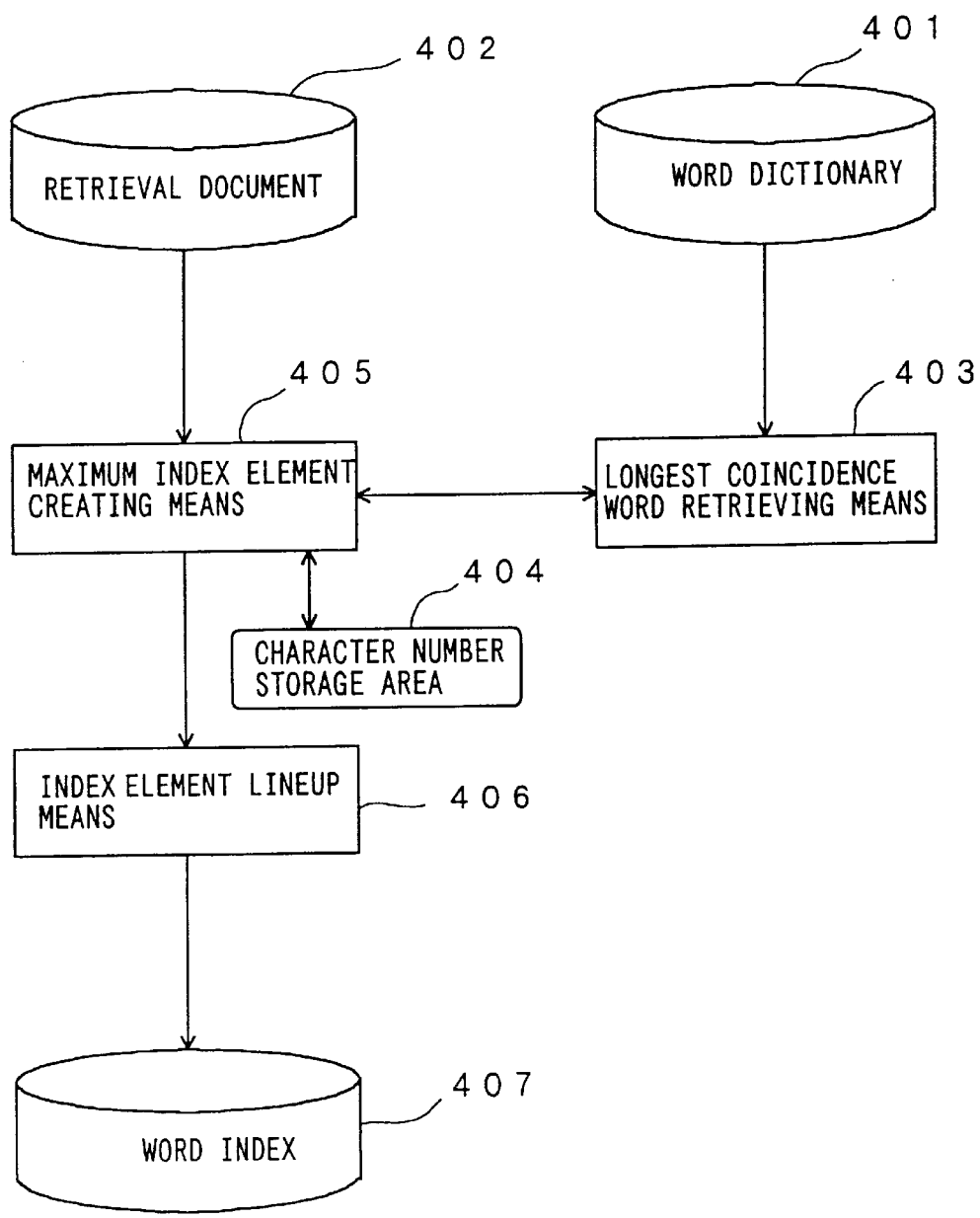
FIG. 27(Prior Art) is a block diagram showing the entire arrangement of a prior art word index creating system.
Figure 28:
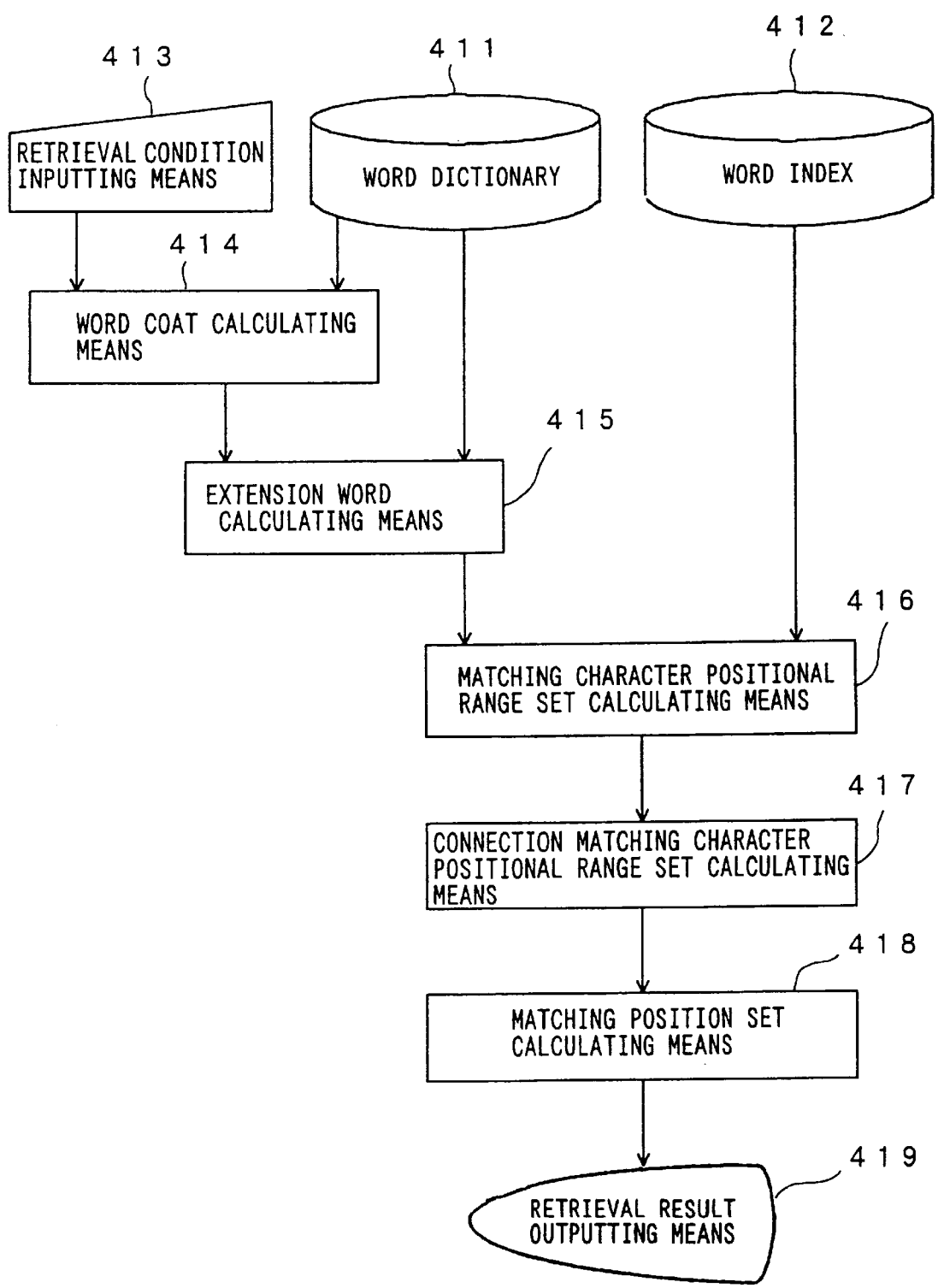
FIG. 28(Prior Art) is a block diagram showing the entire arrangement of a prior art document retrieval system.

A description will be made hereinbelow of an operation of the dictionary and index creating system thus constructed. First of all, the first word index creating means 2304 creates the word index for the sample document 2303 through the use of the word dictionary 2301. The prior word index creating means shown in FIG. 27 is available as the first word index creating means 2304. The operation thereof is as described in the description of the prior art.

After the creation of the first word index 2305, the word frequency calculating means 2306 checks all the index elements in the created first word index 2305 to obtain as the word frequency the number of index elements for each of words in the word dictionary 2301, thereby making out the word frequency data 2307. For example, the word frequency data 2307 has the contents shown in FIG. 19.

After the creation of the word frequency data 2307, at last the second word index creating means 2308 creates the word index for the retrieval document 2302, being the final purpose of the processing, through the use of the word dictionary 2301 and the word frequency data 2307. as the second word index creating means 2308, it is possible to use the word index creating means mentioned in the fourth embodiment of this invention with reference to FIG. 18. The operation thereof is as mentioned in the fourth embodiment.

As described above, according to the dictionary and index creating system being the fifth embodiment of this invention, using the sample document, the index is made out according to the prior method similar to the final index creation to obtain the word occurrence frequencies so that the regular expression dictionary is constructed on the basis of the word frequency data to make out the final word index, whereupon in the word frequency data, the frequencies (the numbers of index elements of the regular expressions based upon the words) in the final word index becomes similar to their distribution, so that the following effects are remarkably obtainable.

(1) As a word has a higher frequency, the matching character positional range of the index element of the regular expression corresponding to that word becomes longer and the number of index elements for each of the regular expressions decreases.

(2) A portion of the index elements for a word taking a minimum rank is also recorded as the index elements for the regular expression corresponding to a word not taking the minimum rank at the same portions in the retrieval document.

Owing to these advantages, as compared with the prior art, it is possible to sharply reduce the cases that "the retrieval character strings are covered with words having a relatively small number of characters and making less overlap with each other" and "it is required to obtain the index elements for many words" in a state of holding back the index capacity, which causes the impairment of efficiency inherent in the prior word index, thereby permitting higher-speed full-text retrieval processing.

Sixth Embodiment

A sixth embodiment of the present invention relates to a document retrieval system comprising a word dictionary, a regular expression dictionary created on the basis of a retrieval document and the word dictionary, a word index, a word cover calculating means, an extension regular expression set calculating means for obtaining an extension regular expression set of each of word cover elements being in word covering on the basis of the regular expression dictionary, an index element set retrieving means a connection index element calculating means, and a matching position set calculating means.

Figure 24:
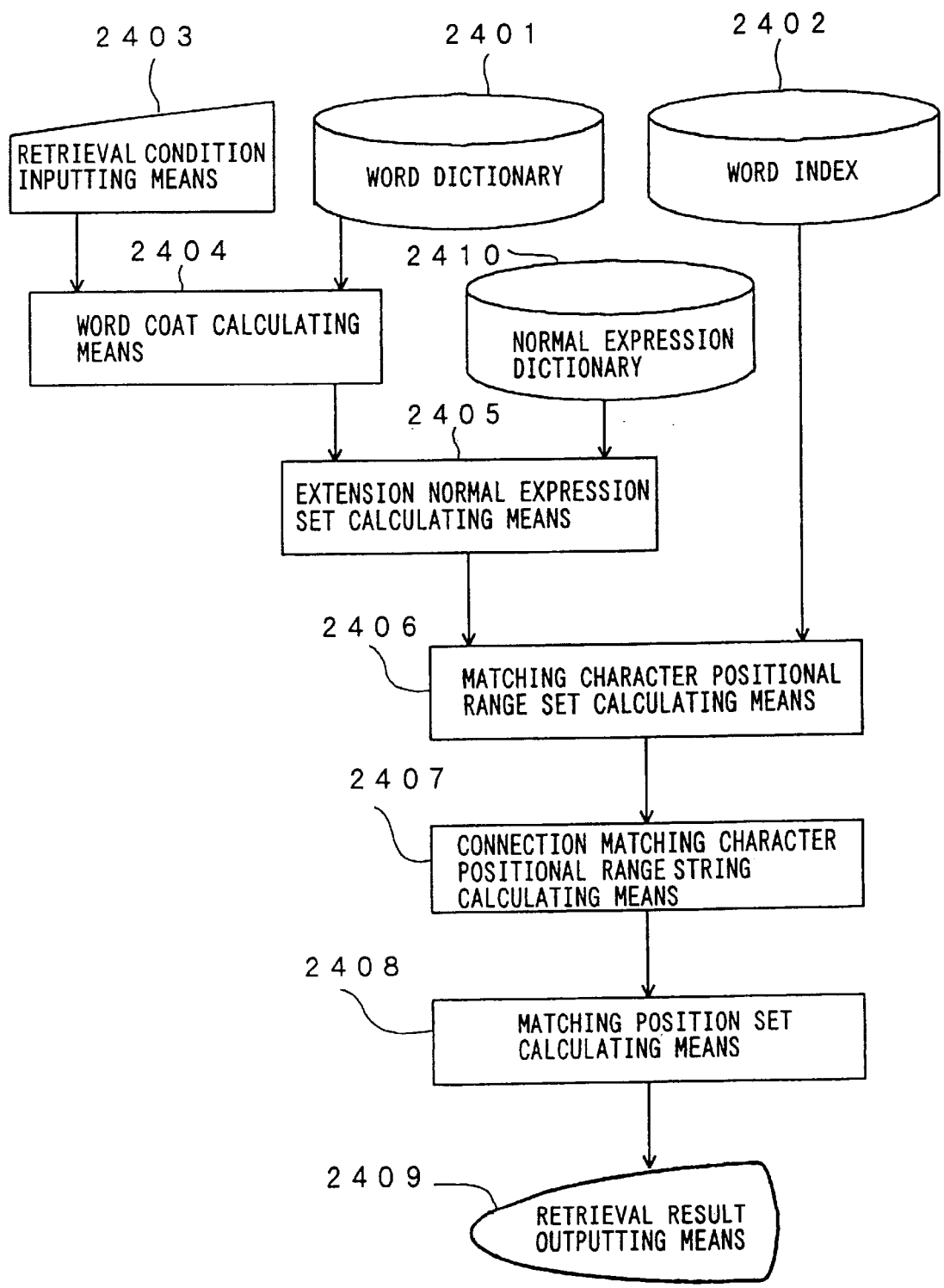
FIG. 24 is a block diagram showing the entire arrangement of a document (text) retrieval system according to a sixth embodiment of the present invention.
Figures 26, 26A, 26B:
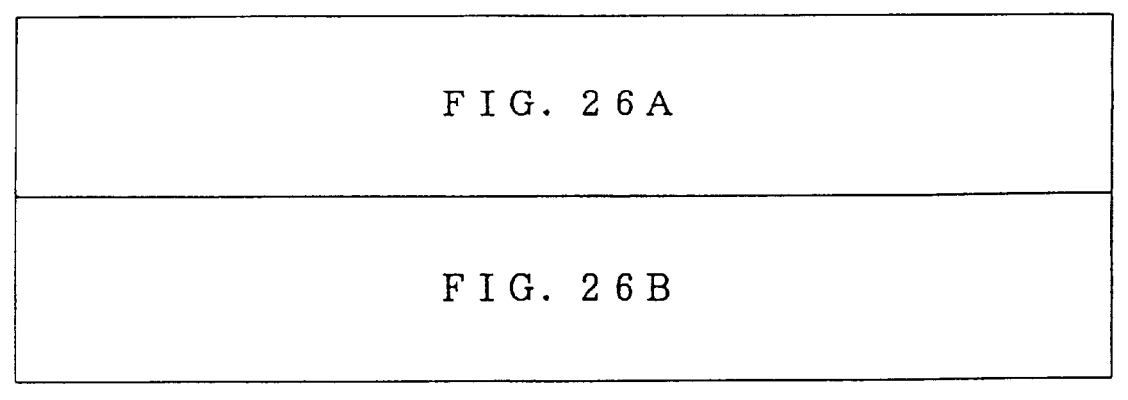

Referring to FIGS. 24 to 26, a description will be made hereinbelow of a document retrieval system according to a sixth embodiment of this invention. FIG. 24 is a block diagram showing the entire arrangement of the document retrieval system according to the sixth embodiment of this invention.

In FIG. 24, the document retrieval system is made up of a word dictionary 2401, a regular expression dictionary 2410 made from the word dictionary 2401 at the time of creation of a word index, a word index 2402 created on the basis of the word dictionary 2401 and the regular expression dictionary 2410 through the use of the word index creating system according to this invention shown in FIG. 1, a retrieval condition inputting means 2403 for inputting a retrieval condition character string, a word cover calculating means 2404 for conducting retrieval to the word dictionary 2401 for obtaining a word cover of the retrieval condition character string in the form of a set of word cover elements being a set (combination) of words in the dictionary 2401 and cover character position ranges of the retrieval condition character string, and an extension regular expression set calculating means 2405 for conducting retrieval to the regular expression dictionary 2410 in relation to a specified word cover element to obtain, of the regular expressions in the regular expression dictionary 2410 which are in matching with a character string including a word of the word cover element, all the regular expressions conforming to the retrieval condition character string.

Also included in the document retrieval system are a matching character positional range set calculating means 2406 for obtaining all index elements of a specified regular expression set to correct a matching character positional range for the creation of a matching character positional range, a connection matching character positional range string calculating means 2407 for obtaining, specified matching character positional range set strings, all the matching character positional range strings appearing in succession in a retrieval document, a matching position set calculating means 2408 for obtaining a set of matching start character positions being the head elements of the matching character positional range strings, and a retrieval result outputting means 2409 for outputting a retrieval result.

Furthermore, referring to the drawings, a description will be taken hereinbelow of an operation of the document retrieval system thus arranged in the case of a simple dictionary and a simple retrieval document taken for the explanation of the prior word index creating system. FIGS. 25 and 26 are conceptual illustrations of full-text retrieval processing for retrieval condition character strings being "DEN SHI s u p i n KYO MEI" and "TO A DEN SHI" through the use of the word index having the contents shown in FIG. 8, the word dictionary having the content shown in FIG. 29 and the regular expression dictionary having the contents shown in FIG. 2.

In the first place, referring to FIG. 25, a description will be made hereinbelow of retrieval processing to be taken for when the character string "DEN SHI s u p i n KYO MEI" is inputted through the retrieval condition inputting means 2403. First, the word cover calculating means 2404 obtains covers for the retrieval condition character strings as follows. The word cover calculating means 2404 uses each of the rightmost partial character strings of the retrieval condition character strings "DEN SHI s u p i n KYO MEI", "SHI s u p i n KYO MEI", "s u p i n KYO MEI", "p i n KYO MEI", "n KYO MEI", "KYO MEI" and "MEI" as a key to successively retrieves the words being the longest leftmost partial character strings of the keys from the word dictionary 2401 so that they, together with the cover character positional ranges in the retrieval condition character strings (the character position of the first character of the retrieval condition character string is set to 1), are recorded as a word cover element.

In this instance, in the case of "DEN SHI s u p i n KYO MEI", three words "DEN", "DEN SHI" and "DEN SHI s u p i n" are retrieved as its leftmost partial words so that (DEN SHI s u p i n, [1, 5]) being a set of "DEN SHI s u p i n" having the largest number of characters and a cover character positional range [1, 5] of the retrieval condition character string "DEN SHI s u p i n KYO MEI" is recorded, and in the case of "SHI s u p i n KYO MEI", since its leftmost partial word is not included in the word dictionary 2401 having the FIG. 29 contents, nothing is recorded. Further, in the case of "s u p i n KYO MEI", two words "s u p i n" and "s u p i n KYO MEI" are retrieved as its leftmost partial words, and (s u p i n KYO MEI, [3, 7]) being a set of the longest word "s u p i n KYO MEI" and the cover character positional range [3, 7] is recorded. Still further, in the case of "p i n KYO MEI" and "n KYO MEI", because their leftmost partial words do not exist in the word dictionary 2401 with the FIG. 29 contents, nothing is recorded. Moreover, for "KYO MEI", only "KYO MEI" is retrieved as its leftmost partial word, and a set (KYO MEI, [6, 7]) of "KYO MEI" and the cover character positional range [6, 7] is recorded.

Subsequently, of the recorded word cover elements, deleted are the non-peak word cover elements, i.e., the word cover elements that the cover character positional range is fully included in the cover character positional ranges of the other word cover elements. The set of the remaining word cover elements after the deletion covers the retrieval condition character strings. That is, in cases where the sum-set of the cover character positional ranges of the word cover elements of the word cover set assumes the whole retrieval condition character string, the set of the remaining word cover elements is recorded as the word cover. On the other hand, in cases where the set of the remaining word cover elements after the deletion does not cover the retrieval condition character string, the retrieval result outputting means 2409 outputs a predetermined special retrieval result indicative of "retrieval impossible". This retrieval processing comes to an end after the output of the retrieval result.

In this instance, of three index elements (DEN SHI s u p i n, [1, 5]), (s u p i n KYO MEI, [3, 7]) and (KYO MEI, [6, 7]), the cover character positional range [6, 7] of (KYO MEI, [6, 7]) is completely included in the cover character positional range [3, 7] of (s u p i n KYO MEI, [3, 7]), and therefore, (KYO MEI, [6, 7]) is deleted. The sum-set of the cover character positional ranges of the set of the remaining word cover elements H={(DEN SHI s u p i n,[1, 5]),(s u p i n KYO MEI, [3, 7])} comes to [1, 5]∪[3, 7]=[1, 7] and assumes the character positional range of the whole retrieval condition character string "DEN SHI s u p i n KYO MEI", whereupon the above-mentioned set H is recorded as the word cover for the retrieval condition character string "DEN SHI s u p i n KYO MEI".

After the word cover calculating means 2404 obtains the word cover for the retrieval condition character string, the extension regular expression set calculating means 2405 conducts retrieval to the regular expression dictionary 2410 for each of the word cover elements of the aforesaid word cover H to obtain, of the regular expressions in the regular expression dictionary 2410 which is in matching with a character string including a word of the corresponding word cover element, all the regular expressions conforming to the retrieval condition character string. In this case, when, of the regular expressions r in the regular expression dictionary 2410 in which the observing word cover element (w, [s, e]) is included as a partial character string, at least one element x of the character string set expressed by r shows the form of x=p·w·q (p, q represent arbitrary strings having more than 0 character) (that is, including the word w) and a=min (s−1, |p|) and b=min (|c|-e, |q|) are defined, "the regular expression conforming to the retrieval condition character string c" signifies the regular expression r satisfying both (1) and (2).

(1) a=0, or c [(s−a) . . . (s−1)]=p [(|p|−a+1) . . . |p|]

(2) b=0, or c [(e+1) . . . (e+b)]=q [1. . . b]

At this time, the partial character string composed of the ith to jth characters of a character string T is expressed as T [i. . . j] and the number of characters of the character string T is represented as |T|.

In this instance, the extension regular expression set of (DEN SHI s u p i n, [1, 5]) agreeing with the retrieval condition character string "DEN SHI s u p i n KYO MEI" becomes (ΣDEN SHI s u p i n, DEN SHI s u p i n Σ), while the extension regular expression set of (s u p i n KYO MEI [3, 7]) conforming with "DEN SHI s u p i n KYO MEI" becomes (Σs u p i n KYO MEI, s u p i n KYO MEI Σ, s u p i n KYO MEI KYU SHU). Incidentally, although the regular expression "KAKU s u p i n KYO MEI" in the FIG. 2 regular expression dictionary is an extension word of "s u p i n KYO MEI" because "KAKU s u p i n KYO MEI" being the sole element of the character string set represented thereby includes "s u p i n KYO MEI" as a partial character string, since the "KAKU" partial character string corresponding to p of the aforesaid x=p·w·q does not coincide with the corresponding partial character string "SHI" of the retrieval condition character string "DEN SHI s u p i n KYO MEI", it is not an extension regular expression conforming to "DEN SHI s u p i n KYO MEI".

After obtaining the set of extension regular expressions, conforming to the retrieval condition character string, of the word cover element being in word covering, the matching character positional range calculating means 2406 then obtains index elements, in which the regular expression being the element of each of the extension regular expression sets assumes the first term, from the word index 2402, and corrects the second term of each of the obtained index elements to the matching character positional range corresponding to the word of the word cover element, on the basis of which that extension regular expression set is produced, to obtain the matching character positional range set after the correction.

In this example, the index elements of the extension regular expression set (Σ DEN SHI s u p i n, DEN SHI s u p i n Σ) of (DEN SHI s u p i n, [1, 5]) conforming to "DEN SHI s u p i n KYO MEI" are two elements (Σ DEN SHI s u p i n, [5, 10]) and (DEN SHI s u p i n Σ, [6, 11]). In the matching character positional range of the first index element (Σ DEN SHI s u p i n, [7, 12]), the matching start character position is smaller by 1 than that of the matching character positional range of the word "DEN SHI s u p i n" being the creation basis, and hence, the correction of the matching character positional range is made from [5, 10] to [6, 10]. Further, in the matching character positional range of the second index element (DEN SHI s u p i n Σ, [7, 12]), the matching end character position is larger by 1 than that of the matching character positional range of the word "DEN SHI s u p i n"0 being the creation basis, and hence, the correction of the matching character positional range is made from [6, 11] to [6, 10]. Since these two matching character positional ranges after the correction are the same, {[6, 10]} is obtained as the matching character positional range set. In a similar way, the index elements of the extension regular expression set (Σ DEN SHI s u p i n, DEN SHI s u p i n Σ, DEN SHI s u p i n KYO MEI) of (s u p i n KYO MEI [3, 7]) conforming to "DEN SHI s u p i n KYO MEI" are two elements {(Σ s u p i n KYO MEI [7, 12]), (s u p i n KYO MEI Σ, [8, 13]). Accordingly, the matching character positional ranges after the correction become [8, 12], so that {[8, 12]} is obtained as the matching character positional range set.

After the acquisition of the matching character positional range set for each of the extension regular expression set, the connection matching character positional range calculating means 2407 obtains, of each of matching character positional range set strings, all the matching character positional range stings appearing in succession in the retrieval document. The decision as to whether or not the matching character positional range string appears in succession in the retrieval document is made depending upon whether or not the difference between the start character positions of the adjacent matching character positional ranges is equal to the difference between the cover start character positions of the corresponding word cover elements.

In this instance, comparing the element [6, 10] of the matching character positional range set {[6, 10]} for (DEN SHI s u p i n, [1, 5]) with the element [8, 12] of the matching character positional range set {[8, 12]} for (s u p i n KYO MEI, [3, 7]), the difference (that is, 2) between their start character positions is equal to the difference (that is, 2) in the start character position of the cover character positional range between the corresponding two word cover elements (DEN SHI s u p i n, [1, 5]) and (s u p i n KYO MEI, [3, 7]). Accordingly, it is found that they appear in succession in the character positional range [6, 12] in the retrieval document, with the result that {([6, 10], [8, 12])} is obtained as the matching character positional range string set.

After the calculation of all the matching character positional range strings appearing in succession in the retrieval document, the matching position set calculating means 2408 obtains the matching position set being the set of the matching start positions in the first matching character positional ranges of each of the matching character positional range strings from the matching character positional range string set, and the retrieval result outputting means 2409 outputs this matching position set as a retrieval result.

In this case, the matching position set calculating means 2408 obtains the set {6} composed of only 6 representing the matching start character position of the head element [6, 10] of the string ([6, 10], [8, 12]) constituting its single element, and the retrieval result outputting means 2409 outputs this set as the retrieval result. This retrieval result indicates that only one portion of the retrieval character string comes into matching with the retrieval condition character string "DEN SHI s u p i n KYO MEI" and begins with the 6th character of the retrieval character string.

The above description is for the retrieval processing to be taken for when the character string "DEN SHI s u p i n KYO MEI" is inputted as the retrieval condition character string.

Furthermore, when the character string "TO A DEN SHI" is inputted as the retrieval condition character string, the retrieval processing is conducted in the basically same way as the above description as shown in FIG. 26. First, as shown in FIG. 26, a set comprising three elements {(TO, [1, 1]), (A, [2, 2]), (DEN SHI, [3, 4])} is obtained as a word cover. If the extension regular expression set of each of the word cover elements conforming to "TO A DEN SHI" and the corresponding matching character positional range set are expressed as "word cover element→extension regular expression set→matching character positional range set before correction→matching character positional range set after correction", (TO, [1, 1])→{[a-go a-g o A-KON] TO [a-go a-g o A-KON]
[sa-do s a-d o SA-DON] TO [a-go a-g o A-KON]
[na-po n a-p o NA-BON] TO [a-go a-g o A-KON]
[ma-n m a-n MA-WAN] TO [a-go a-g o A-KON]
[a-go a-g o A-KON] KYOKU TO [a-go a-g o A-KON]
[sa-do s a-d o SA-DON] KYOKU TO [a-go a-g o A-KON]
[na-po n a-p o NA-BON] KYOKU TO [a-go a-g o A-KON]
[ma-n m a-n MA-WAN] KYOKU TO [a-go a-g o A-KON]
[a-go a-g o A-KON] HOKU TO [a-go a-g o A-KON]
[sa-do s a-d o SA-DON] HOKU TO [a-go a-g o A-KON]
[na-po n a-p o NA-BON] HOKU TO [a-go a-g o A-KON]
[ma-n m a-n MA-WAN] HOKU TO [a-go a-g o A-KON]
[a-do a-d o A-DON] HOKU HOKU TO [a-do a-g o A-DON]
[na-n n a-n o NA-WAN] HOKU HOKU TO [a-do a-g o A-DON]
[a-go a-g o A-KON] NAN TO [a-go a-g o A-KON]
[sa-do s a-d o SA-DON] NAN TO [a-go a-g o A-KON]
[na-po n a-p o NA-BON] NAN TO [a-go a-g o A-KON]
[ma-n m a-n MA-WAN] NAN TO [a-go a-g o A-KON]
[a-do a-d o A-DON] NAN NAN TO [a-do a-g o A-DON]
[na-n n a-n o NA-WAN] NAN NAN TO [a-do a-g o A-DON]}→{[17, 19]}→{[18, 18]}
(A, [2, 2])→{[sa-do s a-d o SA-DON] A [a-go a-g o A-KON]}→{[18, 20]}{→{[19, 19]}
(DEN SHI, [3, 4])→{[a-go a-g o A-KON] DEN SHI [a-go a-g o A-KON]
[a-go a-g o A-KON] DEN SHI [sa-do s a-d o SA-DON]
[a-go a-g o A-KON] DEN SHI [na-po n a-p o NA-BON]
{[a-go a-g o A-KON] DEN SHI [ma-n m a-n MA-WAN]
ΣDEN SHI s u p i n
[a-do a-d o A-DON] DEN SHI UN [a-do a-d o A-DON]
{[a-do a-d o A-DON] DEN SHI UN [na-n n a-n NA-WAN]
Σ DEN SHI MITSU DO Σ Σ DEN SHI KI KI Σ}→{[5, 11], [6, 12], [19, 22]}→{6, 7], [20, 21]}

In the case of [15, 18] being [na-po n a-p o NA-BON] of the index element ([na-po n a-p o NA-BON] KAN TO [sa-do s a-d o SA-DON], [15, 18]), since the character "A" next to "TO" in the retrieval character string "TO ADEN SHI" does not come into matching with the pattern "[sa-do s a-d o SA-DON]", it does not come to the matching character positional range of the cover element (TO, [1, 1]).

Likewise, in terms of the matching character positional range [2, 5] of the index element ([na-po n a-p o NA-BON] DEN SHI [na-po n a-p o NA-BON], [2, 5) and the matching character positional range [24, 18] of the index element ([na-n n a-p o NA-WAN] DEN SHI UN [a-do a-d o A-DON], [24, 28), since the character "A" immediately before "DEN SHI" in the retrieval character string "TO A DEN SHI" does not get into matching with the patterns [na-po n a-p o NA-BON] and [na-n n a-n NA-WAN], they do not become the matching character positional range of the cover element (DEN SHI, [3, 4]). That is, since the characters before and after the word differ, the number of index elements to be retrieved decreases. Of the element strings of these three matching character positional range sets, only ([18, 18], [19, 19], [20, 21]) shows the succession of the character positions, with the result that {18} is outputted as the retrieval result.

As the description of the retrieval processing has been made above in the case of two examples, in the document retrieval system according to this present invention, since the retrieval is conducted using the regular expression dictionary and the word index storing the index elements of the regular expressions, the number of index elements to be accessed (read out) decreases, and useless elements not contributing to the final result are removable as many as possible, which sharply improves the retrieval efficiency. In the case of the retrieval condition character string in the above-described second example, since in the prior document retrieval system the matching character positional range set includes many elements not contributing to the final result, there is a need to check the index elements for a large number of extension words, so that the processing efficiency lowers at the retrieval. On the contrary, in the document retrieval system according to this invention, even in the case of the retrieval condition character string in the second example, the retrieval efficiency remarkably improves.

As obvious from the description of the above-described six embodiments, in the case of the dictionary and index creating system according to this invention, as compared with the prior index creating system, the matching character positional range of each of the index elements becomes longer, and the index and the dictionary having a large overlapping portion is producible, and therefore, it is possible to reduce the cases that the retrieval character string is covered with words having a relatively small number of characters and making less overlap with each other. In addition, since in the document retrieval system according to this invention, since the matching character positional range of each of the index elements becomes longer and the retrieval is conducted using the word index and the regular expression dictionary having a large overlapping portion, the efficiency reduction, originating from the word index, is eliminable and the high-speed full-text retrieval processing is feasible.

Particularly, this effect is noticeably achievable in the case of using huge practical scale document, dictionary and index. If the retrieval document reaches several tens M characters to several Characters, the number of words in the word dictionary to be put to use also reaches several hundred thousands, and hence, the index accordingly becomes as large as several tens M bytes to several G bytes. The effect that the number of index elements to be checked decreases and the useless elements not contributing to the final result is eliminable as many as possible becomes greater as the scale of the retrieval dictionary increases.

For example, in the case of retrieving the character string "NI HON no KEI ZAI" from newspaper article data (approximately 4 years) having approximately 400 M characters, if conducting retrieval to a word index created using only a word dictionary as taken in the prior art, although the cover "NI HON" +"no" +"KEI ZAI" is made in an ordinary word dictionary, each of index elements of these words exists frequently in the index, particularly the number of index elements of "no" reaches several ten-millions, and hence, the retrieval time comes to several tens seconds even if a high-speed computer is employed for the retrieval processing.

On the other hand, in the dictionary and index creating system and document retrieval system according to this invention which are made to create the index on the basis of the regular expression dictionary, even if the word cover is the same as "NI PPON" * "no" * "KEI ZAI", the corresponding regular expression is, for example, {[? a-o] NI HON [na-no], . . . , [NA-WAN] NI HON [na-no]} * {[HA-BON] no [KA-KON]}* {[na-no] KEI ZAI [? a-o], . . . , [na-no] KEI ZAI [NA-WAN]}, and hence, the retrieval processing is conducted taking into consideration only the index elements of a portion of the regular expressions, relatable to the retrieval condition character string "NI HON no KEI ZAI", of the whole index element of the regular expression based upon three words, with the result that high-speed retrieval processing becomes realizable. In this case, particularly, since the contexts on both sides of "no" are restricted, the retrieval processing uses only one several-hundredth to one several-thousandths of the several ten-millions index elements originating from "no", so that as compared with the prior art the speed of the retrieval processing can reach several ten times to several hundred times. Besides, the increase in the capacity of the word index for the retrieval is slight.

As described above, high-speed document retrieval processing based upon an arbitrary retrieval condition character string becomes possible although being difficult in the case of using the prior word index, great effects are attainable in practical use.

Although in the above-described six embodiments a common Japanese characters are in use as the character set, even if using {"A", "T", "G", "C"} representing the base sequence of DNA or a character set comprising alphabet letters expressing a chemical formula of a chemical substance, the retrieval is easily possible. In addition, although only one character class is used as the regular expression to be added to the left- and right-hand sides of a word, even if using two or more character classes, the similar processing procedure can be taken.

As described above, since the dictionary and index creating system according to this invention is composed of a means for creating a regular expression dictionary on the basis of a retrieval document and a word dictionary and a means for creating a word index comprising deducible index elements and being sets of regular expressions and matching start character positions, without increasing the index capacity so much, it is possible to create a regular expression dictionary and a word index which are capable of preventing the impairment of the retrieval efficiency and of conducting the high-speed full-text retrieval processing.

In addition, since the dictionary and index creating system according to this invention is composed of a means for creating a regular expression dictionary corresponding to the occurrence frequency of each of words in a sample document on the basis of a retrieval document and a word dictionary and a means for creating a word index comprising deducible index elements and being combinations of regular expressions and matching start character positions, it is possible to create a regular expression dictionary and a word index which are capable of performing a higher-speed retrieval as the word has a higher occurrence frequency.

Furthermore, since the dictionary and index creating system according to this invention is composed of a means for creating a first word index on the basis of a sample document and a word dictionary and a means for creating a regular expression dictionary and a second word index in accordance with the frequency of the words in the first word index, it is possible to create a regular expression dictionary and a word index which are capable of performing a higher-speed retrieval as the word has a higher occurrence frequency.

Still further, since the document retrieval system according to this invention is made up of a word dictionary, a word dictionary retrieving means, a regular expression dictionary, a regular expression dictionary retrieving means, a word index, a word index retrieval means, a question inputting means, a word cover calculating means for obtaining an arbitrary word cover for a question character string, an extension regular expression set calculating means for calculating an extension regular expression set of each of word cover elements being in word covering, an index element set retrieving means for retrieving index elements that each regular expression of the extension regular expression set is the first term from the word index to obtain an index element set, a connection index element calculating means for obtaining all index element strings appearing in succession in the document, and a matching position set calculating means for obtaining a set of matching start positions from a set of index element strings to produce a retrieval result, in the case that the retrieval character string is covered with words comprising a relatively small number of characters and making less overlapping portions, the efficiency impairment is preventable, and higher-speed full-text retrieval processing becomes possible without increasing the index capacity so much.

Moreover, since the document retrieval system according to this invention uses an enlarged character set in which one special character not included in the retrieval document is added as a terminal character, produces an enlarged retrieval document by adding the terminal character to before and after the retrieval document as occasion demands, uses the enlarged character set as a character set, and uses the enlarged retrieval document as a retrieval document, in the case that the retrieval character string is covered with words comprising a relatively small number of characters and making less overlapping portions, the efficiency impairment is preventable, and higher-speed full-text retrieval processing becomes possible without increasing the index capacity so much.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A dictionary and index creating system designed to create a regular expression dictionary and a word index on the basis of a retrieval document undergoing retrieval and a word dictionary including words w (where w is one of n words w1, w2, w3, . . . , wn, n being a number greater than 1), said system comprising:

a retrieval document storage unit for storing said retrieval document composed of a lineup of a finite number of characters included in a predetermined character set;

a word dictionary storage unit for storing said word dictionary in which are registered a finite number of words each being a lineup of one or more characters included in said character set;

means for reading out each word w of said words w1, . . . , wn from said word dictionary in said word dictionary storage unit and further for making out m sets of regular expressions a, b, where m represents a variable to establish one or more regular expression sets and depends on each word w of said words w1, . . . , wn and where each of a, b is indicative of a set of equal length character strings having lengths which are equal to each other, except null sets on said character set, with said regular expressions a, b being determined according to a rule depending on each said word w of said words w1, . . . , wn, itself, or on an attribute of each said word w;

a regular expression dictionary storage unit for joining said regular expressions a, b to before and after each word w of said words w1, . . . , wn, respectively, to make out m sets of regular expressions awb corresponding to each word w and further for collecting all of said regular expressions awb made out to produce said regular expression dictionary, different from said word dictionary, according to a predetermined rule depending on each word w of said words w1, . . . , wn and for storing said regular expression dictionary;

means for retrieving a character string matching with a regular expression in said regular expression dictionary from said retrieval document storage unit and further for creating an index element comprising a set of said regular expressions and a matching character positional range in said retrieval document; and a word index storage unit for storing a word index made out by a collection of said index elements decided as being non-deducible from other index elements.

2. A dictionary and index creating system as defined in claim 1, wherein each of said regular expressions a, b joined to before and after said word w in said word dictionary takes one of a character class string and a null string.

3. A dictionary and index creating system as defined in claim 1, wherein an enlarged character set is used which is prepared by adding as a terminal character one special character not included in said retrieval document, and said terminal character is added to before and after said retrieval document as occasion demands to produce an enlarged retrieval document, so that said enlarged character set is employed as a character set and said enlarged retrieval document is used as a retrieval document.

4. A dictionary and index creating system as defined in claim 1, further comprising means for, if a word composed of only c which is an arbitrary character in a determined character set is not included in a given word dictionary, creating an extended word dictionary by adding said word to said word dictionary, and means for creating a regular expression dictionary and a word index through the use of said extended word dictionary as said word dictionary.

5. A dictionary and index creating system made to create a regular expression dictionary and a word index on the basis of a retrieval document undergoing retrieval, a word dictionary and word frequency data, said system comprising:

a retrieval document storage unit for storing a retrieval document composed of a lineup of a finite number of characters included in a predetermined character set;

a word dictionary storage unit for storing a word dictionary in which are registered a finite number of words each being a lineup of one or more characters included in said character set;

a word frequency data storage unit for storing word frequency data indicative of an occurrence frequency of each of a plurality of words of said word dictionary in a sample document comprising a lineup of a finite number of characters included in said predetermined character set;

means for reading out each word w (where w is one of n words w1, w2, w3, . . . , wn, n being a number greater than 1) from said word dictionary in said word dictionary storage unit and further for making out m sets of regular expressions a, b, where m represents a variable to establish one or more regular expression sets and depends on each word w of said words w1, . . . , wn, and where each of a, b is indicative of a set of equal length character strings having lengths which are equal to each other, except null sets on said character set, with said regular expressions a, b being determined according to a rule depending on the frequency of each word w of said words w1, . . . , wn in said word frequency data;

a regular expression dictionary storage unit for joining said regular expressions a, b to before and after each word w of said words w1, . . . , wn, respectively, to make out m sets of regular expressions awb corresponding to each word w of said words w1, . . . , wn and further for collecting all said regular expressions awb made out in connection with all said words in said word dictionary to produce said regular expression dictionary different from said word dictionary and for storing said regular expression dictionary;

means for retrieving a character string matching with a regular expression in said regular expression dictionary from said retrieval document storage unit and further for creating an index element comprising a set of said regular expressions and a matching character positional range in said retrieval document; and a word index storage unit for storing a word index made out by a collection of said index elements decided as being non-deducible from other index elements.

6. A dictionary and index creating system as defined in claim 5, wherein said means for reading out each word w and for making out said regular expressions according to said rule depending on the frequency of each said word w uses 3N parameters, including N frequency limit values, N left-side character classes and N right-side character classes, and includes:

means for making out a regular expression composed of a specific word w itself if the occurrence frequency of said specific word w recorded in said word frequency data is below a first frequency limit value;

means for joining a character class a being an element in an mth left-side character class set and a character class b being an element in an mth right-side character class set to said word w to make out regular expressions awb in relation to all the possible character classes a, b if the occurrence frequency of said word w recorded in said word frequency data is higher than a mth frequency limit value but is lower than a m+1th frequency limit value; and means for joining a character class a being an element in an Nth left-side character class set and a character class b being an element in an Nth right-side character class set to make out regular expressions awb in relation to all the possible character classes a, b if the occurrence frequency of said word w recorded in said word frequency data is higher than an N−1th frequency limit value.

7. A dictionary and index creating system as defined in claim 5, wherein said sample document is made up of all or a portion of said retrieval document.

8. A dictionary and index creating system as defined in claim 4, wherein said sample document is made up of all or a portion of said retrieval document.

9. A dictionary and index creating system as defined in claim 5, wherein an enlarged character set is used which is prepared by adding as a terminal character one special character not included in said retrieval document, and said terminal character is added to before and after said retrieval document as occasion demands to produce an enlarged retrieval document, so that said enlarged character set is employed as a character set and said enlarged retrieval document is used as a retrieval document.

10. A dictionary and index creating system as defined in claim 5, further comprising means for, if a word composed of only c which is an arbitrary character in a determined character set is not included in a given word dictionary, creating an extended word dictionary by adding said word to said word dictionary, and means for creating a regular expression dictionary and a word index through the use of said extended word dictionary as said word dictionary.

11. A dictionary and index creating system made to create a regular expression dictionary and a word index on the basis of a retrieval document undergoing retrieval, a word dictionary and a sample document, said system comprising:

a retrieval document storage unit for storing a retrieval document composed of a lineup of a finite number of characters included in a predetermined character set;

a word dictionary storage unit for storing a word dictionary in which are registered a finite number of words each being a lineup of one or more characters included in said character set;

a sample document storage unit for storing a sample document comprising a lineup of a finite number of characters included in a predetermined character set;

means for retrieving a character string matching with a word in said word dictionary from said sample document storage unit and further for creating an index element being a set of said words and a matching character positional range in said retrieval document to check whether or not said index element is deducible from other index elements and for collecting said index elements decided as being non-deducible from the other index elements to produce a first word index;

means for producing word frequency data in a manner that the number of index elements for each of a plurality of words in said first word index is handled as a word frequency;

means for reading out each word w (where w is one of n words w1, w2, w3, ..., wn, n being a number greater than 1) from said word dictionary in said word dictionary storage unit and further for making out m sets of regular expressions a, b, where m represents a variable to establish one or more regular expression sets and depends on each word w of said words w1, ..., wn, and where each of a, b is indicative of a set of equal length character strings having lengths which are equal to each other, except null sets on said character set, with said regular expressions a, b being determined according to a rule depending on said frequency of each word w of said words w1, ..., wn, in said word frequency data;

a regular expression dictionary storage unit for joining said regular expressions a, b to before and after each word w of said words w1, ..., wn, respectively, to make out m sets of regular expressions awb corresponding to each word w of said words w1, ..., wn, and further for collecting all said regular expressions awb made out in connection with all said words in said word dictionary to produce said regular expression dictionary different from said word dictionary and for storing said regular expression dictionary;

means for retrieving a character string matching with a regular expression in said regular expression dictionary from said retrieval document storage unit and further for creating an index element comprising a set of said regular expressions and a matching character positional range in said retrieval document; and a word index storage unit for storing a second word index made out by a collection of said index elements decided as being non-deducible from other index elements.

12. A dictionary and index creating system as defined in claim 11, wherein said means for reading out each word w and for making out said regular expressions according to said rule depending on the frequency of each said word w uses 3N parameters, including N frequency limit values, N left-side character classes and N right-side character classes, and includes:

means for making out a regular expression composed of a specific word w itself if the occurrence frequency of said specific word w recorded in said word frequency data is below a first frequency limit value;

means for joining a character class a being an element in an mth left-side character class set and a character class b being an element in an mth right-side character class set to said word w to make out regular expressions awb in relation to all the possible character classes a, b if the occurrence frequency of said word w recorded in said word frequency data is higher than a mth frequency limit value but is lower than a m+1th frequency limit value; and means for joining a character class a being an element in an Nth left-side character class set and a character class b being an element in an Nth right-side character class set to make out regular expressions awb in relation to all the possible character classes a, b if the occurrence frequency of said word w recorded in said word frequency data is higher than an N−1th frequency limit value.

13. A dictionary and index creating system as defined in claim 11, wherein an enlarged character set is used which is prepared by adding as a terminal character one special character not included in said retrieval document, and said terminal character is added to before and after said retrieval document as occasion demands to produce an enlarged retrieval document, so that said enlarged character set is employed as a character set and said enlarged retrieval document is used as a retrieval document.

14. A dictionary and index creating system as defined in claim 11, further comprising means for, if a word composed of only c which is an arbitrary character in a determined character set is not included in a given word dictionary, creating an extended word dictionary by adding said word to said word dictionary, and means for creating a regular expression dictionary and a word index through the use of said extended word dictionary as said word dictionary.

* * * * *

UNITED STATES PATENT AND TRADEMARK OFFICE
CERTIFICATE OF CORRECTION

PATENT NO. : 6,169,999 B1
DATED : January 2, 2001
INVENTOR(S) : Kanno

Page 1 of 1

It is certified that error appears in the above-identified patent and that said Letters Patent is hereby corrected as shown below:

<u>Title,</u>
Please correct the title to read:

Dictionary And Index Creating System And Document Retrieval System By Creating A Regular Expression Dictionary And A Word Index Signed and Sealed this Twenty-fifth Day of September, 2001

Attest:

*Attesting Officer*

NICHOLAS P. GODICI
*Acting Director of the United States Patent and Trademark Office*